(12) United States Patent
Iyer et al.

(10) Patent No.: US 12,167,329 B2
(45) Date of Patent: Dec. 10, 2024

(54) POWER SAVING MECHANISMS IN NR

(71) Applicant: InterDigital Patent Holdings, Inc., Wilmington, DE (US)

(72) Inventors: Lakshmi R. Iyer, King of Prussia, PA (US); Pascal M. Adjakple, Great Neck, NY (US); Qing Li, Princeton Junction, NJ (US); Guodong Zhang, Woodbury, NY (US); Joseph M. Murray, Schwenksville, PA (US); Yifan Li, Conshohocken, PA (US); Allan Y. Tsai, Boonton, NJ (US); Mohamed Awadin, Plymouth Meeting, PA (US); Patrick Svedman, Chevy Chase, MD (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 528 days.

(21) Appl. No.: 17/279,198

(22) PCT Filed: Jul. 17, 2019

(86) PCT No.: PCT/US2019/042260
§ 371 (c)(1),
(2) Date: Mar. 24, 2021

(87) PCT Pub. No.: WO2020/068253
PCT Pub. Date: Apr. 2, 2020

(65) Prior Publication Data
US 2022/0039009 A1 Feb. 3, 2022

Related U.S. Application Data

(60) Provisional application No. 62/825,226, filed on Mar. 28, 2019, provisional application No. 62/737,266, filed on Sep. 27, 2018.

(51) Int. Cl.
*H04W 52/02* (2009.01)
*H04L 5/00* (2006.01)
(Continued)

(52) U.S. Cl.
CPC ....... *H04W 52/0229* (2013.01); *H04L 5/0098* (2013.01); *H04W 52/0216* (2013.01);
(Continued)

(58) Field of Classification Search
CPC ............ H04W 52/0229; H04W 72/23; H04W 52/0219; H04W 52/0216; H04W 72/044; H04L 5/0098
See application file for complete search history.

(56) References Cited

U.S. PATENT DOCUMENTS

| 9,872,252 B1 | 1/2018 | Ang et al. |
| 11,606,751 B2 | 3/2023 | Lee et al. |

(Continued)

FOREIGN PATENT DOCUMENTS

| CN | 107113727 A | 8/2017 |
| CN | 107197492 A | 9/2017 |

(Continued)

OTHER PUBLICATIONS

Qualcomm Incorporated, "Advanced Grant Indication for UE Power Saving", R1-1720709, 3GPP TSG RAN WG1 #91, Nov. 27-Dec. 1, 2017, pp. 1-5.

(Continued)

*Primary Examiner* — Gerald Johnson
(74) *Attorney, Agent, or Firm* — Flaster Greenberg, P.C.

(57) ABSTRACT

Methods, systems, and devices may assist in power saving in new radio. For example, enable power savings during the connected mode discontinuous reception cycle of the RRC_CONNECTED state of a user equipment.

20 Claims, 41 Drawing Sheets

(51) Int. Cl.
*H04W 72/044* (2023.01)
*H04W 72/23* (2023.01)
(52) U.S. Cl.
CPC ..... *H04W 52/0219* (2013.01); *H04W 72/044* (2013.01); *H04W 72/23* (2023.01)

(56) References Cited

U.S. PATENT DOCUMENTS

| | | | |
|---|---|---|---|
| 11,968,734 | B2 | 4/2024 | Pelletier et al. |
| 2010/0118815 | A1 | 5/2010 | Kim et al. |
| 2012/0140689 | A1 | 6/2012 | Pelletier et al. |
| 2013/0258919 | A1 | 10/2013 | Damnjanovic |
| 2015/0003311 | A1 | 1/2015 | Feuersaenger et al. |
| 2015/0099558 | A1 | 4/2015 | Zehr et al. |
| 2015/0359034 | A1 | 12/2015 | Kim et al. |
| 2016/0081136 | A1 | 3/2016 | Karampatsis et al. |
| 2016/0142974 | A1 | 5/2016 | Lindoff et al. |
| 2016/0143085 | A1 | 5/2016 | Cai et al. |
| 2016/0286603 | A1 | 9/2016 | Vajapeyam et al. |
| 2016/0295504 | A1 | 10/2016 | Wang et al. |
| 2016/0295636 | A1 | 10/2016 | Yang et al. |
| 2017/0019852 | A1 | 1/2017 | Yang et al. |
| 2017/0026948 | A1 | 1/2017 | Yang et al. |
| 2017/0208523 | A1 | 7/2017 | Yang et al. |
| 2017/0272999 | A1 | 9/2017 | Tsai |
| 2018/0007734 | A1 | 1/2018 | Kela et al. |
| 2018/0097598 | A1 | 4/2018 | Ang et al. |
| 2018/0098287 | A1 | 4/2018 | Ang et al. |
| 2018/0270756 | A1 | 9/2018 | Bhattad et al. |
| 2019/0312758 | A1 | 10/2019 | Liu et al. |
| 2019/0349856 | A1 | 11/2019 | Liu et al. |
| 2020/0196242 | A1 | 6/2020 | Höglund et al. |
| 2020/0280919 | A1 | 9/2020 | Hoglund et al. |
| 2020/0336983 | A1 | 10/2020 | Agarwal et al. |
| 2020/0404589 | A1 | 12/2020 | Wang et al. |
| 2020/0413474 | A1 | 12/2020 | Zhu |
| 2021/0068085 | A1 | 3/2021 | Chen |
| 2021/0176729 | A1 | 6/2021 | Liu et al. |
| 2021/0259044 | A1* | 8/2021 | Islam .................. H04W 72/535 |
| 2021/0306952 | A1 | 9/2021 | Kuang et al. |
| 2021/0368444 | A1 | 11/2021 | Wang et al. |
| 2022/0248330 | A1* | 8/2022 | Jiang ..................... H04W 24/10 |

FOREIGN PATENT DOCUMENTS

| | | |
|---|---|---|
| CN | 107637142 A | 1/2018 |
| CN | 108307507 A | 7/2018 |
| CN | 108370544 A | 8/2018 |
| CN | 108370602 A | 8/2018 |
| JP | 2015512178 A | 4/2015 |
| KR | 10-2010-0052064 A | 5/2010 |
| WO | 2014/181997 A1 | 11/2014 |
| WO | 2015018045 A1 | 2/2015 |
| WO | 2017/050512 A1 | 3/2017 |
| WO | 2018/127217 A1 | 7/2018 |
| WO | WO-2019032009 A1 * | 2/2019 ............ H04W 24/08 |

OTHER PUBLICATIONS

Qualcomm Incorporated, "Open Issues on BWP", R1-1720693, 3GPP TSG RAN WG1 #91, Nov. 27-Dec. 1, 2017, pp. 1-15.
Qualcomm Incorporated, "Advanced Grant Indication for UE Power Saving", R1-1711187, 3GPP TSG RAN WG1 NR Ad-Hoc#2, Jun. 2017, pp. 1-5.
Third Generation Partnership Project (3GPP), "Overall Description", Technical Specification Group Radio Access Network, Evolved Universal Terrestrial Radio Access (E-UTRA) and Evolved Universal Terrestrial Radio Access Network (E-UTRAN); Stage 2, Release 15, 3GPP TS 36.300 V15.0.0, Dec. 2017, 338 pages.
Third Generation Partnership Project (3GPP), "Radio Resource Control (RRC) protocol specification", Technical Specification Group Radio Access Network; NR, Release 15, 3GPP TS 38.331 V15.1.0, Mar. 2018, 268 pages.
Third Generation Partnership Project (3GPP), "On NR UE power saving", Vivo, 3GPP TSG RAN WG1 #94, Gothenburg, Sweden, Aug. 20-Aug. 24, 2018, R1-1808252, 8 pages.
3GPP TS 36.321 V15.2.0 , "Evolved Universal Terrestrial Radio Access (E-UTRA); Medium Access Control (MAC) protocol specification (Release 15)", 3rd Generation Partnership Project; Technical Specification Group Radio Access Network, Jul. 2018, 126 pages.
3GPP TS 36.321 V15.6.0 , "Technical Specification Group Radio Access Network; Evolved Universal Terrestrial Radio Access (E-Utra)", Third Generation Partnership Project; Medium Access Control (MAC) protocol specification (Release 15),, Jun. 2019, 133 paged.
3GPP TS 36.331 V15.2.0 , "Technical Specification Group Radio Access Network; Evolved Universal Terrestrial Radio Access (E-Utra)", Third Generation Partnership Project; Radio Resource Control (RRC); Protocol specification (Release 15),, Jun. 2018, 791 pages.
3GPP TS 36.331 V15.6.0 , "Technical Specification Group Radio Access Network; Evolved Universal Terrestrial Radio Access (E-Utra)", Third Generation Partnership Project, Radio Resource Control (RRC); Protocol specification (Release 15),, Jun. 2019, 863 pages.
3GPP TS 38.211 V15.2.0 , "Technical Specification Group Radio Access Network", Third Generation Partnership Project, NR; Physical channels and modulation (Release 15),, Jun. 2018, 96 pages.
3GPP TS 38.211 V15.6.0 , "Technical Specification Group Radio Access Network", Third Generation Partnership Project, NR; Physical channels and modulation (Release 15),, Jun. 2019, 97 paged.
3GPP TS 38.212 V15.2.0 , "NR; Multiplexing and channel coding (Release 15)", 3rd Generation Partnership Project; Technical Specification Group Radio Access Network, Jun. 2018, 98 pages.
3GPP TS 38.212 V15.6.0 , "Technical Specification Group Radio Access Network", Third Generation Partnership Project, Nr; Multiplexing and channel coding (Release 15),, Jun. 2019, 101 pages.
3GPP TS 38.213 V15.2.0 , "NR; Physical layer procedures for control (Release 15)", 3rd Generation Partnership Project; Technical Specification Group Radio Access Network, Jun. 2018, 98 pages.
3GPP TS 38.213 V15.6.0 , "Technical Specification Group Radio Access Network", Third Generation Partnership Project, NR; Physical layer procedures for control (Release 15),, Jun. 2019, 107 pages.
3GPP TS 38.214 V15.2.0 , "NR; Physical layer procedures for data (Release 15)", 3rd Generation Partnership Project; Technical Specification Group Radio Access Network, Jun. 2018, 95 pages.
3GPP TS 38.214 V15.6.0 , "Technical Specification Group Radio Access Network", Third Generation Partnership Project, NR; Physical layer procedures for data (Release 15),, Jun. 2019, 105 pages.
3GPP TS 38.321 V15.2.0 , "NR; Medium Access Control (MAC) Protocol Specification (Release 15)", 3rd Generation Partnership Project; Technical Specification Group Radio Access Network, Jun. 2018, 73 pages.
3GPP TS 38.321 V15.6.0 , "Technical Specification Group Radio Access Network", Third Generation Partnership Project, NR; Medium Access Control (MAC) protocol specification (Release 15), Jun. 2019, 78 pages.
802.11AF-2013 , "Telecommunications and information exchange between systems—Local and metropolitan area networks—Specific requirements; Part 11: Wireless LAN Medium Access Control (MAC) and Physical Layer (PHY) specifications", IEEE Standard for Information Technology mendment 5: Television White Spaces (TVWS) Operation, IEEE, Dec. 11, 2013, 198 pages.
802.11N-2009 , "Ieee Standard for Information Technology—telecommunications and Information Exchange Between Systems—Local and Metropolitan Area Networks-specific Requirements", Part 11: Wireless LAN Medium Access Control (MAC) and Physical Layer (PHY) Specifications, Amendment 5: Enhancements for Higher Throughput, IEEE Std., Sep. 11, 2009, 536 pages.
IEEE STD 802.11AC-2013 , "Part 11: Wireless LAN Medium Access Control (MAC) and Physical Layer (PHY) Specifications Amendment 4: Enhancements for Very High Throughput for Operation in Bands below 6GHz", IEEE Standard for Information technology—Telecommunications and information exchange between systems—Local and metropolitan area networks—Specific requirements, Dec. 11, 2013, 425 pages.
IEEE STD 802. 11AH-2016 , "Part 11: Wireless LAN Medium Access Control (MAC) and Physical Layer (PHY) Specifications",

(56) References Cited

OTHER PUBLICATIONS

IEEE Standard for Information technology—Telecommunications and information exchange between systems Local and metropolitan area networks—Specific requirements, Amendment 2: Sub 1 GHz License Exempt Operation, Dec. 7, 2016, 594 pages.

IEEE STD. 802.11-2016 , "Part 11: Wireless LAN Medium Access Control (MAC) and Physical Layer (PHY) Specifications", IEEE Standard for Information technology—Telecommunications and information exchange between systems—Local and metropolitan area networks - Specific requirements; Part 11,, Dec. 7, 2016, 3534 pages.

R1-1704282 , "Considerations on wake-up signal' for eFeMTC", Huawei, HiSilicon, 3GPP TSG RAN WG1, Meeting #88bis, Spokane, USA,, Apr. 3-7, 2017, 4 Pages.

R1-1717010, "Wake-up signal configurations and procedures [online]", 3GPP TSG RAN WG1 #90b, Sep. 30, 2017, 5 pages.

R1-1717279 , "Discussion on power saving signal/channel in MTC", LG Electronics, 3GPP TSG RAN WG1, Meeting 90bis, Prague, Czech Republic, Oct. 9-13, 2017, 12 Pages.

R1-1720133 , "Wake-up signal configurations and procedures", NOKIA et al., 3GPP TSG RAN WG1 Meeting #91, Reno, USA, Nov. 27-Dec. 1, 2017, 5 pages.

R1-1804139 , "Wake Up Signal Configuration for NB-Iot", Mediatek Inc. 3GPP TSG RAN WG1 Meeting #92bis, Sanya, China, Apr. 16-20, 2018, 7 pages.

R1-1813244 , "Discussion on Triggering of Power Mode Adaptation", Interdigital, Inc. 3GPP TSG RAN WG1 Meeting #95, Spokane, USA, Nov. 12-16, 2018, 4 pages.

R1-1900814 , "On Triggering of Power Mode Adaptation", Interdigital, Inc 3GPP TSG RAN WG1 Ad-Hoc Meeting 1901, Taipei, Taiwan, Jan. 21-25, 2019, 4 pages.

R1-1902619 , "On UE Power Saving Techniques", Interdigital, Inc. 3GPP TSG RAN WG1 #96, Athens, Greece, Feb. 25-Mar. 1, 2019, 9 pages.

R1-1905409 , "PDCCH-based Power Saving Signal Design Considerations", Interdigital, Inc., 3GPP TSG RAN WG1 #96b, Xi'an, China, Apr. 8-12, 2019, 9 pages.

R1-1907104 , "PDCCH-based Power Saving Signal Design", Interdigital, Inc., 3GPP TSG RAN WG1 #97, Reno, USA, May 13-17, 2019, 7 pages.

R2-1702653 , "DRX in NR", 3GPP TSG-RAN WG2, Meeting 97bis, Spokane, USA, Apr. 3-7, 2017, 4 Pages.

R2-1802586 , "Wake Up Signal in NB-IoT and MTC", Ericsson, 3GPP TSG-RAN2 Meeting #101, Athens, Greece, Feb. 26-Mar. 2, 2018, 11 pages.

\* cited by examiner

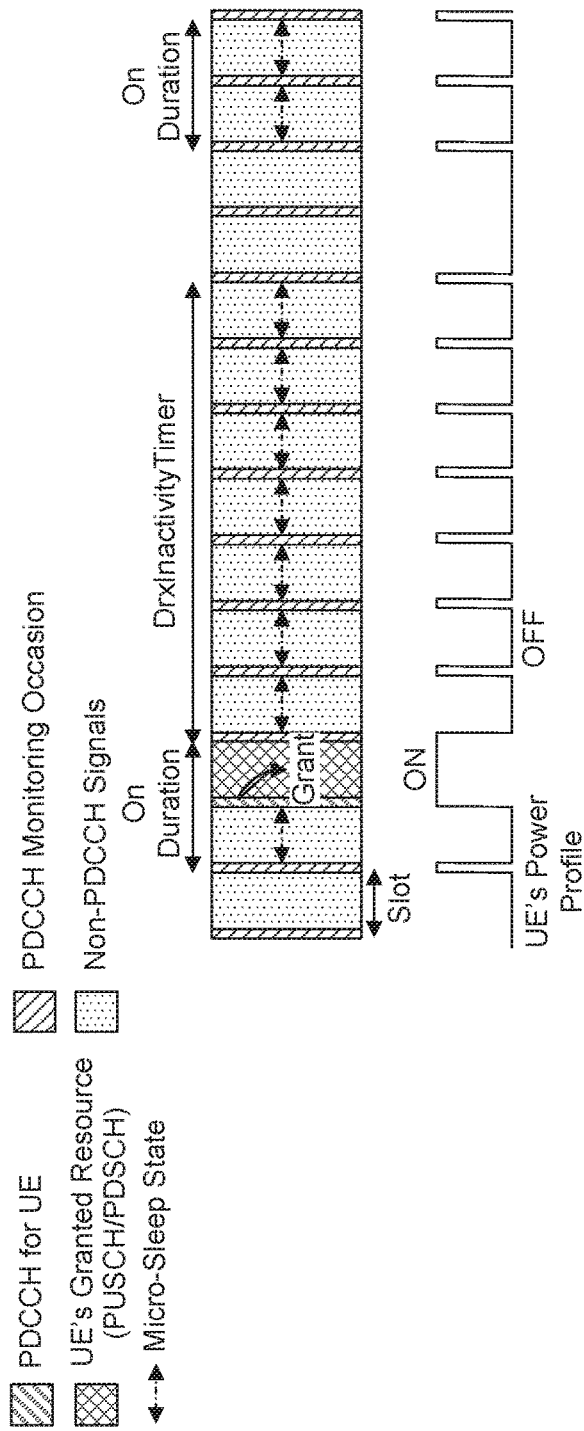
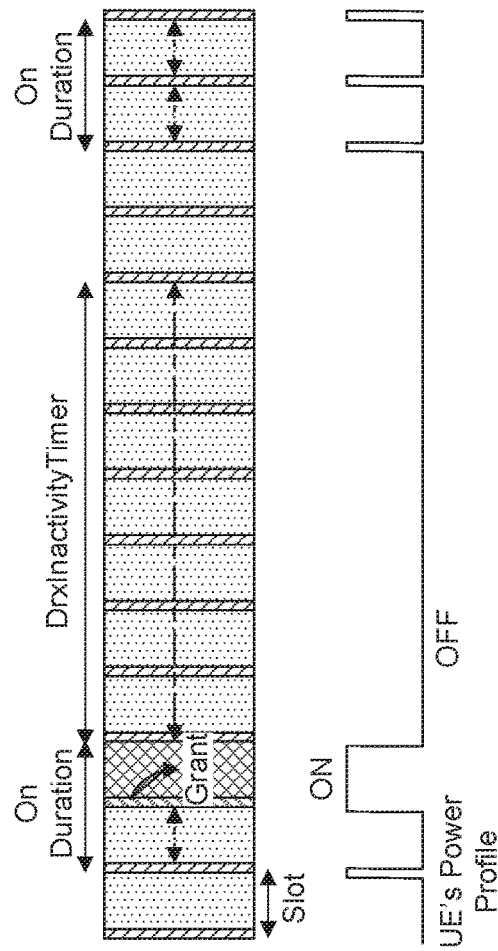
FIG. 1A
FIG. 1B

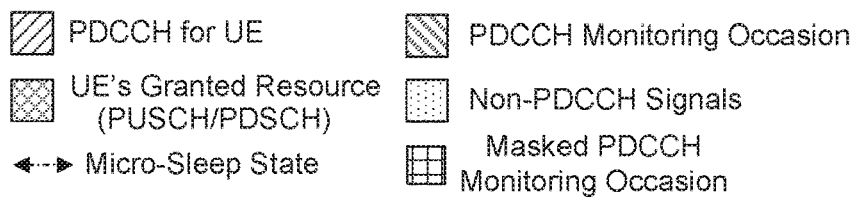
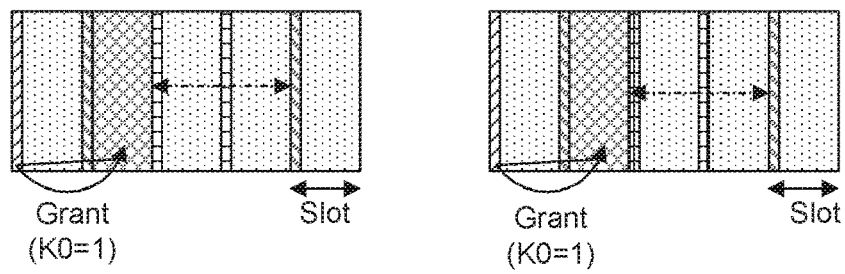
FIG. 6A  FIG. 6B
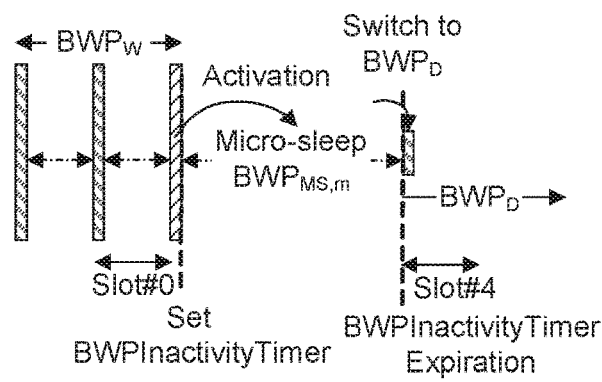
FIG. 7A
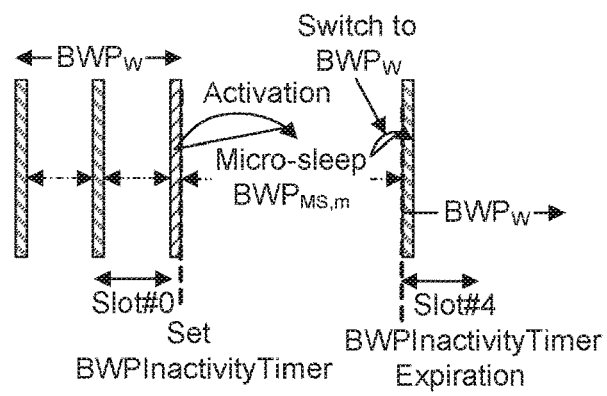
FIG. 7B

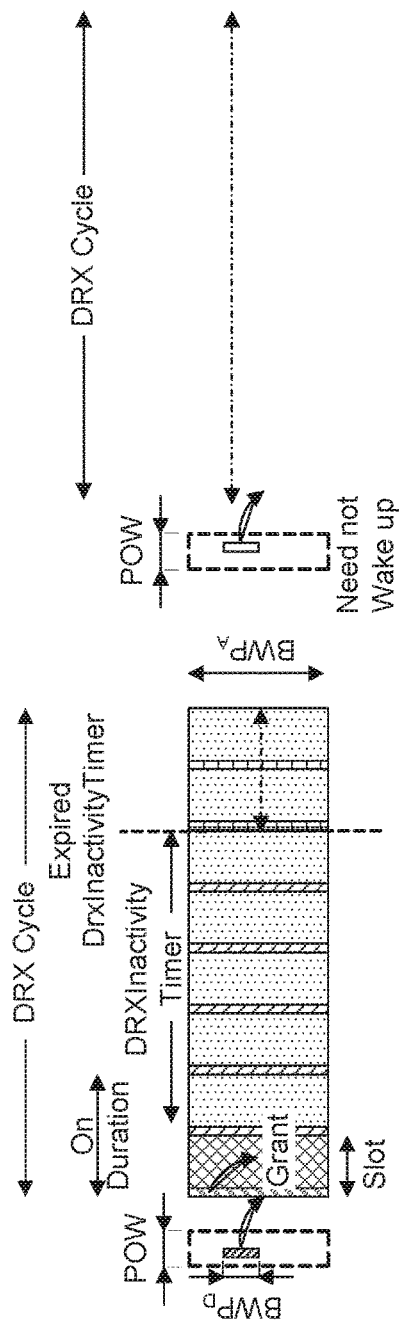
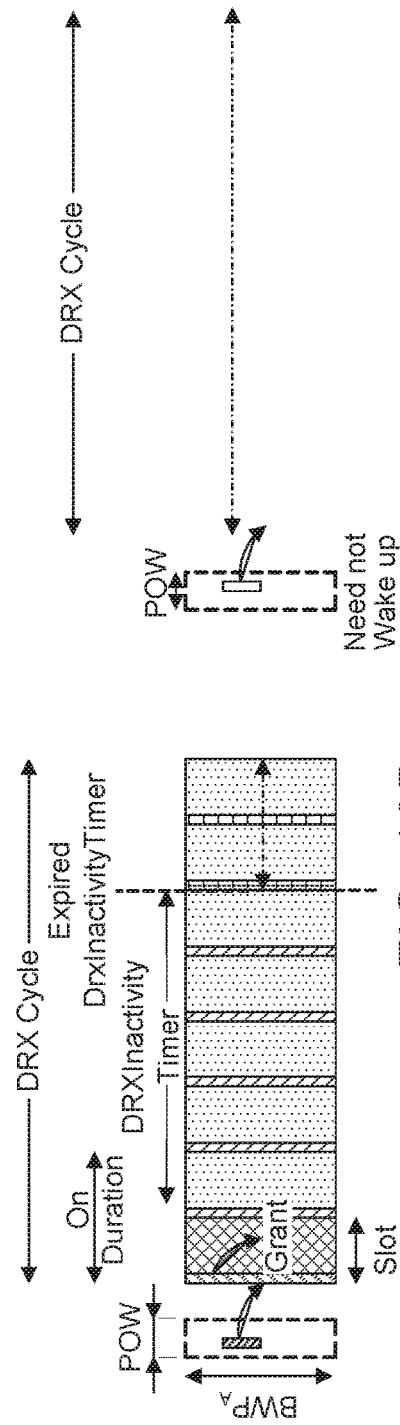
FIG. 13A
FIG. 13B

| Field1, {UE1, UE2} | Field2, {UE1} | Field1, {UE3, UE4, UE5} | Field2, {UE3, UE4} | Field3, {UE3} |

FIG. 39

POWER SAVING MECHANISMS IN NR

CROSS-REFERENCE TO RELATED APPLICATIONS

This application is the National Stage Application of International Patent Application No. PCT/US2019/042260, filed Jul. 17, 2019 which claims the benefit of U.S. Provisional Patent Application No. 62/737,266, filed on Sep. 27, 2018, entitled "Power Saving Mechanisms In NR," and U.S. Provisional Patent Application No. 62/825,226, filed on Mar. 28, 2019, entitled "Power Saving Mechanisms In NR," the contents of each are hereby incorporated by reference herein in their entirety.

BACKGROUND

The connected mode discontinuous reception (CDRX) cycle in 3GPP LTE Rel,15 and 3GPP NR Rel.15: In 3GPP LTE, the UE wakes up prior to the ON duration of the CDRX cycle and resynchronizes to the signal to be ready to receive grants. The OnDuration is configured to the UE through RRC. The UE monitors every slot for PDCCH. If no grant is received or no transmission must be done during the slot, the UE may sleep during the remaining symbols of the slot. Similarly, in 3GPP NR Rel. 15, the UE monitors for PDCCH on the configured monitoring occasion in the DRX ON state. It can go to sleep during the other symbols. But in both systems, the UE must monitor the PDCCH on the next occasion within the ON Duration and during the duration of the DrxInactivityTimer; so, the micro-sleep is short.

Power Saving Mechanisms in 3GPP NR Rel.15: 3GPP NR Rel. 15 introduced some tools to improve power utilization at the UE. For example, adaptation of UE operation between narrow and wide BWPs enables UE to receive PDCCH in a narrow CORESET and conserve power but dynamically receive PDSCH/PUSCH in a wider BWP and then return to the narrow BWP when it does not have a grant.

Another feature called cross-slot scheduling allows a UE to receive a PDCCH grant in a slot but have grant resources in another slot; this allows more processing time for the UE and it can reduce its power utilization compared to same-slot scheduling.

SUMMARY

In the following discussions, the signal used to send the UE to micro-sleep maybe referred to as a go-to-sleep (GTS) signal. The signal used to wake-up a UE that is in sleep mode is referred to as a wake-up signal. The wake-up and GTS signals are referred to a power savings signal in the remainder of the discussions. Although specific examples may apply to the wake-up signal or GTS, the solutions applicable to one signal may also apply to the other signal.

Disclosed herein are methods, systems, and devices that may assist in power saving in NR. The system may enable power savings during the CDRX cycle of the RRC_CONNECTED state of the UE and power savings when monitoring paging occasions during RRC IDLE and INACTIVE states. Below are examples:

UE may enter the micro-sleep state for extended duration in the CDRX cycle. In micro-sleep state, the UE may not monitor PDCCH during OnDuration. In micro-sleep state, the UE may not monitor PDCCH when the DrxInactivity-Timer has not expired.

Micro-sleep may imply a low-power state with minimal monitoring on a narrow BWP. UE may monitor PDCCH or a trigger on a narrow BWP. UE may process the granted resources (receives PDSCH/transmits PUSCH) on a wide BWP. UE may return to narrow BWP by default after processing the granted resources.

UE may set a microsleepTimer and decrements it as it micro-sleeps. When the timer expires, the UE may return to a wide BWP.

UE may have semi-static configuration of micro-sleep duration during which it need not monitor its PDCCH monitoring occasions. UE has a valid-monitoring-window when it monitors for PDCCH. UE has micro-sleep window when it micro-sleeps. UE has alternating valid-monitoring-window and micro-sleep window. No explicit indication is required for sleep/wake-up.

UE may be RRC configured to micro-sleep in the duration between the DCI giving the grant and its granted resources.

UE may be RRC configured to micro-sleep for a fixed duration following the granted resources (for PDSCH/PUSCH).

UE receives dynamic indication of micro-sleep duration through the power-signal PDCCH, such as through the RNTI or PDCCH resource location.

UE is activated with the Micro-sleep BWP where it can micro-sleep until the bwpInactivitytimer expires.

UE may have multiple micro-sleep BWPs to support different sleep durations.

UE may enter a micro-sleep BWP in one of the following ways: 1) Through activation DCI for micro-sleep BWP; 2) On expiration of BWPInactivityTimer for a wider BWP; or 3) On completion of processing granted resources (PUSCH/PDSCH).

UE may have reduced blind decoding if the Aggregation level or PDCCH location in the CORESET are fixed for certain duration of time.

Micro-sleep may be indicated as a slot-format through DCI. It may be indicated through group common PDCCH or a UE-Specific DCI.

Power saving signals such as go-to-sleep (GTS) or wake-up signals may be indicated through a GC-PDCCH or UE-specific PDCCH. A single DCI may be used to indicate the wake-up or the GTS state depending on the content of its payload. Alternatively, DCIs with one format may be used for signaling GTS and another format may be used for indicating the wake-up state.

The wake-up signal may occur prior to OnDuration of a DRX cycle in a pre-onDuration-Window (POW) whose monitoring period is configured to the UE.

The wake-up signal may occur during the OnDuration of a DRX cycle or in the active time of the DRX cycle.

The UE may perform aperiodic reporting or synchronization between the POW and the DRX OnDuration.

The power saving signal may provide activation or deactivation of certain CORESETs or search spaces or dynamic DRX parameters.

The DMRS in a grant may be used as GTS signal. Change in the DMRS configuration may indicate the last grant after which the UE may micro-sleep during the DRXInactivty-Timer.

The power saving signal may indicate the BWP that UE must wake-up on and perform monitoring during the OnDuration.

Multiple power savings States (PSC) may be configured for the UE. An active PSC may be indicated to the UE through RRC or MAC CE or an L1 signaling such as the wake-up signal. A PSC may define a set of BWPs, DRX parameters which can be per BWP, TDRA table which can be per BWP, etc.

If different minimum K0 values are configured for BWP1 and BWP2 and UE must switch from one BWP1 to BWP2, it uses K0 values according to the TDRA definitions for BWP1 for the first grant in BWP2.

A default PSCD may be defined for UE. The UE switches from a non-default PSC, PSC1 to PSCD on expiration of a timer.

A UE may monitor an SCell in the "dormant state" with minimal or no PDCCH monitoring for power savings. The UE may transition its monitoring of the SCell to the activate state or deactivated state using an RRC or MAC CE based command or L1 signaling which may be received on that SCell or another cell such as the PCell or PSCell or another SCell.

The UE may transition from the active state to the dormant state when a timer set in the active state expires.

The UE may transition from the dormant state to a deactivated state when a timer set in the dormant state expires.

The UE autonomously activate dormant state cells when it sends an SR. The number of activated cells and the identity of the activated cells may depend on the type of traffic UE must support and the UE's BSR.

The UE may report the autonomously activated cells to the gNB. Alternatively, the gNB may preconfigure S SCells to be activated for a given BSR value.

The UE may bundle S cells together such that certain behavior on one cell triggers certain behavior on the other cell sin the bundle. For example, a power savings signal may put the PCell into micro-sleep. This trigger the SCells in the bundle (with PCell) to also go to micro-sleep.

A wake-up signal on one Cell may trigger dormancy-to-active transition on a bundled cell.

A wake-up signal on one Cell may trigger deactivated-to-dormant state transition on a bundled cell.

A GTS on one cell may trigger dormancy-to-deactivated state transition on a bundled cell.

A GTS on one cell may trigger micro-sleep on a bundled cell.

A GTS on one cell may trigger active-to-dormancy state transition on a bundled cell.

BWP switching on once cell may trigger a corresponding BWP switching on a bundled cell.

A PSC activation on one cell may trigger activation of a corresponding PSC on a bundled cell.

UE-specific paging DCI may be used to reduce the false paging alarm where the DCI payload carries some bits of the UE ID and the DCI is scrambled with the other bits of the UE ID.

A wake-up or signal GTS such as OOK may be used to indicate if a UE must wake-up or go to sleep at the start of a paging occasion.

Multiple paging RNTIs may be introduced such that a UE ID maps to one or more of the paging RNTIs. If a UE receives a paging DCI scrambled with one of the paging RNTIs, it monitors the paging PDSCH.

Disclosed herein are methods, systems, and devices that may assist in enabling SCell activation, deactivation from a dormant state.

Disclosed herein are methods, systems, and devices that may assist in enabling bundled operation across multiple cells.

Disclosed herein are methods, systems, and devices that may assist in enabling power savings in IDLE and INACTIVE state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 1A illustrates exemplary micro-sleep pattern in UE-Legacy systems

FIG. 1B illustrates exemplary micro-sleep pattern in UE-Disclosed extended-sleep by skipping certain monitoring occasions;

FIG. 6A illustrates exemplary indication of micro-sleep duration—as offset from PDCCH monitoring occasion;

FIG. 6B illustrates exemplary indication of micro-sleep duration—as offset from start of granted resource;

FIG. 7A illustrates exemplary activation of Micro-sleep BWP, $BWP_{MS,m}$ through DCI-UE switches to $BWP_D$ when it exits $BWP_{MS,m}$;

FIG. 7B illustrates exemplary activation of Micro-sleep BWP, $BWP_{MS,m}$ through DCI-UE returns to $BWP_W$ when it exits $BWP_{MS,m}$;

FIG. 13A illustrates exemplary monitoring the power savings signal in the POW—Monitoring in default BWP and switching to active BWP;

FIG. 13B illustrates exemplary monitoring the power savings signal in the POW—Monitoring in active BWP;

FIG. 39 illustrates exemplary fields and locations of the fields within the DCI;

DETAILED DESCRIPTION

Figure 2A:
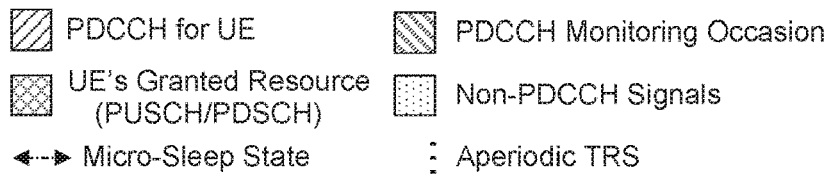
FIG. 2A illustrates exemplary micro-sleep with minimal monitoring—on BWPD for $BWP_W$ activation.
Figure 2A:
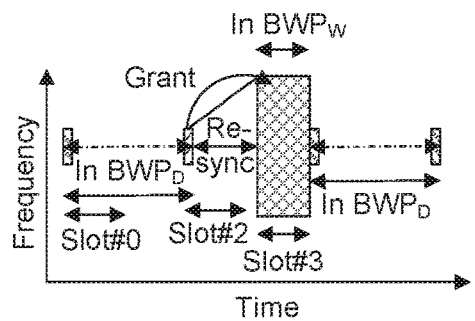

Micro sleep extension in RRC_CONNECTED state issue. It is established that successive UL grants, successive DL grants and successive UL-DL or successive DL-UL grants typically occur sparsely. The average duration between 2 UL grants is 10 ms, between 2 DL grants is 14 ms, and between a UL-DL grant is 6 ms. NR should consider ways to extend the micro-sleep duration during CDRX of the RRC-CONNECTED state of the UE by exploiting the duration between consecutive scheduling. It is well understood that PDCCH monitoring is a significant contributor to baseband power consumption. Frequency of monitoring, number of hypotheses to blind decode and bandwidth of the CORESET are all contributing factors. NR should consider ways to rapidly adapt PDCCH monitoring to traffic conditions to enable efficient micro-sleep.

Power savings on the SCell issue. In conventional situations, UE's power consumption on SCell may be significant during the state when an SCell is activated. As the activation and deactivation of an SCell occurs through the MAC CE, it is not dynamic and is a relatively slow process, taking several 10s of milliseconds. It is desired to make the activation and deactivation more dynamic so that the UE may quickly adapt its power consumption to the traffic load. So, any approach is disclosed herein to address power consumption during monitoring on the SCell.

Power consumption during paging issue. Conventionally, in the IDLE and INACTIVE states, the UE may perform cell measurements and monitor for the paging DCI. When monitoring for the paging DCI, the UE may monitor multiple beams (if it can receive multiple beams). If there is no paging DCI, it may go to sleep. If there is a paging DCI, it decodes the PDSCH to see if it has been paged. If it has not been paged, e.g. it is a false paging alarm, it may go to sleep. In a heavily loaded cell, false paging alarm rate can be high and can contribute to significant power consumption for the UE. Monitoring for the paging DCI in the paging occasions is also a factor in UE power consumption in the IDLE state.

Micro-sleep extension in RRC_CONNECTED state is disclosed herein. The gNB may introduce the "micro-sleep" state during the CDRX cycle in the RRC_CONNECTED state; micros-sleep can occur during the OnDuration or when the DrxInactivityTimer has not expired. The UE may micro-sleep during the time that it does not receive grants. For example, the UE may micro-sleep in the last few slots of a DrxInactivityTimer duration or during the PDCCH monitoring occasions between two successive grants. The micro-sleep enables the UE to turn off various components of its modem (RF, baseband and various power islands) and achieve power savings.

Unlike legacy systems like LTE and NR Rel.15, this disclosure enables the UE to skip monitoring certain configured monitoring occasions during the CDRX. FIG. 1A shows an example of micro-sleep in LTE and NR Rel.15; the UE has a CDRX OnDuration during which it receives a grant and sets it DrxInactivtyTimer and begins to decrement it. If the DrxInactivtyTimer has not expired, the UE monitors every monitoring occasion configured to it. It resets the timer on receiving a grant. If the UE does not have a grant or does not have to transmit PUCCH/SRS, or process CSI-RS, it may micro-sleep during those symbols of the slot. The power profile of the UE is shown in the figure; the UE monitors PDCCH on every slot in the OnDuration and duration of the DrxInactivtyTimer. Even if there is no traffic on several slots during the OnDuration or the duration of the DrxInactivtyTimer, the UE must be awake to monitor PDCCH.

FIG. 1B shows an example of the UE's timeline and power consumption for the micro-sleep disclosed herein; the UE has an extended micro-sleep across multiple slots during the duration of the DrxInactivtyTimer, e.g., it skips some monitoring occasions. By not waking up on every monitoring occasion within the CRDX duration, the UE saves more power. The extent of power savings in micro-sleep can vary depending on the duration of micro-sleep, frequency of ramp-up, functions to perform during the ramp-up (such as resynchronization), etc.

Micro-sleep with minimal monitoring: The micro-sleep state could be defined to support minimal monitoring, e.g., UE monitors some signals in a low power state. The UE may be equipped with a specialized low power state hardware for a lower power state signal monitoring. The lower power state signal (or equivalently micro-sleep indication) may be a binary state signal which indicates to the UE whether or not to be in micro sleep state; The frequency resource for this signal may be a "skinny" BWP which may be significantly narrower than the initial BWP or the default BWP.

Alternatively, minimal monitoring may occur in the form of PDCCH monitoring on a narrow BWP. Besides, the PDCCH monitoring period may be long to keep the power consumption low. The UE may be configured to use a specific aggregation level (AL) for the PDCCH or a specific PDCCH location to significantly reduce the number of blind-decoding hypotheses—this can be supported in low traffic modes, if large number of resources are available.

The UE may receive a DCI with a grant on the narrow BWP and it switches to a wide BWP to receive/transmit on the granted resources, e.g., the DCI activates a wide BWP. After processing the granted resources (PUSCH/PDSCH), the UE may return to the narrow BWP to continue monitoring PDCCH.

The concept is shown in FIG. 2A. Here the micro-sleep occurs on the narrow BWP which may be the default BWP and referred to as BWPD. The UE may monitor the PDCCH at the rate of once every 2 slots. When it receives a grant from the DCI, it switches to a wide BWP referred to as $BWP_W$. It receives PDSCH or transmits PUSCH on $BWP_W$. On completion, the UE returns to micro-sleep on BWPD. So, the UE may not wait for a deactivation DCI or for the bwpInactivitytimer to expire on the $BWP_W$ when it switches back to BWPD.

Alternatively, the UE may monitor a DL preamble or aperiodic CSI-RS or aperiodic TRS triggered through a DCI. On receiving this signal or trigger, UE may enter micro-sleep or wake-up. If aperiodic CSI-RS based trigger is used, the following procedures may apply: First, the sequence of the aperiodic CSI-RS indicates that the UE should sleep and the duration of the sleep. Secondly, the sequence of the CSI-RS indicates that the UE should wake-up in a particular BWP. Thirdly, on receiving the DCI trigger for aperiodic CSI-RS, the UE may sleep; it need not receive the aperiodic CSI-RS signal. In fact, the gNB may only transmit the triggering DCI but not the aperiodic CSI-RS. Furthermore, the UE may not need to transmit an aperiodic CSI-RS report for that trigger. And fourthly, the trigger for waking up the UE may be in the form of an aperiodic Tracking Reference Signal (TRS). On waking up, the UE can reacquire fine timing and frequency using the aperiodic TRS.

Figure 2B:
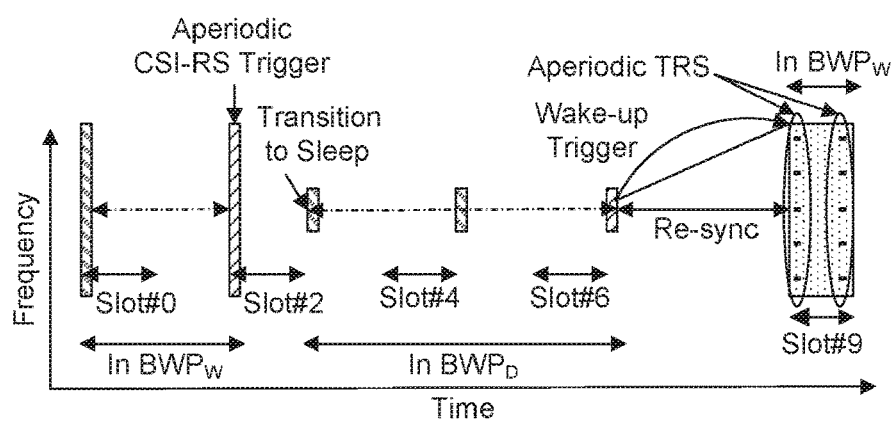
FIG. 2B illustrates exemplary micro-sleep with minimal monitoring—sleep and wake-up through aperiodic CSI-RS trigger.

The gNB may configure the sequences used for indicating micro-sleep and sleep duration, the sequences for wake-up, or the corresponding transmission resources through RRC to the UE. But the indication of micro-sleep or wake-up may come dynamically through the aperiodic CSI-RS trigger, or other physical layer control signal(s). The concept is shown in FIG. 2B. The UE may receive the aperiodic CSI-RS trigger on $BWP_W$ indicating it to micro-sleep for some duration. So, the UE may switch to BWPD and micro-sleep with minimal monitoring; it periodically monitors PDCCH for the wake-up trigger providing an aperiodic TRS. When the UE receives the trigger, it may switch back to $BWP_W$ and use the aperiodic TRS to fine tune its timing and frequency. In this scenario, the UE may rely on an explicit wake-up signal to wake-up.

Figure 2C:
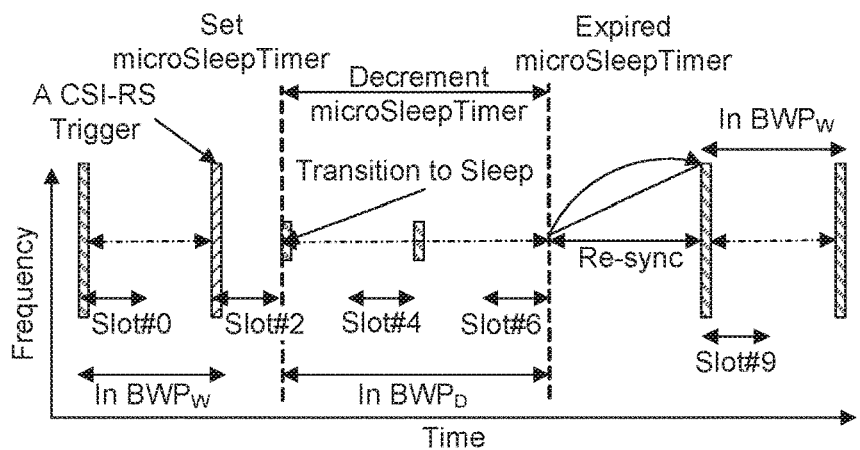
FIG. 2C illustrates exemplary micro-sleep with minimal monitoring—wake-up on expiration of microSleepTimer.

As an alternative, the UE may run a timer microSleepTimer for a certain duration. It sets the timer to a value configured through RRC, and a function of the triggered aperiodic CSI-RS. It may decrement the timer until it expires. On expiry, the UE may wake up. The UE may monitor $BWP_W$ or BWPD on wake-up. This concept is shown in FIG. 2C. Here the aperiodic CSI-RS sequence is tied to certain microSleepTimer duration which is configured to the UE through RRC. Depending on the indicated CSI-RS, the UE sets the microSleepTimer. It may wake up to monitor $BWP_W$.

Alternatively, the UE uses the specialized low power state hardware to monitor the micro-sleep signal in every PDCCH monitoring occasions during the time that include the time while the on-duration timer is running, or the inactivity timer is running or other active time periods. The UE may perform micro-sleep between PDCCH monitoring occasions if the micro-sleep signal bit is set to micro-sleep.

Adapting Micro-sleep by altering the monitoring period: One way to tailor micro-sleep to the traffic pattern is by adapting the PDCCH monitoring occasions, e.g., UE need not monitor certain occasions where a grant will not be received. The search space monitoring periodicity may be updated according to the traffic; it can be configured to be sparser but this reduces the scheduling flexibility of the gNB. Instead, the gNB has more flexibility if UE supports normal monitoring periodicity when a grant is likely to occur, so that there is finer granularity of opportunities for the gNB to transmit the DCI.

Figure 3A:
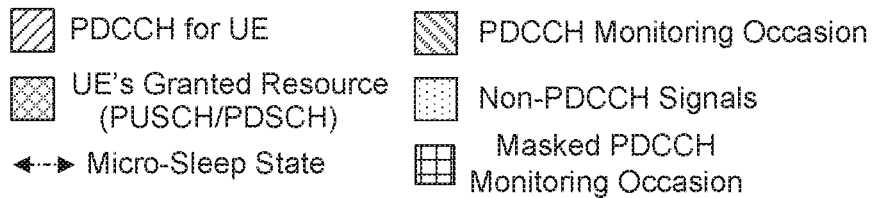
FIG. 3A illustrates exemplary monitoring periodicity of NR Rel.15 UE.
Figure 3A:
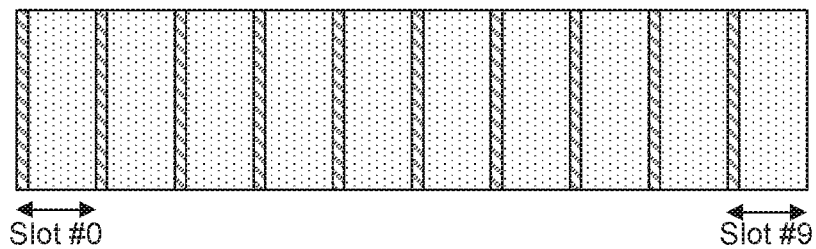
Figure 3B:
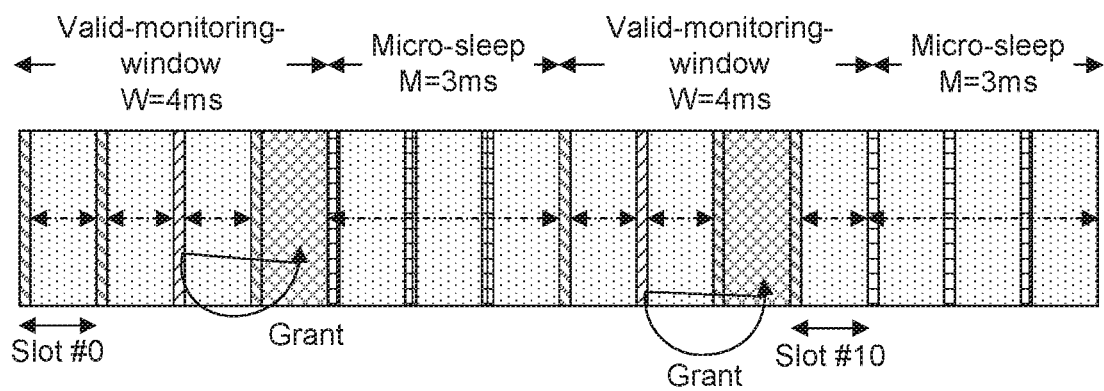
FIG. 3B illustrates exemplary disclosed monitoring with micro-sleep window and valid-monitoring-window.

Semi-static configuration of micro-sleep: The gNB may semi-statically configure micro-sleep parameters for the UE. Micro-sleep for M ms, referred to as a sleep-window, is supported. The UE may go to micro-sleep in the sleep-window. This is followed by PDCCH monitoring within a monitoring window of W ms, referred to as the valid-monitoring-window, e.g., the UE can expect to receive PDCCH providing a grant within the valid-monitoring-window. The sleep-window and valid-monitoring-window alternate for the UE. This operation may be applied especially in light traffic conditions, when resources are not in shortage, and the gNB has flexibility to manage the occurrence of the next PDCCH for the UE. This concept is shown in FIG. 3A and FIG. 3B. A UE not configured for micro-sleep has the PDCCH monitoring occasions as shown in FIG. 3A, e.g., the UE monitors every configured PDCCH monitoring occasion at the periodicity of 1 slot. Whereas, a UE configured with sleep-window and valid-monitoring-window has monitoring occasions as shown in FIG. 3B. The micro-sleep window is a mask applied to the monitoring occasions in the search space; it masks certain occasions from being monitored so that the UE can micro-sleep and save power.

Figure 4A:
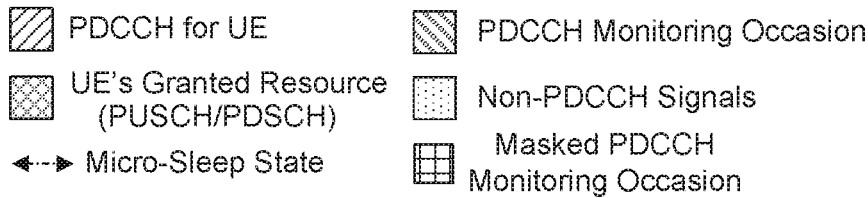
FIG. 4A illustrates exemplary micro-sleep based on reception of a grant-No PDCCH monitoring between the DCI and the granted resource.
Figure 4A:
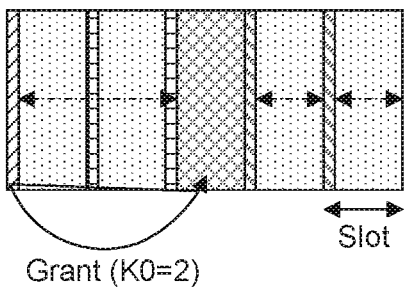

Grant-based Micro-sleep behavior: Furthermore, a UE behavior may be defined to support micro-sleep between the PDCCH giving a grant and the time of occurrence of the granted resources. This can be applied to scenarios of cross-slot grants where K0>0. The concept is shown in FIG. 4A where, the UE receives a grant with K0=2. The UE does not monitor the PDCCH occasions between the DCI and the granted resources.

Figure 4B:
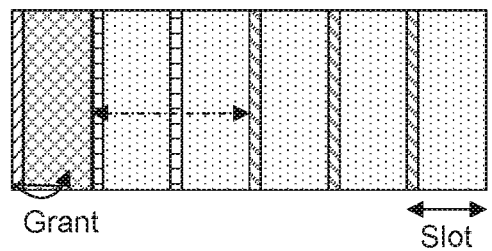
FIG. 4B illustrates exemplary micro-sleep based on reception of a grant-No PDCCH monitoring for 2 slots after the granted resource.

FIG. 4B shows another UE behavior wherein, the UE may micro-sleep over duration M ms immediately following the granted resources. Here M=2 ms; the UE does not monitor the PDCCH occasions in the 2 slots following the granted resources. After M ms, the UE wake up without the need for additional wake-up indication and continues to monitor PDCCH. These behaviors may be RRC configured to the UE using a flag (or other indicator) that indicates if the UE must follow such a micro-sleep procedure.

Figure 4C:
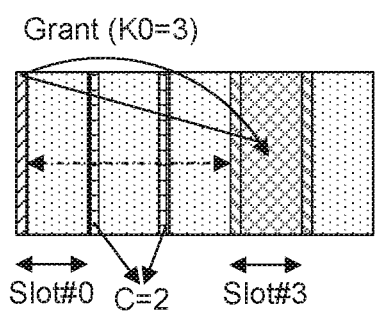
FIG. 4C illustrates exemplary micro-sleep based on reception of a grant-No PDCCH monitoring in C occasions after a DCI that provides a grant.

As another alternative to the case described in FIG. 4A, the UE may skip monitoring C PDCCH monitoring occasions after detecting a DCI carrying a valid non-zero grant for it or may skip monitoring the PDCCH occasions in S slots after detecting a DCI carrying a valid non-zero grant for it. The value of C or S may be RRC configured to the UE. The concept is shown in FIG. 4C, where the UE receives a cross-slot grant with K0=3 and C=2; so UE is not required to monitor PDCCH in 2 slots following the DCI. This allows the UE to wake up from a micro-sleep just in time to receive the PDCCH and PDSCH occurring together in slot #3.

Figure 4D:
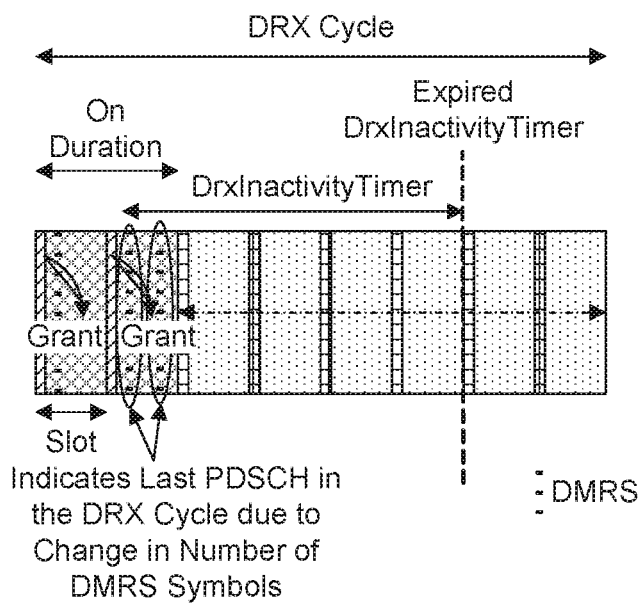
FIG. 4D illustrates exemplary micro-sleep based on reception of a grant-No PDCCH monitoring within the DRX cycle after the indication of the last PDSCH in DRX cycle.

The DMRS in a PDSCH may be used to indicate a potential last transmission in a CDRX cycle, so that the UE may sleep if it successfully decodes it; in this case, the UE may micro-sleep through the remainder of the DRX cycle even if the DRXInactivityTimer has not expired. The UE may wake up to start monitoring on the next DRX cycle. The DMRS may indicate the last transmission in the following ways. In a first way, a UE may be configured with maximum number of front-loaded DM-RS symbols for PDSCH as maxLength=2. The scheduling DCI indicates the number of front-loaded DMRS symbols dynamically through a DCI field. Disclosed herein is a UE procedure such that when the DCI indicates the value of number of front-loaded DMRS symbols as 'numFLDMRS', the UE may assume it is the last transmission in that C-DRX cycle. The parameter numFLDMRS may be configured to the UE through RRC signaling. For example, this mode of operation may be used only if an RRC parameter powerSavingsThroughDMRS is configured through RRC signaling to the UE. In another way, if the number of front-loaded DMRS symbols changes between two successive grants, the UE may read as an indication to sleep until the start of the next DRX cycle as shown in FIG. 4D.

Dynamic micro-sleep indication: The gNB may dynamically indicate the micro-sleep duration to the UE. The dynamic indication can come through following signal examples. In a first example, RNTI of the PDCCH may be masked with a sequence that indicates the micro-sleep window duration. The UE may decode the DCI with the candidate masks. If the DCI decodes successfully, the candidate mask is used to determine the micro-sleep duration. The masks and corresponding micro-sleep durations may be configured with the UE through RRC. The configuration could be cell-specific as all UEs may be configured at the same time with the same set of masks. In a second example, the starting location of the resource of the PDCCH may indicate the micro-sleep window parameter. The gNB may have more flexibility to support this in light traffic conditions.

Figure 5:
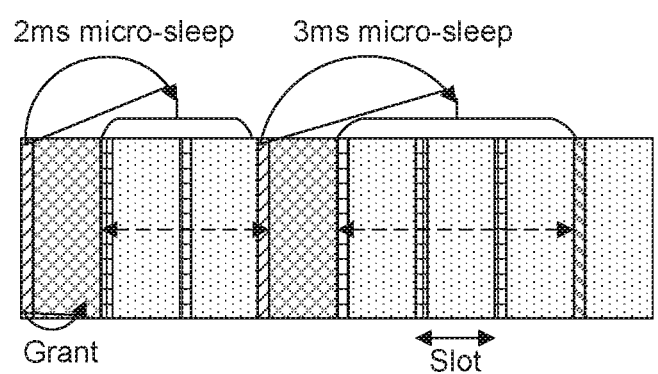
FIG. 5 illustrates exemplary dynamic indication of micro-sleep duration.

The procedure for dynamic indication is described below and illustrated in FIG. 5. The UE receives an indication dynamically to micro-sleep for a certain duration. The UE then wakes-up and continues to monitor the PDCCH. If the UE misses to decode a PDCCH, it may not go to micro-sleep. Other than the micro-sleep duration, the parameters associated with the indication could be following offsets as shown in FIG. 6A or FIG. 6B. First, offset from the start of the micro-sleep duration from the PDCCH monitoring occasion as shown in FIG. 6A. The offset may be in terms of slots or mini-slots. Second, offset from the start of the granted resources as shown in FIG. 6B. The offset may be in terms of slots or mini-slots.

The dynamic indication to wake-up or micro-sleep may also provide activation or deactivation of a CORESET or a search space for some duration. If a CORESET is activated, the UE may need to wake-up to monitor it. If a CORESET is deactivated, the UE may micro-sleep; then the UE need not monitor that CORESET and may micro-sleep when possible during the duration of the CORESET. A field may be present in the power saving signal (if it is a DCI) indicating the impacted CORESET and the its activation, deactivation status. If the UE has a single CORESET configured in the C-DRX ONDuration, then one bit is sufficient to denote its activation and deactivation.

If a UE supports both eMBB and URLLC traffic, it may be configured with a search-space of high periodicity to allow frequent monitoring of URLLC grants. If the gNB determines that the UE does not have URLLC traffic in the short term, it may signal the UE to deactivate that search space. Activation and deactivation of CORESETs and search spaces may come through the wake-up signal or GTS on L1. An UL or DL grant may also be used to indicate activation or deactivation of a CORESET or search space.

A field may be introduced in the DCI providing the grant to indicate the activation and deactivation for a CORESET or search space.

CORESET activation/deactivation and search space activation/deactivation may also be enabled through MAC CE.

Micro-sleep activation through a "Micro-sleep BWP": A UE may micro-sleep in a BWP without resources—such a BWP is referred to as micro-sleep BWP. Activation of micro-sleep BWP can be done through a DCI with format such as 0_0 or 0_1 or 1_0 or 1_1 and scrambled with the UE's C-RNTI and by indicating the BWP ID (bwp-ID). BWP is active. On switching to the micro-sleep BWP, the UE may set the timer BWPInactivityTimer with an RRC configured value and decrements the timer. As no resources are allowed for this BWP, there may be no CORESET to monitor; so, the UE may have extended micro-sleep for the duration of this timer. Note that the micro-sleep BWP may not be deactivated through DCI as there may be no resources in this BWP.

Multiple micro-sleep BWPs: A UE may be configured through RRC with M micro-sleep BWPs, each with a different value for the BWPInactivityTimer; this may give flexibility to the gNB to schedule a different duration of micro-sleep to the UE depending on the traffic conditions, UE's power sensitivity, user load, etc. Currently in NR, a single value of bwp-InactivityTimer is RRC configured for all BWPs of a UE. However, different values of bwp-InactivityTimer are supported for the M micro-sleep BWPs. So, the BWP information element may be given by the following, such as in Table 1.

TABLE 1

| BWP information element |
|---|
| -- ASN1START |
| -- TAG-BANDWIDTH-PART-START |
| BWP ::=                                       SEQUENCE { |
|   locationAndBandwidth             NULL, |
|   subcarrierSpacing                NULL, |
|   cyclicPrefix                     NULL |
|   OPTIONAL           -- Need R |
| } |
| BWP-Downlink ::=                              SEQUENCE { |
|   bp-Id                            BWP-Id, |
|   bwp-InactivityTimer              ENUMERATED {ms2, ms3, ms4, ms5, ms6, ms8, ms10, ms20, |
|       ms30,ms40,ms50, ms60, ms80, ms100, ms200, |
|       ms300, ms500, ms750, ms1280, ms1920, ms2560, |
|       spare10, spare9, spare8, spare7, spare6, |
|       spare5, spare4, spare3, spare2, spare1 |
|   } |
|       OPTIONAL, |
|   bp-Common                        BWP-DownlinkCommon |
|     OPTIONAL,            -- Need M |
|   bwp-Dedicated                    BWP-DownlinkDedicated |
|     OPTIONAL,            -- Need M |
|   ... |
| } |
| BWP-Uplink ::=                                SEQUENCE { |
|   bwp-Id                           BWP-Id, |
|   bwp-InactivityTimer              ENUMERATED {ms2, ms3, ms4, ms5, ms6, ms8, ms10, ms20, |
|       ms30,ms40,ms50, ms60, ms80, ms100, ms200, |
|       ms300, ms500, ms750, ms1280, ms1920, ms2560, |
|       spare10, spare9, spare8, spare7, spare6, |
|       spare5, spare4, spare3, spare2, spare1 |
|   } |
|       OPTIONAL, |
|   bwp-Common                       BWP-UplinkCommon |
|     OPTIONAL,            -- Need M |
|   bp-Dedicated                     BWP-UplinkDedicated |
|     OPTIONAL,            -- Need M |
|   ... |
| } |
| -- TAG-BANDWIDTH-PART-STOP |
| -- ASN1STOP |

Existing procedures for BWP can be used to put the UE in the micro-sleep state during the duration when micro-sleep The bwp-InactivityTimer parameter is configured in the BWP-Uplink or BWP-Downlink for BWP-Ids that correspond to micro-sleep BWPs. This value may override that from the ServingCellConfig Information Element for the micro-sleep BWPs.

UE procedure for operating in a micro-sleep BWP: The switch to micro-sleep may be triggered by one of the following mechanisms, each of which is further described in more detail herein: 1) Micro-sleep in $BWP_{MS,m}$ though activation DCI; 2) Micro-sleep in $BWP_{MS,m}$ on BWPInactivityTimer expiration on $BWP_W$; or 3) Micro-sleep in $BWP_{MS,m}$ following the processing of granted resources.

The terminology BWPg may be used to refer to a general BWP of the UE. BWPg may be a default BWP BWPD or a wide BWP BWPW.

Micro-sleep in $BWP_{MS,m}$ though activation DCI: The UE may receive an activation DCI on $BWP_g$ for the $m^{th}$ micro-sleep BWP, $BWP_{MS,m}$. The UE may enter the micro-sleep state and set the BWPInactivityTimer according to the configuration for $BWP_{MS,m}$ and then may decrement it. As the UE cannot receive PDCCH in $BWP_{MS,m}$ to activate/deactivate a BWP, the UE may stay in this state until the BWPInactivityTimer expires. Then the UE may perform one of the following procedures. In a first example procedure with reference to FIG. 7A, when BWPInactivityTimer expires in $BWP_{MS,m}$, the UE may switch to BWPD and may monitor PDCCH on the default BWP, which may be like minimal monitoring in micro-sleep. The UE may ignore the resource allocation fields in the activation DCI when it identifies the bwp-ID as that of a micro-sleep BWP. The concept is shown in FIG. 7A where the UE monitors PDCCH on $BWP_W$ and may receive activation DCI for $BWP_{MS,m}$ with K0=0. So, the UE may start micro-sleep in the same slot, e.g., switches to $BWP_{MS,m}$ and stays there until its BWPInactivityTimer expires. On expiration, the UE may switch to BWPD. In a second example procedure with reference to FIG. 7B, when BWPInactivityTimer expires in $BWP_{MS,m}$, the UE may return to $BWP_g$. The concept is shown in FIG. 7B where the UE monitors PDCCH on $BWP_W$ and receives activation DCI for $BWP_{MS,m}$ with K0=0. So, the UE may switch in the same slot to $BWP_{MS,m}$ and may stay there until its BWPInactivityTimer expires. On expiration, the UE may return to $BWP_W$. If the UE failed to decode the activation DCI, the result may not be catastrophic; the UE may spend more energy by not going to the micro-sleep state but stays on $BWP_g$. On returning to $BWP_g$ after BWPInactivityTimer expires in $BWP_{MS,m}$, the UE may handle the BWPInactivityTimer on $BWP_g$ in the following exemplary ways. In a first way, the BWPInactivityTimer is set for $BWP_g$ and started. In a second way, the UE may save the BWPInactivityTimer's value $t_g$ at the time of switching to $BWP_{MS,m}$. The UE may set the BWPInactivityTimer to $t_g$ on switching back to $BWP_g$ after the micro-sleep. In a third way, the UE may save the BWPInactivityTimer's value $t_g$ at the time of switching to $BWP_{MS,m}$. The UE may set the BWPInactivityTimer to $t_g$-$t_{elapsed}$ on switching back to $BWP_g$ after the micro-sleep. $t_{elapsed}$ is the total time that elapsed between switching to $BWP_{MS,m}$ and switching back to $BWP_g$.

Figure 8:
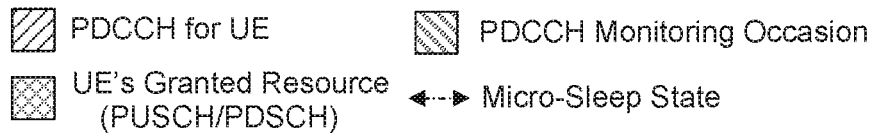
FIG. 8 illustrates exemplary activation of Micro-sleep BWP, $BWP_{MS,m}$ on expiration of BWPInactivityTimer for $BWP_W$; UE returns to BWPD when its exits $BWP_{MS,m}$.
Figure 8:
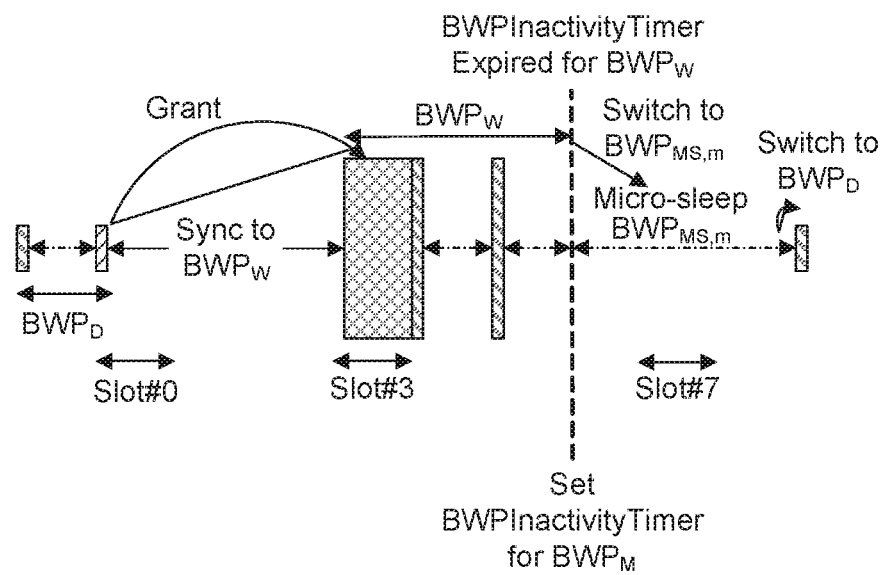

Micro-sleep in $BWP_{MS,m}$ on BWPInactivityTimer expiration on $BWP_W$: The UE's BWPInactivityTimer on $BWP_W$ may trigger the UE to switch to $BWP_{MS,m}$. The gNB may configure the $BWP_{MS,m}$ to be used for a given $BWP_W$. The concept is shown in FIG. 8, where $BWP_W$ is activated to the UE through a DCI on BWPD. The UE's BWPInactivityTimer set for $BWP_W$ expires, upon which the UE transitions to $BWP_{MS,m}$. Here it sets the BWPInactivityTimer according to the configuration for $BWP_{MS,m}$ and starts it. When the timer expires, the UE may switch to BWPD. In this case, the scheduling may typically occur in BWPD but the granted resource may be received and processed in the wider $BWP_W$.

Figure 9:
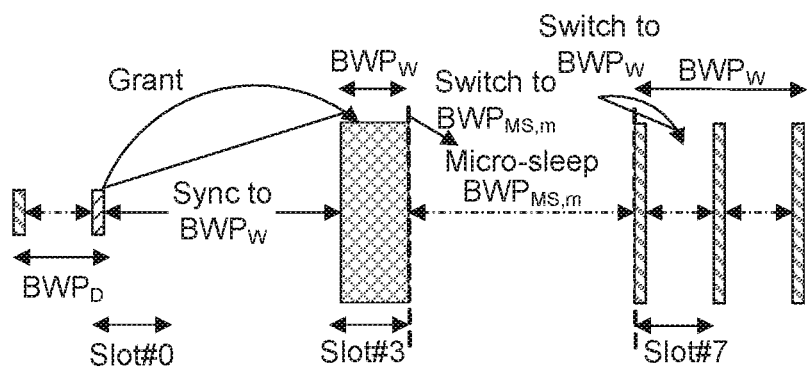
FIG. 9 illustrates exemplary activation of Micro-sleep BWP, $BWP_{MS,m}$ on completion of processing of granted resource (PDSCH/PUSCH); UE returns to $BWP_W$ when its exits $BWP_{MS,m}$.

Micro-sleep in $BWP_{MS,m}$ following the processing of granted resources: When the UE completes the processing of a PDSCH or a PUSCH transmission, the UE may automatically switch to a $BWP_{MS,m}$. The gNB may configure the $BWP_{MS,m}$ to be used for a given $BWP_W$. The concept is shown in FIG. 9, where the UE completes processing the granted resources on $BWP_W$. Then the UE may automatically switch to $BWP_{MS,m}$. When the BWPInactivityTimer expires on $BWP_{MS,m}$, the UE switches back to $BWP_W$. On returning to $BWP_W$, the UE may handle the BWPInactivityTimer in the following ways. In a first way, the BWPInactivityTimer may be set as per the configuration for $BWP_W$ and started. In a second way, the UE may save the BWPInactivityTimer's value $t_g$ at the time of switching to $BWP_{MS,m}$. The UE may set the BWPInactivityTimer to $t_g$ on switching back to $BWP_W$ after the micro-sleep. In a third way, the UE may save the BWPInactivityTimer's value $t_g$ at the time of switching to $BWP_{MS,m}$. The UE may set the BWPInactivityTimer to $t_g$-$t_{elapsed}$ on switching back to $BWP_W$ after the micro-sleep. $t_{elapsed}$ is the total time that elapsed between switching to $BWP_{MS,m}$ and switching back to $BWP_W$.

UE behavior during $BWP_{MS,m}$: In NR, when a specific BWP is activated, the UE must switch to it. However, disclosed herein are procedures that may be more flexible for micro-sleep BWPs. The UE may consider an indication to switch only as a recommendation to switch to the micro-sleep BWP. The UE may do one of the following procedures when it is recommended to switch to a $BWP_{MS,m}$. A first procedure may include, the UE switching to $BWP_{MS,m}$ and staying in micro-sleep until its timer expires. A second procedure may include a UE remaining on the current BWP (it may be the active BWP, for example, $BWP_W$ or BWPD) for some or all of the duration of the timer of $BWP_{MS,m}$. Then it may continue to perform the procedure that it would have done if it had switched to and exited $BWP_{MS,m}$. For example, UE may do CSI-RS measurements on $BWP_W$ even though it received the indication to switch to $BWP_{MS,m}$. A third procedure may include, a UE may switch to another BWP for doing measurements for some or all of the duration of the timer of $BWP_{MS,m}$. Then it may continue to perform the procedure that it would have done if it had switched to and exited $BWP_{MS,m}$.

It is expected that the UE is not required to do CSI-RS measurement or certain PUCCH transmissions such as periodic CSI-RS reporting. UE may also not be expected to do SR transmission during the micro-sleep in $BWP_{MS,m}$. However, if UE has SR resources configured on certain BWP such as BWPD during the duration of $BWP_{MS,m}$, the UE may stay awake and transmit SR on it.

Power savings through reduced blind decoding: Currently, NR Rel. 15 defines certain aggregation levels (AL) for a search space; the UE blindly decodes the candidates with the configured ALs to detect the DCI. Supported herein is a UE behavior where the UE may assume that the AL of the PDCCH of time 'T' that was successfully decoded is applicable for PDCCH occurring up to time T+Δt. So, the UE need not try other AL hypotheses for PDCCH monitoring occasions within time Δt. Δt is configured to the UE through RRC. This may be supported when sufficient resources are available and traffic is low in the system.

Figure 10:
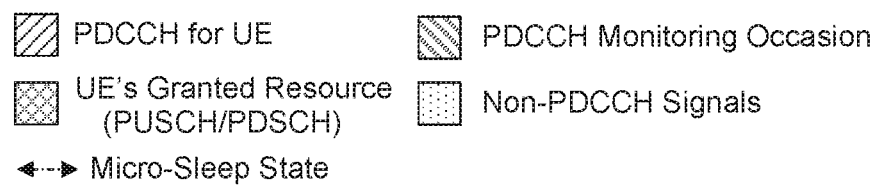
FIG. 10 illustrates exemplary reducing the blind decoding hypotheses by having same PDCCH AL and PDCCH location L within time Δt.
Figure 10:
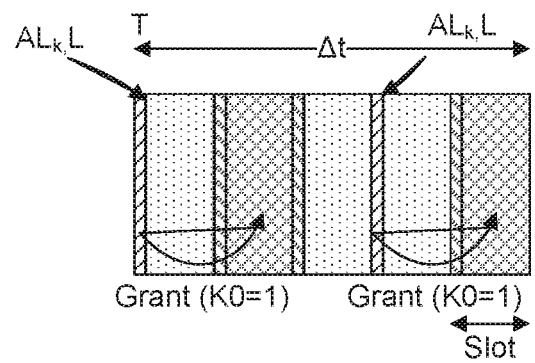

Similarly, if the UE detected a PDCCH candidate of certain AL at time T with starting frequency resource location L (in the 1st symbol of the CORESET), it may assume the same location L and AL for the duration. At, so that it only needs to decode one candidate in the duration. At each monitoring occasion. This is shown in FIG. 10, where the AL and L detected in PDCCH at time T applies to all PDCCH within T+Δt.

Indication of micro-sleep as a slot format: Supported herein is an indication of micro-sleep in the form of a slot format. The indication to micro-sleep can come through the format 2_0 DCI scrambled with SFI-RNTI. The slot format is defined by an index into a table of formats for DL, UL and flexible symbols denoted by 'D', 'U' and 'X' respectively in 3GPP NR Rel. 15 specification. The SFI-RNTI provides the slot format for N slots by indicating the index for each of the N slots.

Introduced herein is a new type of symbol 'M' in the slot-format which indicates that the UE can micro-sleep in that symbol. The DCI of format 2_0 with SFI-RNTI can indicate the index of the new slot format with entries of 'M'. On receiving the DCI, the UEs configured with SFI-RNTI may enter micro-sleep on the symbols indicated by the DCI. As SFI-RNTI is a group common PDCCH, this disclosure allows for micro-sleep indication in a multicast manner.

Some examples of slot formats with symbols marked with the state 'M' are given in Table 2. The whole slot can be indicated for micro-sleep or a mini-slot may be indicated for micro-sleep.

The index is currently 8 bits in 3GPP Rel.15 for slot format indication, but not all values of the index are defined. So, introducing new slot formats with state 'M' can reuse the undefined entries for the slot format and no extra bits are required.

This type of indication helps to manage micro-sleep at finer resolutions. Especially if a UE is configured with multiple monitoring occasions in a slot, the UE's micro-sleep cannot be long and deep as it has to wake up multiple times in the duration of the slot to monitor the PDCCH. This approach provides the ability to set the micro-sleep at a finer granularity of symbol level, so that micro-sleep can be managed at mini-slot resolutions.

TABLE 2

Slot formats with micro-sleep state 'M' for normal cyclic prefix.

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 100 | M | M | M | M | M | M | M | M | M | M | M | M | M | M |
| 101 | D | M | M | M | M | M | M | M | M | M | M | M | M | M |
| 102 | D | D | M | M | M | M | M | M | M | M | M | M | M | M |
| 103 | D | D | D | M | M | M | M | M | M | M | M | M | M | M |

TABLE 2-continued

Slot formats with micro-sleep state 'M' for normal cyclic prefix.

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 104 | D | D | D | D | D | D | D | M | M | M | M | M | M | M |
| 105 | M | M | M | M | M | M | M | M | M | M | M | M | U | U |
| 106 | M | M | M | M | M | M | M | U | U | U | U | U | U | U |

Alternatively, a new UE specific DCI scrambled with the C-RNTI may be introduced to indicate the slot-format with micro-sleep indication. For example, the UE may receive the SFI for micro-sleep on format 2_0 DCI using C-RNTI instead of the SFI-RNTI. This DCI may be received in the common search space similar to that of the SFI-RNTI. Alternatively, this DCI may be scrambled with another RNTI called microsleep-RNTI "MS-RNTI" that is configured to the UE through RRC. MS-RNTI may be configured to be common to multiple UEs.

The gNB may transmit a subsequent SFI-RNTI with states that may conflict with those received by the UE through C-RNTI or MS-RNTI based micro-sleep indication. Alternatively, gNB may provide UE-specific grants that conflict with micro-sleep pattern from a prior indication. In this case the following predefined rules may be used to determine if 'M' can be overwritten by other states in SFI-RNTI or by the grants. In a first rule, UE used the override from SFI-RNTI if the override occurs is at least 'R' symbols away from the time the SFI-RNTI is received. This ensures that the UE has enough time to react to the override. In a second rule, if D overrides M, explicitly (through SFI-RNTI) or implicitly (through a DL grant), the UE follows the most recent control signaling and treats it as Tr. In a third rule, if 'U' overrides 'M', explicitly (through SFI-RNTI) or implicitly (through an UL grant), the UE follows the most recent control signaling and treats it as 'U'.

Often the UE needs to micro-sleep for multiple symbols at a time. Disclosed herein is an indication through the SFI DCI that may be reinterpreted by the UE to imply that one symbol in the table indicates multiple adjacent symbols (mini-slot) or slots to the UE. This allows the DCI to indicate the micro-sleep status for multiple mini-slots or slots using a single index. Some examples are shown in Table 3. Here half a slot is denoted by a single state. When the state is X, it implies that the SFI indication must be used for that half slot. When the state is M, the UE may micro-sleep in that half slot.

TABLE 3

Slot formats with states representing half a slot

| | Symbols in a slot | | | | | | | | | | | | | |
|---|---|---|---|---|---|---|---|---|---|---|---|---|---|---|
| | 0-6 | 7-13 | 0-6 | 7-13 | 0-6 | 7-13 | 0-6 | 7-13 | 0-6 | 7-13 | 0-6 | 7-13 | 0-6 | 7-13 |
| | Slot | Slot | Slot | Slot | Slot | Slot | Slot | Slot | Slot | Slot | Slot | Slot | Slot | Slot |
| Format | 1 | 1 | 2 | 2 | 3 | 3 | 4 | 4 | 5 | 5 | 6 | 6 | 7 | 7 |
| 100 | X | X | X | X | X | M | M | M | M | M | M | M | M | M |

To minimize the blind decoding, further disclosed herein is this DCI indicating the micro-sleep in the slot format that may be transmitted only in the first K monitoring occasions within the OnDuration. K=1 may be a typical use case, where the UE monitors for this DCI only in the first occasion within the OnDuration.

Subsequently, the DCI may be transmitted when the DrxInactivtyTimer has not expired, outside the OnDuration. The DCI may be transmitted periodically with period P that may be less than that of the monitoring periodicity of its search space. The value of P is configured to the UE through RRC.

The DCI may provide the micro-sleep pattern for the duration of the entire C-DRX cycle.

If a UE has a grant or has to do measurement or transmit SR or SRS or PRACH, the UE may stay wake to process that function even if the SFI indicates 'M' on those symbols.

UE Assisted Micro-Sleep: The UE may provide assistance information to the NB, so that the NB can properly configure the UE for micro-sleep. For e.g., the UE may signal the NB, its micro-sleep support capability information. Such information may indicate to the NB whether or not the UE supports micro-sleep feature. Furthermore, such information may include support for one or more of the methods described herein. The UE may also signal to the NB, its preferences for micro-sleep. For example, a UE with battery level below a minimum threshold, may indicate to the NB, that it would like to be put into micro-sleep mode. Similarly, a UE with battery level above a certain maximum threshold or connected to a power source may indicate to the NB, that it would like to be taken out from micro-sleep mode or it doesn't want to be put into micro-sleep mode.

The UE may offer to the user a Graphical User Interface (GUI) that allows the users to set preferences that controls micro-sleep. For e.g., a lower power mode setting or battery saving setting by the user on the UE GUI may result in exchanges between the UE and the NB, and the NB ordering the UE to perform micro-sleep.

On-off keying (OOK) based power savings signal: A simple OOK signal may be used as a wake-up signal preamble. A simple receiver may be required to do envelope detection of OOK, potentially in the time domain and power consumption is likely to be minimal for monitoring such a signal. An analog only receiver may be used to monitor an OOK signal and wake-up section of the digital modem when it positively detects the OOK signal, e.g., the detected power exceeds certain threshold or a correlation exceeds certain threshold. Alternatively, the OOK signal may be multiplexed with the channels in the time-frequency resource grid of OFDM symbols. The OOK signal for wake-up or sleep indication in the RRC CONNECTED state may be preconfigured to the UE through RRC signaling.

The OOK signals may be UE-specific or common to multiple UEs. A UE wake-up when it receives a wake-up-OOK configured to it. A UE micro-sleeps when it receives a GTS-OOK configured to it. UE-specific OOK signals may provide more optimal power savings by reducing false wake-up alarms but if the number of resources are limited, multiple UEs may share the same OOK.

A UE may also be configured with multiple wake-up-OOKs. If it receives any one of the OOK signals it may wake-up. Alternatively, if it receives all the wake-up OOKs within a predefined period of time, only then it wakes-up. Alternatively, if it receives at least W of Z configured OOKs, then it wakes up. These methods provide different levels of robustness against false wake-up alarms, thereby optimizing power savings to different extents.

In configuring an OOK signal, the gNB may provide the sequence, frequency resources, and monitoring window to the UE.

For NR-U, in order to satisfy the OCB requirement, The OOK may be mapped to enough REs that satisfy the frequency occupation requirement.

DRX and wake-up signal-Receiving wake-up signal during the OnDuration of a DRX cycle: The UE may wake up when its OnDuration occurs and monitors the wake-up signal. Here specifically considered is that the wake-up signal may be in the form of a PDCCH, although other signals such as DMRS, CSI-RS, SSS, PSS, or a preamble may be used as a power savings signal. The first PDCCH monitoring occasion may be used to indicate that the UE must stay awake to monitor PDCCH in the remaining OnDuration. If the UE detects a wake-up signal PDCCH, it recognizes that it must wake up, otherwise, the UE may go to sleep and does not monitor other occasions in the OnDuration. So, a PDCCH in the first monitoring occasion of the OnDuration may act like a wake-up signal for the UE.

Figure 12A:
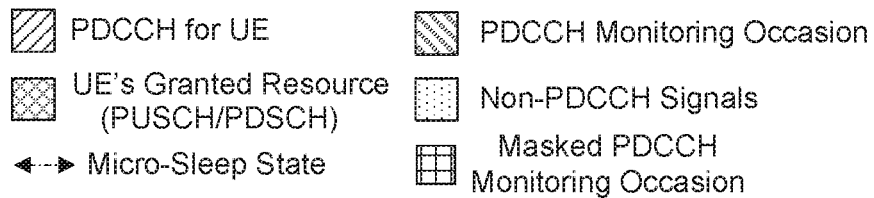
FIG. 12A illustrates exemplary PDCCH on first monitoring occasion in OnDuration as a wake-up signal—UE Behavior when it receives PDCCH.
Figure 12A:
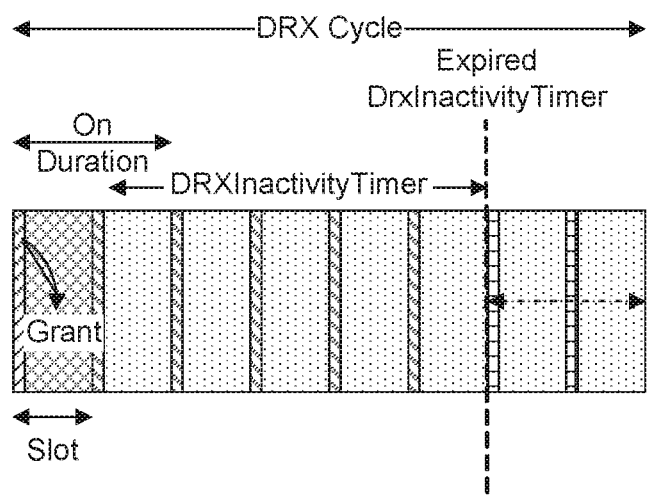
Figure 12B:
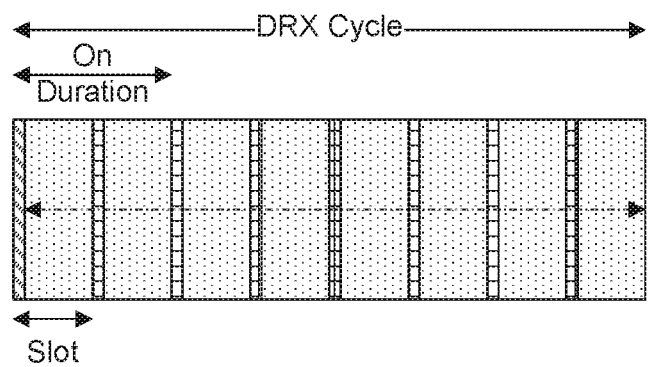
FIG. 12B illustrates exemplary PDCCH on first monitoring occasion in OnDuration as a wake-up signal—UE Behavior when it does not receive the PDCCH.

The concept is shown in FIG. 12. In FIG. 12A, the first PDCCH monitoring occasion in the OnDuration gives the UE a PDSCH grant; so, the UE implicitly recognized that it must wake up and continues to monitor through the OnDuration and through the occasions when the DrxInactivityTimer is running. In FIG. 12B, the UE does not detect a PDCCH in the first PDCCH monitoring occasion. So it goes to sleep until the next OnDuration.

This concept may be generalized so that the wake up signal may occur in the form of a PDCCH within N monitoring occasions within the OnDuration of a DRX cycle.

The PDCCH may provide a grant to the UE, thus the UE identifies that it must continue monitoring. Alternatively, the PDCCH may not be in the form of a grant but may be another DCI such as the one scrambled with MS-RNTI and providing the micro-sleep state to the UE.

Described herein is a way to minimize the blind decoding during the PDCCH decoding in the first occasion of the OnDuration; the location L or aggregation level (AL) may be configured to the UE in advance through RRC for the first monitoring occasion in the OnDuration. So, the UE may have minimal blind decoding overhead.

DRX and wake-up signal-Receiving wake-up signal before the OnDuration: It may be beneficial to allow the wake-up signal to be received prior to the OnDuration so that the UE may do fine synchronization and beam training if required prior to the OnDuration. So the wake-up signal may be transmitted in a pre-OnDuration-Window (POW) prior to an OnDuration. The concept is shown in FIG. 13.

If the wake-up signal is in the form of a PDCCH or DMRS followed by PDCCH, the UE may have a 'WakeUp-CORESET' configured for the wake-up signal. This CORESET may have wideband DMRS to enable better detection reliability for the DCI. But the CORESET may be relatively narrowband within the default or active BWP to minimize the power consumption in monitoring the Wake-up signal. A new DCI format may be introduced, such as for wake-up signaling, and the UE may be configured to receive the wake-up signal in a user-specific search space or a common search space. As is contemplated with other optional considerations herein, it is contemplated that both the user-specific search space and the common search space may be configured to received the wake-up signal.

The UE may have multiple monitoring occasions within a POW, e.g., the search space periodicity for a DCI based wake-up signal may be small enough that multiple occasions may occur in the POW. This provides flexibility to the gNB to address a large number of UEs. Outside the WakeUp-CORESET, the UE need not monitor the power savings signal.

FIG. 13A shows an example where the UE monitors POW on the default BWP BWPD and switches to an active BWP $BWP_A$ on receiving a wake-up signal, including a command to switch to $BWP_A$ in POW. FIG. 13B shows an example where the UE monitors the POW in the active BWP $BWP_A$ and subsequently wakes up to monitor PDCCH on the DRX cycle of the same BWP.

The UE may micro-sleep between the duration that it receives the wake-up signal and the start of the OnDuration. This may apply to the case where the UE does not see the need for resynchronization prior to OnDuration, for example if a BWP switch is not required on waking up or if synchronization accuracy is sufficient to operate in the BWP to which the UE is switched on reception of the wake-up signal.

Note that the periodicity of POW may be such that UE may monitor it once every D DRX cycles.

Figure 34A:
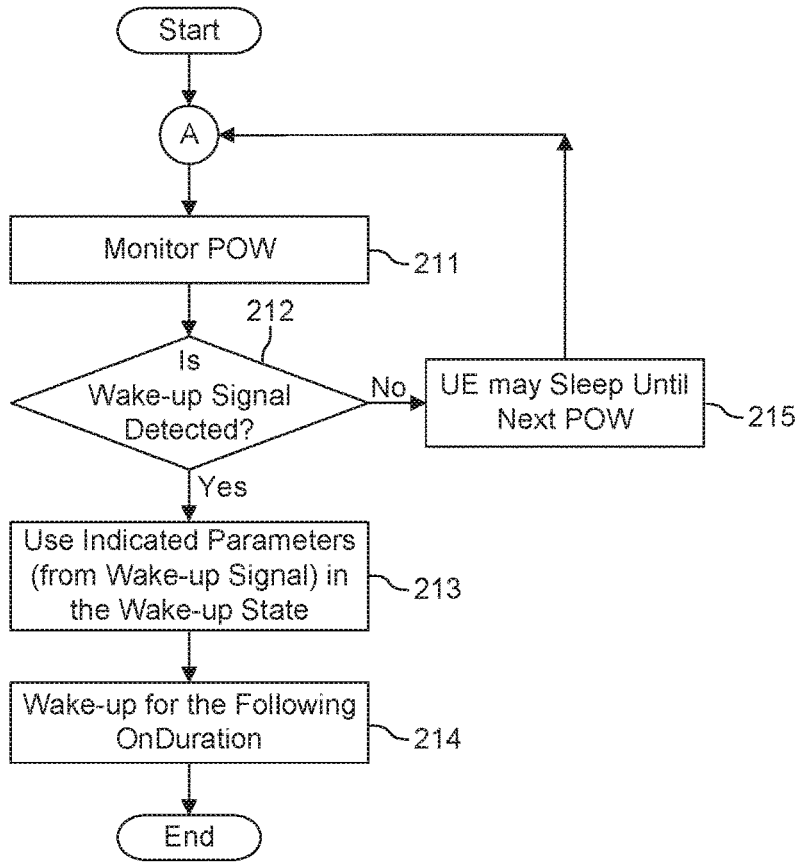
FIG. 34A illustrates exemplary method for sleeping or waking up after monitoring the pre-onduration-window, such as UE wake-up detecting wake-up signal or otherwise sleeping.

If the wake-up signal is received within this window, the UE must wake-up at least to monitor the following OnDuration. If the wake-up signal is not received within this window, the UE does not need to wake up until the next POW occasion—this may be an implicit indication to sleep. This procedure is shown in FIG. 34A. At step 211, UE (e.g., WTRU 102a or UE 99) may monitor the POW. At step 212, there is a determination made of whether a wake-up signal is detected. For example, this determination may be made based on whether a DL control signal carrying the wake-up command is detected. If there is a determination that the wake-up signal has not been detected, then the UE may sleep until next POW (step 215). At or about the next POW, the monitoring of step 212 may continue to occur. At step 213, based on a determination that a wake-up signal is detected, then indicated parameters (e.g., parameters from wake-up signal) may be used in the wake-up state. At step 214, UE may wake-up for the following OnDuration.

Figure 34B:
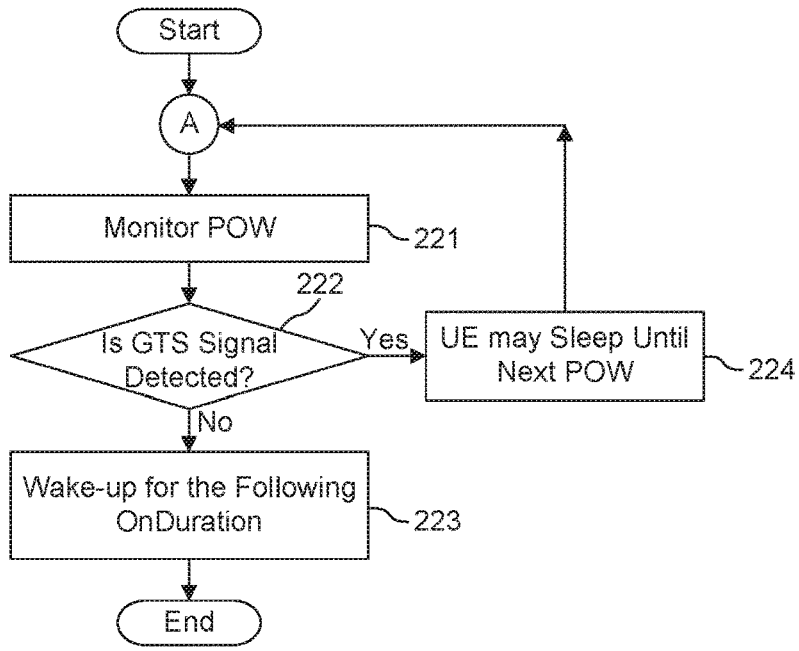
FIG. 34B illustrates exemplary method for sleeping or waking up after monitoring the pre-onduration-window, such as UE sleeps on detecting the GTS signal; or otherwise it wakes-up for the onduration.

Alternatively, a GTS signal may be transmitted in the POW; on receiving it, the UE sleeps for the following OnDuration. If the GTS is not detected, the UE must wake-up for the OnDuration of the following DRX cycle. This procedure is shown in FIG. 34B. At step 221, UE (e.g., WTRU 102a) may monitor the POW. At step 222, there is a determination made of whether a GTS signal is detected. For example, this determination may be made based on whether a DL control signal carrying the GTS command is detected. If there is a determination that the GTS signal has been detected, then the UE may sleep until next POW (step 224). At or about the next POW, the monitoring of step 221 may occur. At step 223, based on a determination that a GTS signal is detected, then UE may wake-up for the following OnDuration.

Figure 34C:
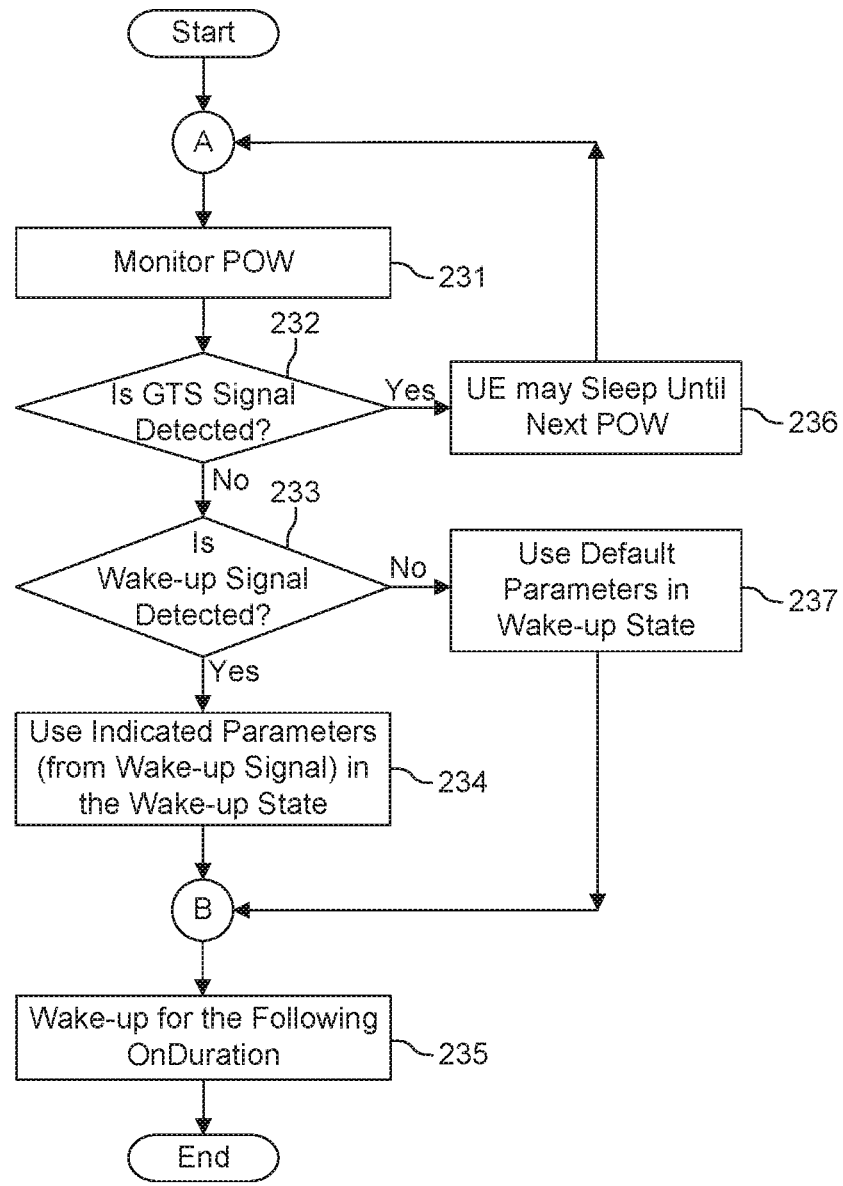
FIG. 34C illustrates exemplary method for sleeping or waking up after monitoring the pre-onduration-window, such as UE wakes-up if neither GTS not wake-up signal is detected or uses default power savings configuration.

In another example, a wake-up signal or GTS must be received by the UE to determine its behavior during the OnDuration of the following DRX cycle, as shown in the procedure in FIG. 34C. At step 231, UE (e.g., WTRU 102a) may monitor the POW. At step 232, there is a determination made of whether a GTS signal is detected. For example, this determination may be made based on whether a DL control signal carrying either the wake-up command or a GTS command is detected. If there is a determination that the GTS signal has been detected, then the UE may sleep until next POW (step 236). At or about the next POW, the monitoring of step 231 may occur. At step 233, there is a determination made of whether a wake-up signal is detected. For example, this determination may be made based on whether a DL control signal carrying the wake-up command is detected. If there is a determination that the wake-up signal has not been detected, then based on this determination, at step 237, default parameters may be used in wake-up state. At step 234, based on a determination that the wake-up signal has been detected, then indicated parameters (e.g., parameters from wake-up signal) may be used in the wake-up state. At step 235, then UE may wake-up for the following OnDuration.

With continued reference for FIG. 34C and additional perspective, if a GTS signal is received, and the GTS indicates the duration of sleep, the UE sleeps for one or more DRX cycles. Instead, if the UE receives a wake-up signal, it may wakeup for the following OnDuration. If the wake-up signal provides certain power savings parameters such as search space monitoring period etc., the UE may use those parameters for determining its operation following the wake-up. If it does not detect wake-up signal or GTS, it still may wake-up for the following OnDuration but operates using a set of default values which would otherwise be provided through the wake-up signal (if received). The default values may be configured to the UE through RRC signaling.

Figure 35:
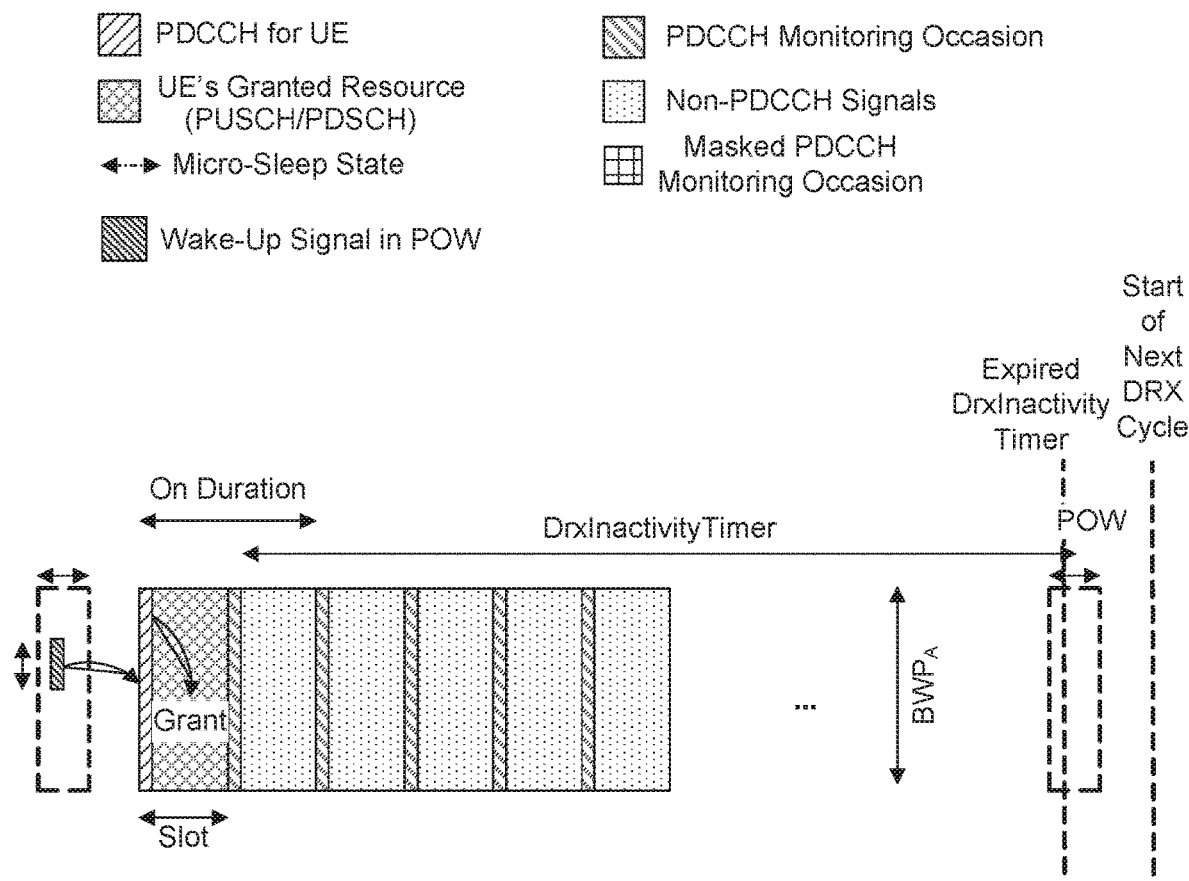
FIG. 35 illustrates exemplary DRX InactivityTimer running during the pre-onduration-window duration.
Figure 36A:
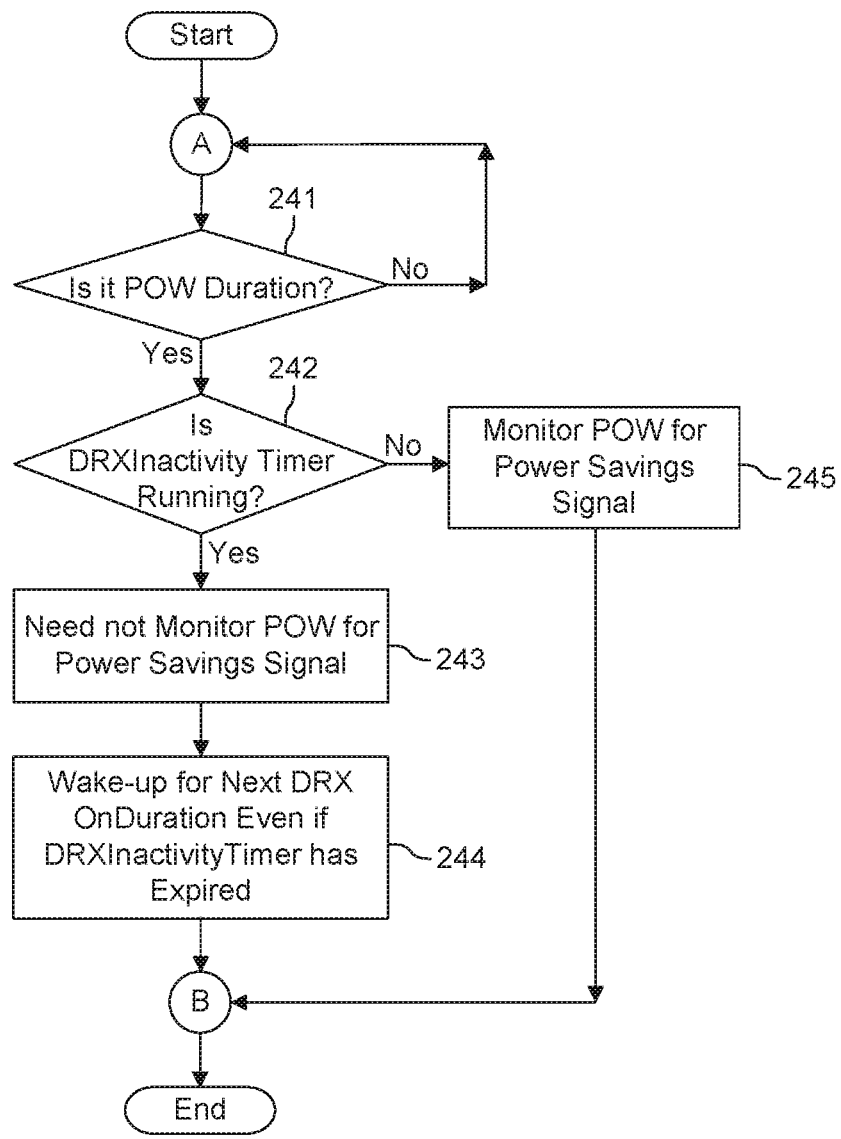
FIG. 36A illustrates exemplary method for active period runs into monitoring the pre-onduration-window, such as UE monitors the next OnDuration even if DRXInactivity-Timer expires prior to OnDuration.
Figure 36B:
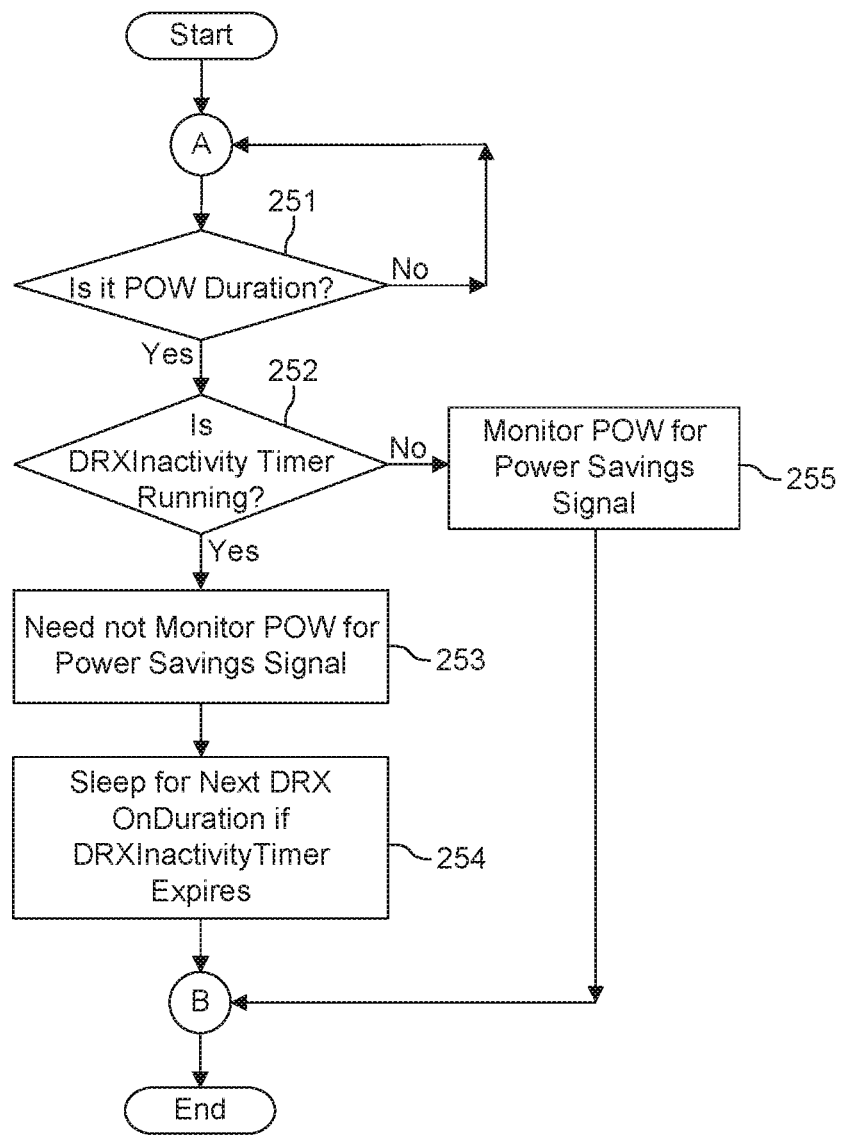
FIG. 36B illustrates exemplary method for active period runs into monitoring the pre-onduration-window, such as UE sleeps at the start if the next OnDuration if DRXInactivityTimer expired prior to OnDuration.

Without in any way unduly limiting the scope, interpretation, or application of the claims appearing herein, a technical effect of one or more of the examples disclosed herein is to provide adjustments to how power is managed. While the conventional DRX mechanism allows UE to sleep and save power when it is not required to monitor the cell, DRX parameters cannot be adjusted dynamically according to the network's traffic or application. The methods described herein allow dynamic adaptation of the wake-up and sleep states for the UE—these states can be adapted to suit the network's traffic and UE's applications In FIG. 35, another scenario is shown where the active DRX time may extend into the duration of a following POW. Then the following operational procedures may be considered for the UE. If the UE is in DRXInactivityTimer period during a POW occasion, the UE may assume that the gNB will not transmit a wake-up signal on the POW. So the UE need not monitor the Wake-up CORESET during its DRXInactivityTimer period, e.g., UE may not monitor the wake-up signal during its active DRX time. So, the UE may not explicitly receive a wake-up signal in the POW for the following OnDuration. In this case, one of the following procedures may occur. In a first example procedure, by default, the UE may monitor the following OnDuration without receiving an explicit wakeup-signal. This procedure is shown in FIG. 36A. The UE may receive a GTS from the gNB indicating it to sleep and end that active DRX time. In a second example, the UE may sleep after the DRXInactivityTimer expires. It does not wake-up to monitor the following OnDuration as it did not monitor the preceding POW. It may monitor the next available POW for an explicit wake-up signal. This procedure is shown in FIG. 36B. Further description of the steps of FIG. 36A and FIG. 36B are shown below.

FIG. 36A illustrates an exemplary method for active period runs into monitoring the pre-onduration-window, such as UE monitors the next OnDuration even if DRXInactivityTimer expires prior to OnDuration. At step 241, there is a determination whether POW has reached a threshold. Based on the POW duration threshold being met, at step 242, there is a determination of whether DRXInactivityTimer is running. Based on the DRXInactivityTimer running, at step 243, then UE may determine not to monitor POW for power saving signal and then, at step 244, wake-up for next DRX OnDuration, even if DRXInactivityTimer has expired. It should be also noted that, if at step 242, there is a determination that DRXInactivityTimer is not running, then at step 245, the UE may monitor POW for power savings signal.

FIG. 36B illustrates an exemplary method for active period runs into monitoring the pre-onduration-window, such as UE sleeps at the start if the next OnDuration if DRXInactivityTimer expired prior to OnDuration. At step 251, there is a determination whether POW has reached a threshold. Based on the POW duration threshold being met, at step 252, there is a determination of whether DRXInactivityTimer is running. Based on the DRXInactivityTimer running, at step 253, then UE may determine not to monitor POW for power saving signal and then, at step 254, sleep for next DRX OnDuration, if DRXInactivityTimer expires. It should be also noted that, if at step 252, there is a determination that DRXInactivityTimer is not running, then at step 255, the UE may monitor POW for power savings signal.

Figure 37:
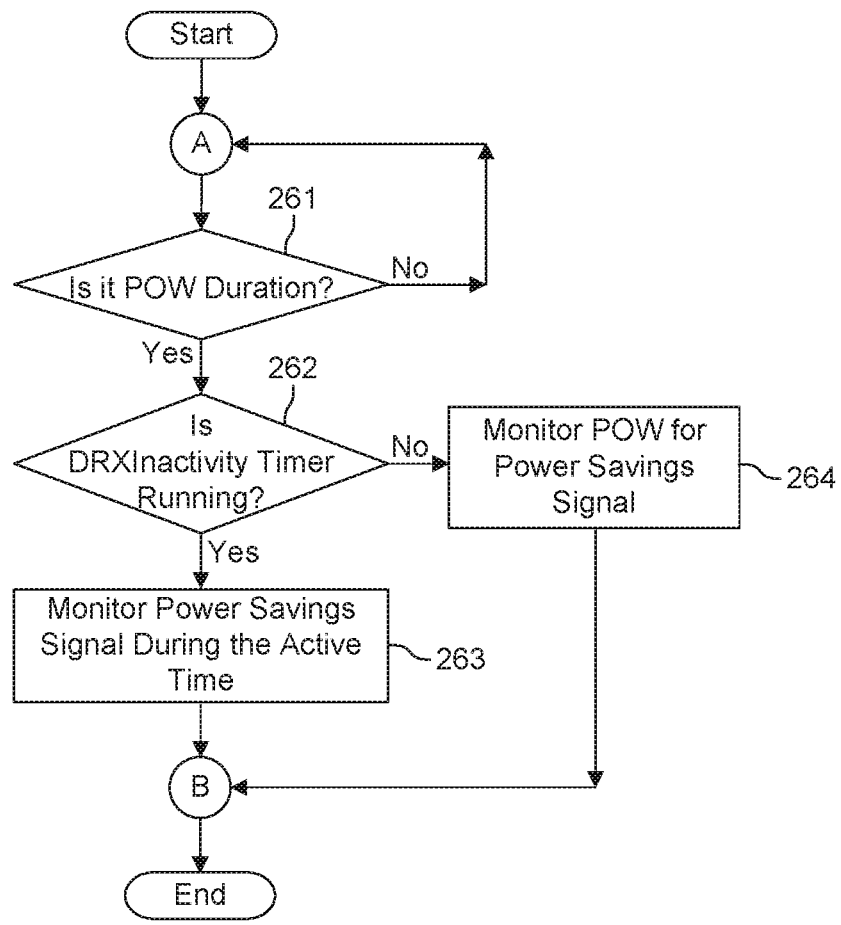
FIG. 37 illustrates exemplary method for when an active period runs into monitoring the pre-onDuration-window, such as UE receives power saving signal in the active duration.

FIG. 37 illustrates an exemplary method for when an active period runs into monitoring the pre-onDuration-window, such as UE receives power saving signal in the active duration. If a UE is in the active DRX time, it may monitor the wake-up signal on a CORESET that it is configured for monitoring during its active time. If the wake-up signal is received, the UE may ensure that it is awake to monitor the following OnDuration as shown in the procedure in FIG. 37. At step 261, there is a determination whether POW has reached a threshold. Based on the POW duration threshold being met, at step 262, there is a determination of whether DRXInactivityTimer is running. Based on the DRXInactivityTimer running, at step 263, then the UE may monitor for power saving signal during the active time. It should be also noted that, if at step 262, there is a determination that DRXInactivityTimer is not running, then at step 264, the UE may monitor POW for power savings signal.

With continued reference to FIG. 37, in an example, if the UE is in the active DRX time, it may monitor the wake-up signal on a CORESET that it is configured for monitoring during its active time. If the wake-up signal is received, the UE may ensure that it is awake to monitor the following OnDuration as shown in the procedure in FIG. 37. The UE may monitor the wake-up signal in its active time only during certain monitoring occasions since it is not expected to receive a wake-up signal soon after the UE sets its DRXInactivityTimer. A suitable time to signal the wake-up signal may be close to the end of the DRXInactivityTimer expiration. Accordingly, the UE may monitor the wake-up signal only on K monitoring periods prior to the DRXInactivityTimer expiration. In an example alternative, a GTS may be signalled in the active time to indicate the UE to sleep during that DRX cycle, but the GTS may indicate the UE to wake-up for the next ONDuration. In another example alternative, the UE may monitor the power savings signal during the duration of the POW but on CORESETs corresponding to the active duration (e.g., these CORESETs could be different from the WakeUp-CORESET). During the active time, the power savings signal may be signaled in UE-specific search space while in the inactive time, it may be signalled in a common search space, such as that for a group-common PDCCH. The UE may reset its DRXInactivityTimer on receiving the wakeup-signal.

Figure 38A:
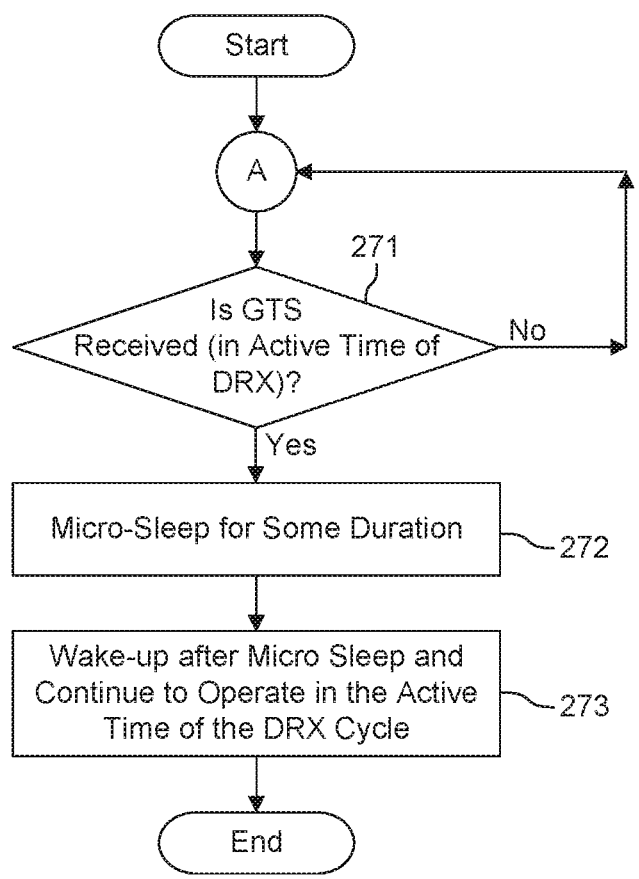
FIG. 38A illustrates exemplary method for receiving GTS in the active duration, such as UE sleeps for some duration and wakes up to continue monitoring during the active session.

FIG. 38A illustrates an exemplary method for receiving GTS in the active duration. There may be a scenario in which the active DRX active time extends into a following OnDuration period. In this case, the active time overlaps with the OnDuration and the UE is already awake during the OnDuration of that DRX cycle. The UE relies on the DRXInactivityTimer expiration or the GTS signal to go to sleep during that cycle.

With reference to FIG. 38, at step 271, the GTS may be received by the UE any time during its active time. At step 272, the UE may determine that the GTS may indicate the UE to micro-sleep for some duration and, at step 273, wake up within the active time to continue monitoring PDCCH. In this case, the DRXInactivityTimer may be decremented during the micro-sleep—this behavior of the timer keeps the current operational procedures of the UE unchanged. Alternatively, the DRXInactivityTimer may be suspended or frozen for the duration of the micro-sleep—this procedure may be useful to target use cases where the grants are sparse and UE can save power between the grants without early expiration of the DRXInactivityTimer. The duration of sleep may be indicated through the GTS signal or may be configured to the UE in advance through RRC signaling.

Figure 38B:
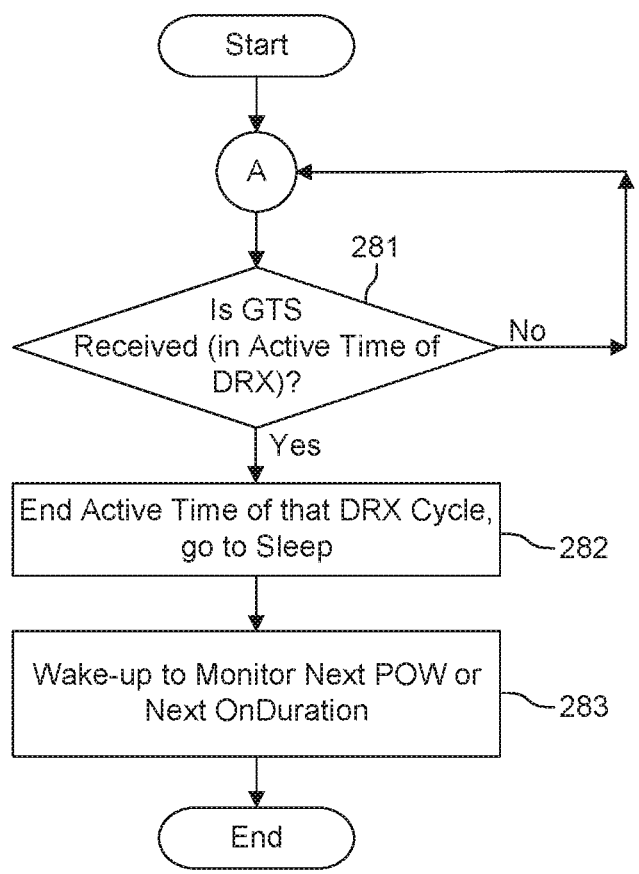
FIG. 38B illustrates exemplary method for receiving GTS in the active duration, such as UE's active duration terminates and UE sleeps and UE wakes up to monitor next POW on next OnDuration.

FIG. 38B illustrates an exemplary method for receiving GTS in the active duration, such as UE's active duration terminates and UE sleeps and UE wakes up to monitor next POW on next OnDuration. Alternatively, at step 281 of FIG. 28B, the GTS may be received by the UE during its active time, but based on the GTS being received, at step 282, then the UE may end active time of that DRX cycle and go to sleep. The GTS may indicate the UE to sleep until the next OnDuration occasion or the next POW occasion. So, the UE's DRXInactivityTimer may expire and the UE goes to sleep as its active time in that DRX cycle ends.

At step 283, behavior of the UE in response of receipt of GTS in active time (whether it wakes up in the same active time or wakes up only at the start of the next POW or OnDuration) may be configured through RRC signaling or indicated by the GTS signal.

The duration of the POW and periodicity for monitoring the POW may be configured to the UE through RRC signaling from the gNB. The starting time of the POW may be indicated as an offset (e.g., in terms of symbols, mini-slots, or slot or a combination thereof) with respect to the start of the OnDuration of the DRX cycle. Alternatively, the starting time of the POW may be indicated as an offset with respect to the frame timing. The monitoring occasions of the power saving signal within the POW is configured through the search space associated with the CORESET (such as the WakeUp-CORESET). The configurations for POW may be per BWP per cell and provided through RRC signaling from the gNB.

In general, a power savings signal received on $BWP_1$ may indicate the that the UE must wake up in $BWP_2$. Or it may indicate that the UE must micro-sleep on $BWP_2$, e.g., UE micro-sleeps and subsequently may wake up on $BWP_2$ if it does not return to the BWPD.

On receiving a wake-up signal, prior to the start of the OnDuration in $BWP_2$, the UE may prepare to receive and transmit in $BWP_2$ and therefore may perform one or more of the following on $BWP_2$ in the time gap between reception of the wake-up signal and OnDuration on $BWP_2$: 1) fine synchronization using TRS or PT-RS or other RS such as CSI-RS, DMRS, SSB; 2) beam training; or aperiodic CSI measurement and reporting—The wakeup signal may provide an UL grant triggering aperiodic CSI measurement such may be a DCI such as a format 0_1.

Alternatively, the UE may be configured to treat the wake-up signal itself as a trigger to do aperiodic CSI measurement or reporting in $BWP_2$. So the wake-up signal may implicitly trigger measurement or reporting. CSI-RS resources for measurement and PUCCH or PUSCH resources for reporting are preconfigured to the UE; for example, this configuration may indicate resources PUSCH starting slot or symbol with respect to the slot or symbol start of the POW or the slot or symbol of the wake-up signal or the slot or symbol of the DRX OnDuration. The wake-up signal itself may come in the form a group-common signal or a UE-specific signal in this example.

Figure 14A:
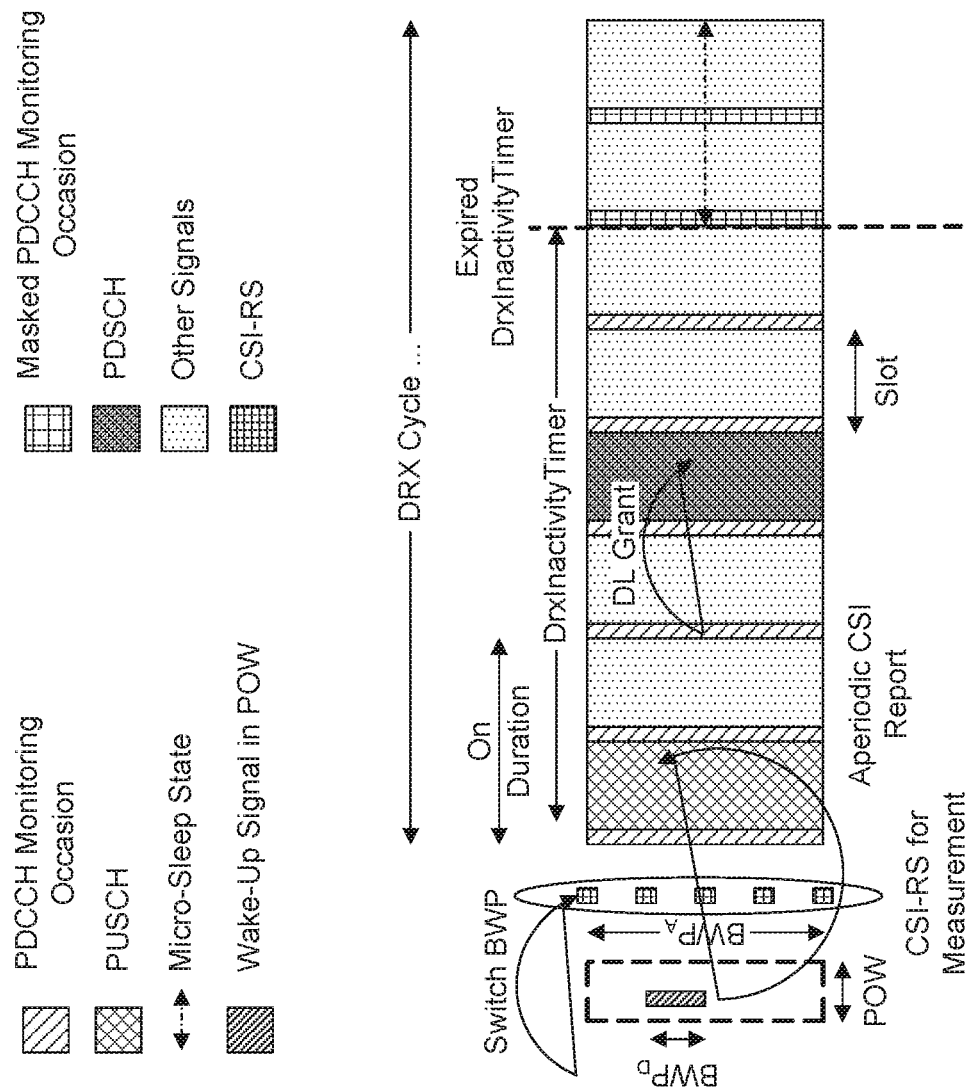
FIG. 14A illustrates UE performs aperiodic CSI reporting on receiving the wake-up signal.
Figure 14B:
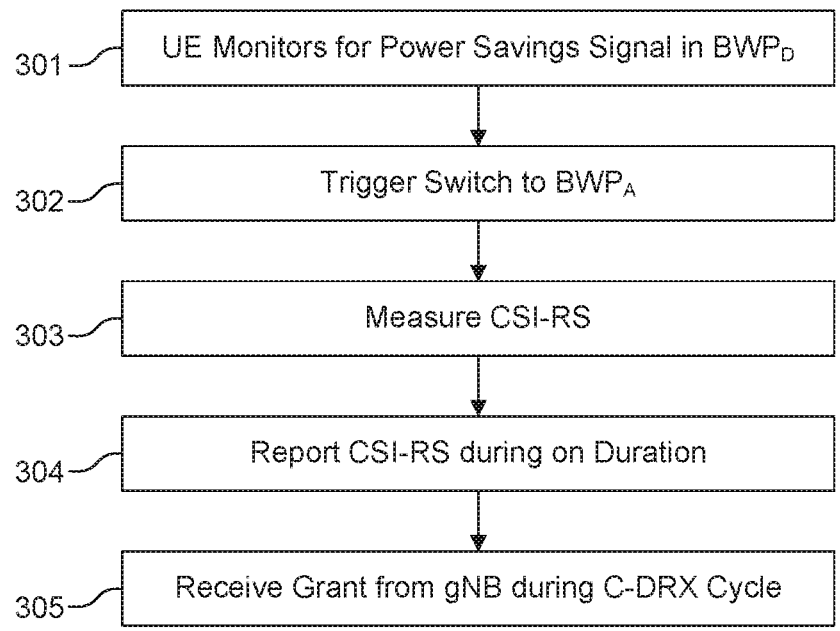
FIG. 14B illustrates an exemplary method associated with UE performing aperiodic CSI reporting.

The concept of triggering aperiodic reporting is shown in FIG. 14A. The procedure is summarized in the following steps as shown in FIG. 14B. At step 301, UE may monitor POW occasions for power savings signal in BWPD. At step 302, if the signal is received by the UE, it may trigger a switch to $BWP_A$. At step 303, UE measures CSI-RS for aperiodic reporting. At step 304, UE reports CSI-RS during the OnDuration. At step 305, UE receives a grant from the gNB during that C-DRX cycle.

Figure 14C:
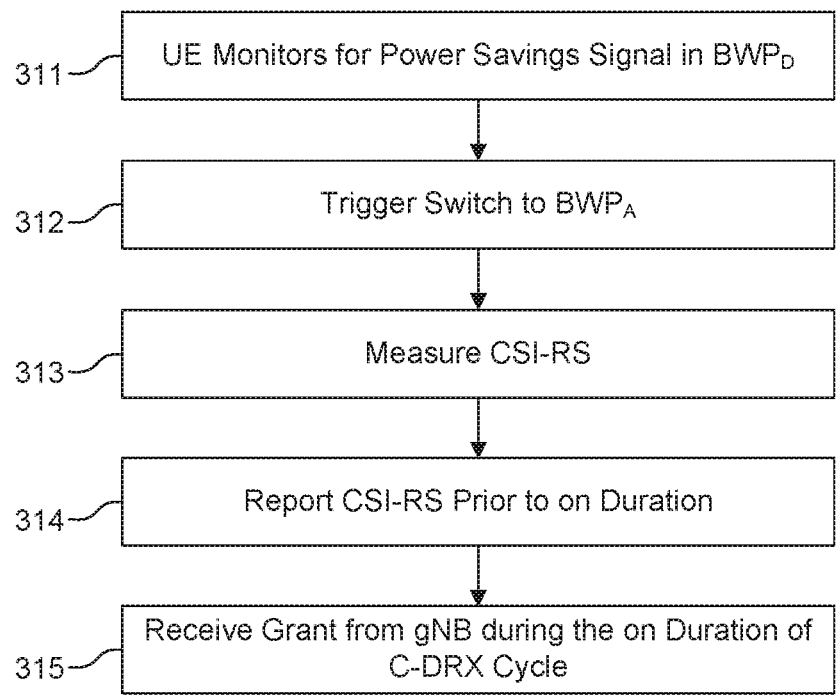
FIG. 14C illustrates another exemplary method associated with UE performing aperiodic CSI reporting.

Another example, as shown in FIG. 14C, is described in the following procedure may also be considered to trigger aperiodic reporting. At step 311, UE monitors POW occasions for power savings signal in BWPD. At step 312, if the signal is received by the UE, it may trigger a switch to $BWP_A$. At step 313, UE measures CSI-RS for aperiodic reporting. At step 314, UE reports CSI-RS prior to the OnDuration. At step 315, UE receives a grant from the gNB during the OnDuration of the C-DRX cycle.

Figure 15A:
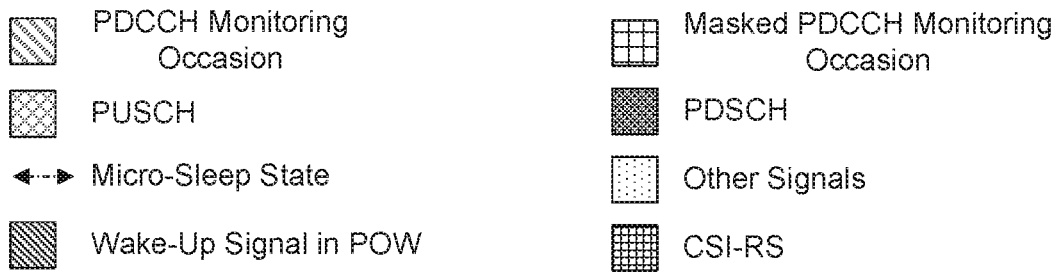
FIG. 15A illustrates exemplary power savings signals triggers CSI reporting priori to ONDuration-CSI reporting after the POW.
Figure 15A:
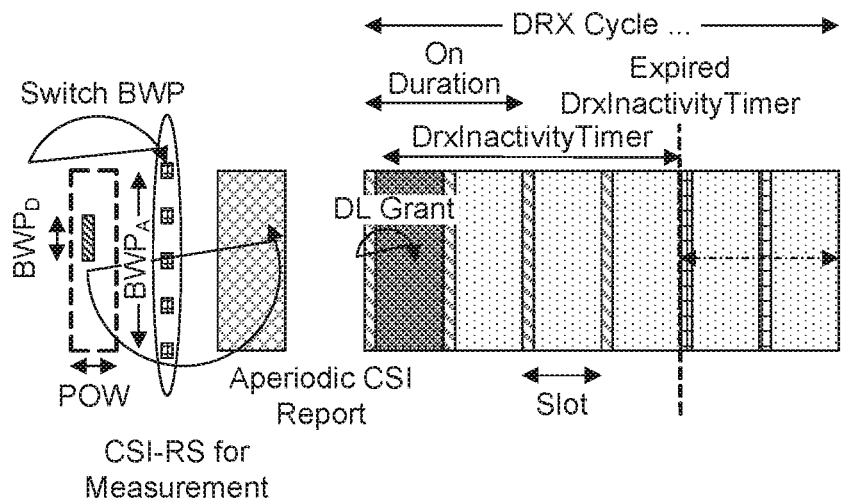

The concept is shown in FIG. 15A. The CSI-RS can occur within the POW or outside the POW.

Figure 15B:
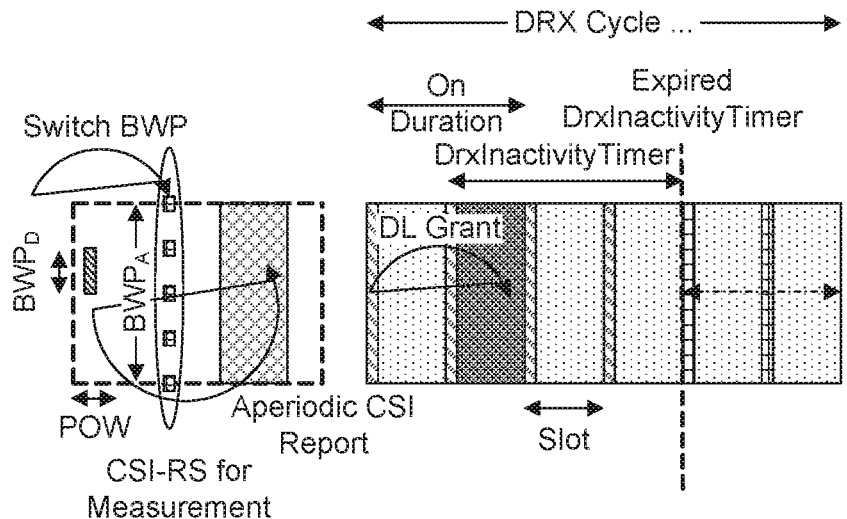
FIG. 15B illustrates exemplary power savings signals triggers CSI reporting priori to ONDuration-CSI reporting within the POW.

CSI-RS reporting may also occur within the POW. This concept is shown in FIG. 15B. Here the measured CSI-RS in also with the POW.

Switching between power saving states: A UE may be configured with multiple 'power savings configurations' (PSC). Depending on the UE's capability or traffic conditions or application or feedback from the UE, a specific PSC may be applied, thereby providing a certain amount of power savings. Layer-1 or MAC CE or RRC may indicate the PSC to be used in the UE.

Figure 16:
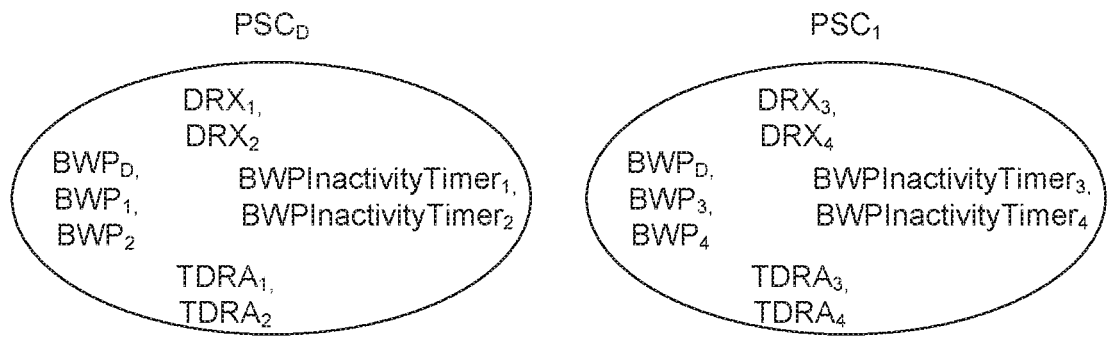
FIG. 16 illustrates exemplary default PSC, PSCD and PSC1 are PSCs configured to the UE.

A PSC may consist of one of more of the following parameters: 1) multiple BWPs, different DRX parameters, or time domain resource allocation (TDRA) parameters. The concept is shown in FIG. 16. FIG. 16 illustrates default PSC, $PSC_D$ and PSC1 are PSCs configured to the UE. RRC signaling or MAC CE based configuration or L1 signaling may be used to select a PSC.

Multiple BWPs—In a PSC multiple BWPs may be configured with different parameters. Different extent of power savings can be obtained based on the number of PRBs in a BWP. Also K0, K1, K2 values may be configured suitably to enable cross-slot scheduling and delayed scheduling within a slot to reduce buffering requirements immediately following the PDCCH monitoring. The default BWP may be different for each PSC. BWPInactivityTimer may be configured differently for each BWP. Also, the CORESETs configured for each BWP may support different bandwidths and search space periodicities.

Different DRX parameters—A PSC may have a different duration for the DRX parameters such as DRXInactivty-Timer or OnDuration depending on the application. Furthermore, the DRX parameter may be BWP specific.

Time Domain Resource Allocation (TDRA) parameters— the PDSCH duration, starting time, etc. may influence the UE's buffering capabilities and thereby impact power consumption.

When a specific PSC is indicated, the UE uses certain BWPs, associated DRX parameters, TDRA configuration. A default PSC '$PSC_D$' may be configured to the UE.

If an application changes or traffic conditions change, it would be desirable to switch the UE to operate in a suitable PSC configuration. For example, one PSC configuration may allow higher capacity and lower latency but less power savings. Whereas another PSC may trade capacity and latency for more power savings.

Figure 17:
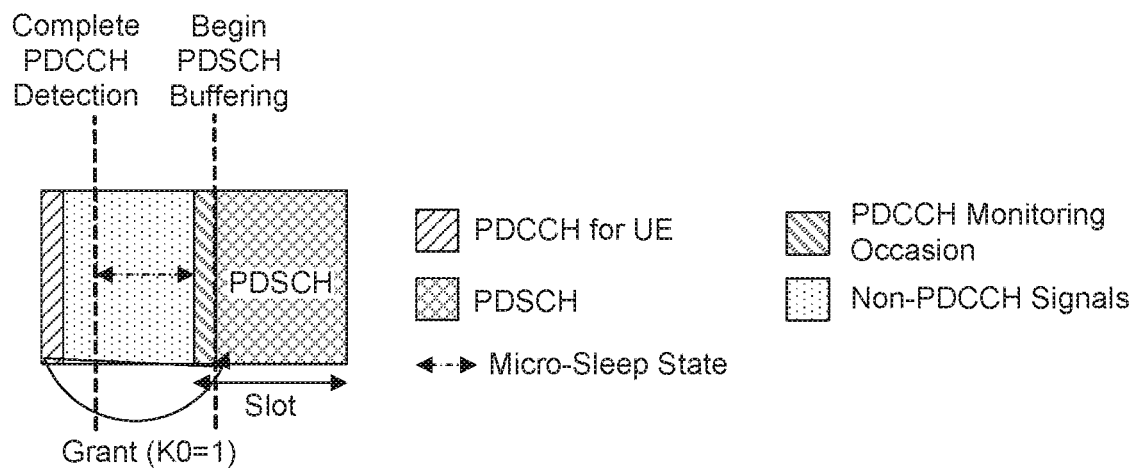
FIG. 17 illustrates exemplary cross-slot scheduling.

In order to micro-sleep, the UE can take advantage of a priori knowledge of parameters such as K0. If K>0, the UE may micro-sleep between the PDCCH reception or processing and the PDSCH reception or processing as shown in FIG. 17. By not having to buffer the PDSCH while processing the PDCCH, the UE may save power.

In the state of the art, multiple K0 values are configured through RRC signaling. The DCI proving the PDSCH grant indicates the specific K0 value for that grant. The UE may assume the worst case value for K0, e.g., the smallest K0 value in the TDRA table to plan PDSCH buffering and processing while optimizing its micro-sleep duration. Note that power savings may be enabled by a priori knowledge of K0; if K0 is known only at the end of DCI decoding, the UE may not have enough time to react to PDSCH buffering in a power efficient manner. In other words, UE should prepare for the smallest value of K0.

Figure 18:
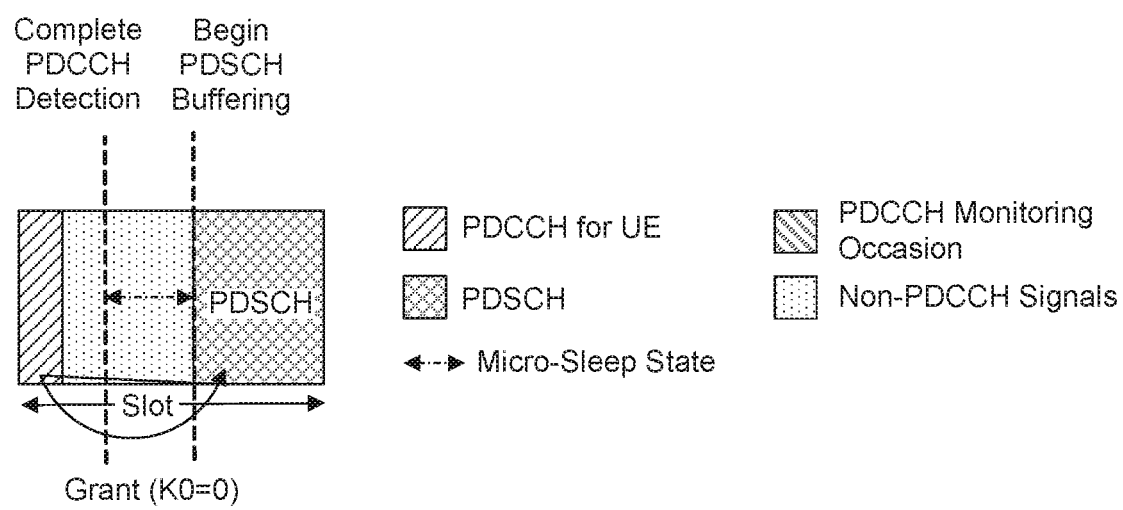
FIG. 18 illustrates exemplary same slot scheduling with PUSCH starting location beginning after PDCCH decoding is completed

Similarly, same slot scheduling can also reduce the constraints on buffering if there sufficient time between PDCCH reception and the scheduled PDSCH reception (K0=0) and provide power savings. This type of scheduling is shown in FIG. 18. But UE needs to know the CORESET duration and location within the slot and the starting point of the PDSCH that may be scheduled by a PDCCH in that CORESET. The Start-and-Length-Indicator value (SLIV) for the grant may be configured based on the location of the CORESET in the slot and number of symbols within the CORESET.

Consider the use case where a UE supports both URLLC and eMBB traffic. eMBB traffic using relaxed values for K0 can provide power savings while URLLC traffic using smaller K0 values for latency may have limited power savings. So, the minimum K0 value for eMBB may be greater than the minimum K0 value for URLLC traffic. As another example, depending on its load, the gNB may support different levels of power savings for a given UE; it may operate with relaxed values of K0 when the load is low and obtain significant power savings while it may use smaller values of K0 when the load is high with less power savings. So, the minimum K0 value for the low load case may be greater than the minimum K0 value for high load case.

To support different PSCs, multiple TDRA tables may be configured to the UE supporting different set of K0 values and different SLIVs.

Figure 19A:
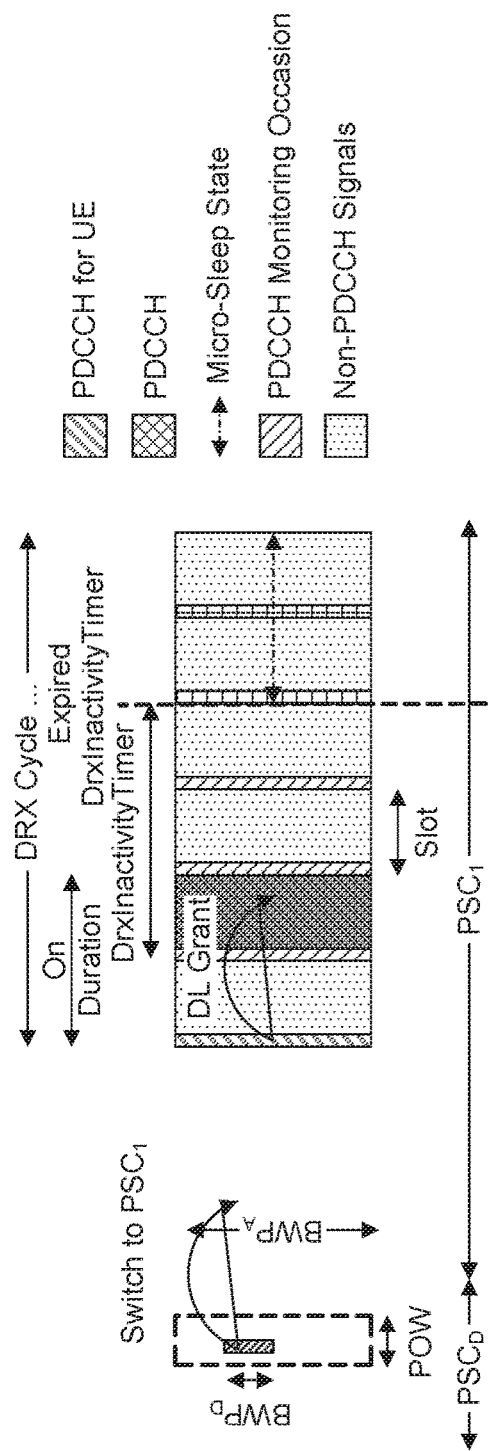
FIG. 19A illustrates exemplary PSC indication-Switching from $PSC_D$ to $PSC_1$.
Figure 19B:
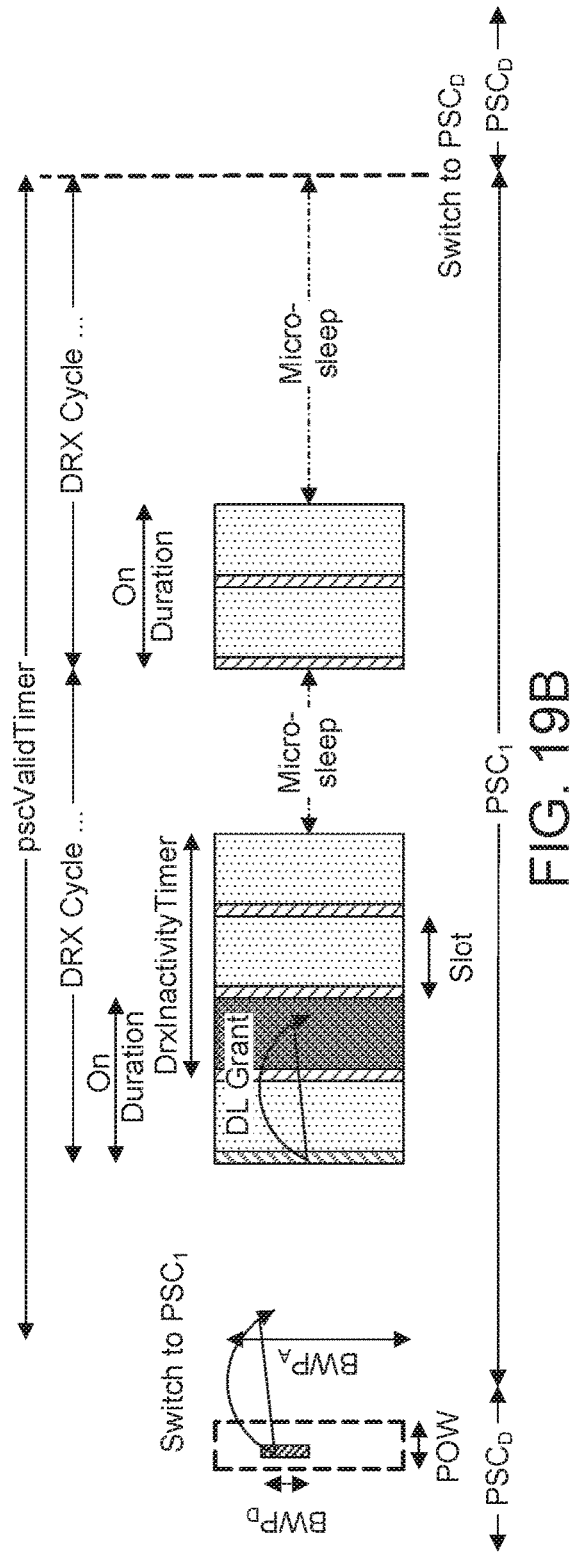
FIG. 19B illustrates exemplary PSC indication-Switching to $PSC_D$ on expiration of pscValidTimer.

The below example scenarios that may enable L1 based switching between the PSCs. In the absence of any indication, the UE may use the default PSC $PSC_D$. In a first scenario, the wake-up signal may indicate the PSC to be applied in that DRX ON cycle. For example, the wake-up signal may indicate that only eMBB traffic is expected; in this case UE uses $PSC_1$. Or it may indicate that both eMBB and URLLC traffic are expected so UE that uses $PSC_2$. The wake-up signal may be a GC-PDCCH or UE-specific PDCCH with a field indicating the PSC for the following D DRX cycles. If the wake-up signal is received in a POW, the UE may have sufficient time to switch the PSC. FIG. 19A shows an example where the UE switches from $PSC_D$ to $PSC_1$ on receiving the wake-up signal. If the wake-up signal is received in OnDuration of a DRX cycle, the UE may also be simultaneously monitoring the CORESET for a grant and may use the default PSC for the BWP at least for the duration over which it may receive an indication for the PSC. Alternatively, it may use $PSC_p$ configured by a wake-up signal in a past DRX cycle. Alternatively, a pscValidTimer timer may be configured to the UE with its value configured by RRC. The UE sets the timer upon receiving a PSC indication for $PSC_p$. When the timer expires, the UE switches to the $PSC_D$ as shown in FIG. 19B.

Figure 20:
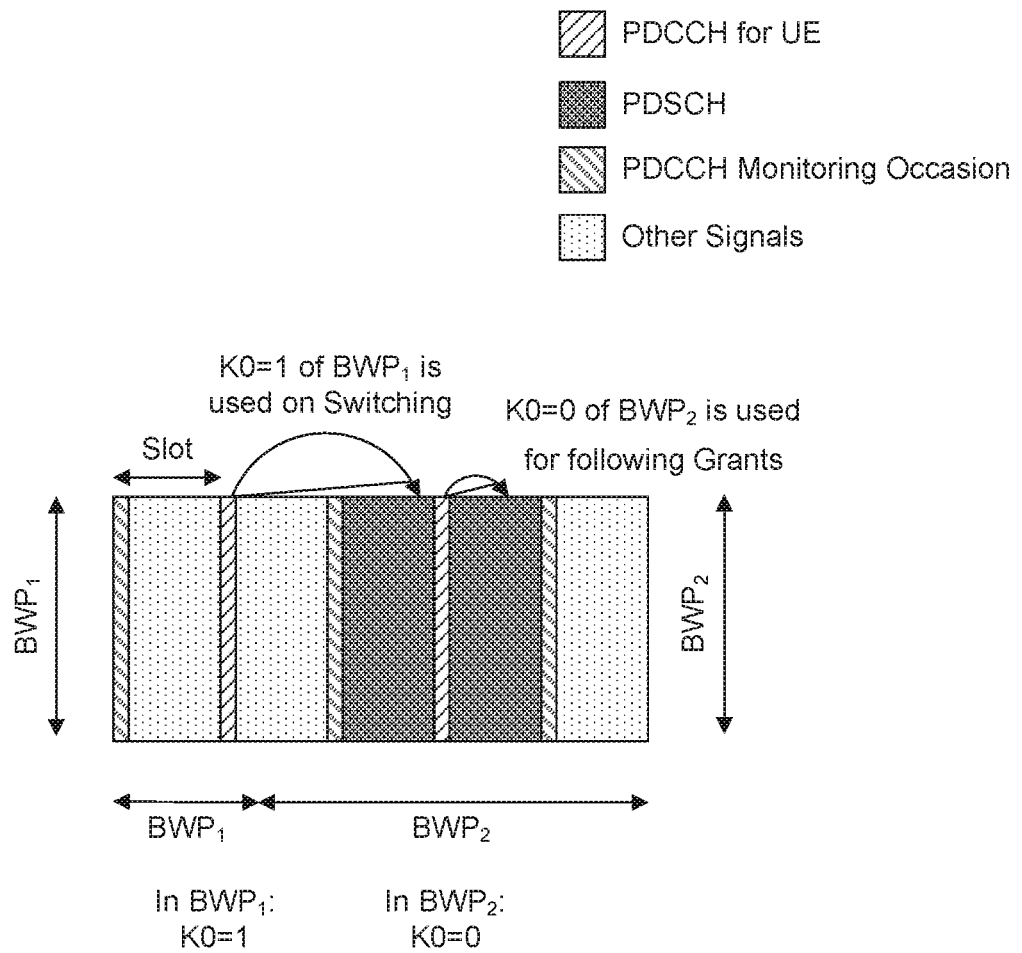
FIG. 20 illustrates exemplary BWP based PSC switching.

In a second scenario that may enable L1 based switching between the PSCs, multiple BWPs are configured for the UE, and each BWP may have its own TDRA table. A PSC is associated with a BWP. The UE may activate BWP switching to change the PSC. For example, $BWP_1$ may be configured with relaxed K0 values for supporting power savings with eMBB traffic. $BWP_2$ may be configured with a small minimum K0 value for supporting URLLC and eMBB. When URLLC traffic is granted, the gNB switches the UE from $BWP_1$ to $BWP_2$. $BWP_1$ and $BWP_2$ may be identical except for the TDRA table. So the UE need not perform resynchronization or tuning and can start operating on the new BWP without a lag. An UL or DL grant on $BWP_1$ provides the indication to switch. But the UE may use the definition of TDRA, K0 and SLIV values based on $BWP_1$ for this grant. Subsequent grants in $BWP_2$ may use the TDRA, K0 and SLIV values configured for $BWP_2$. This concept is shown in FIG. 20. FIG. 20 illustrates exemplary BWP based PSC switching. K0=1 is used for the grant received from $BWP_1$ for PDSCH in $BWP_2$.

A third scenario that may enable L1 based switching between the PSCs, a PSC switching DCI may be used to change the PSC configuration on a BWP. It may be signaled as a GC-PDCCH or UE-specific PDCCH. It carries a field indicting the new PSC to be used, and a field indicating the time from when the switch must be applied.

In general, multiple PSCs can be activated at a given timer for a UE if the parameters impacted by the PSC do not overlap with other. For example, one PSC may impact the DRX and BWP. Another PSC may impact the TDRA table. Both these PSCs may be activated to the UE. This gives the gNB more flexibility to support different traffic types and provide finer resolutions of power savings with minimal configuration overhead.

SCell procedures for power savings—Low power operation in SCell: A new state called the 'dormant state' may be introduced to enable the UE to save power compared to the nominal operation where a UE switches between active and deactivate states. A UE often stays in the active state as the latency to deactivate and reactivate is high. The dormant state is state of operation with operational load between that in the active and deactivated states and therefore has less power consumption than in the active state. Fast transitions between the states may enable power savings by responding quickly to dynamic changes in the traffic.

The UE may have one or more SCells in the dormant state when it is in the RRC-Connected mode. The UE may perform one or more of the following operations in the dormant cell. With regard to a first operation, measurements and tracking, reporting may occur through the PCell or PSCell.

With regard to a second operation in the dormant cell, minimal or no PDCCH monitoring on the SCell. In the dormant state, no grants are received on the SCell. The UE may not even monitor PDCCH on the SCell. When the SCell must be activated, the activation may be indicated on the PCell or PSCell through higher layer signaling or through L1 signaling. Alternatively, the UE may monitor PDCCH or activation-RS on the SCell in the dormant state; when it receives an activation DCI or the activation-RS, it activates the SCell and switches to active state monitoring.

Disclosed herein is a dormant-BWP, dormant-CORESET, or dormant-search-space that may be configured for the UE to monitor PDCCH in the dormant state. Power savings may be achieved in the dormant-CORESET monitoring stage by restricting the number of blind decodes, restricting the lengths and formats of DCIs to be expected. For example, UE may monitor only one DCI format for SCell activation or deactivation in the dormant state. The DCI may be an UL grant triggering an aperiodic CSI measurement report. Or it may be a DL grant or a PDCCH order to enable timing advance for the UE. Alternatively, it may be a GC-PDCCH providing the activation or deactivation command to a group of UEs.

The UE performs the following procedures when switching the cell from the dormant state to the active state. This procedure in shown in FIG. 21A-FIG. 21B. UE 99 monitors the dormant-BWP for indication of cell activation. UE 99 may also monitor PCell or PSCell for the cell activation indication from gNB 98, for example. When the UE receives the cell-activation indication (at step 321 or step 331), it switches to the active state, which may imply the following.

Figure 21A:
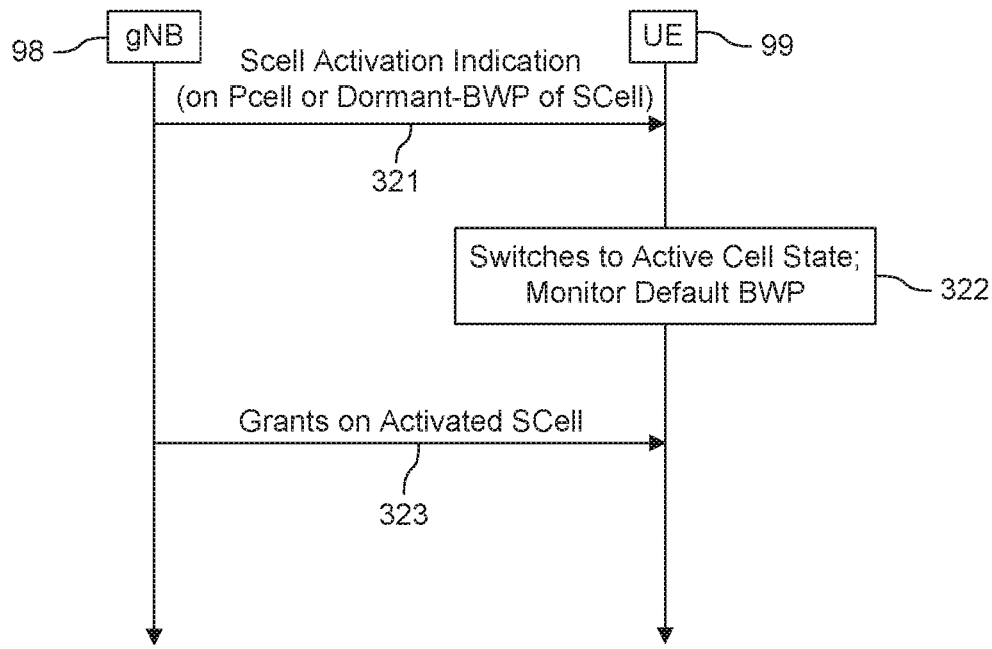
FIG. 21A illustrates exemplary-switch to default BWP in active state.

With reference to FIG. 21A, UE 99 may start monitoring the default BWP of the SCell (step 322). Note that the default BWP in the active cell state and the dormant-BWP in the dormant cell state can denote the same BWP.

Figure 21B:
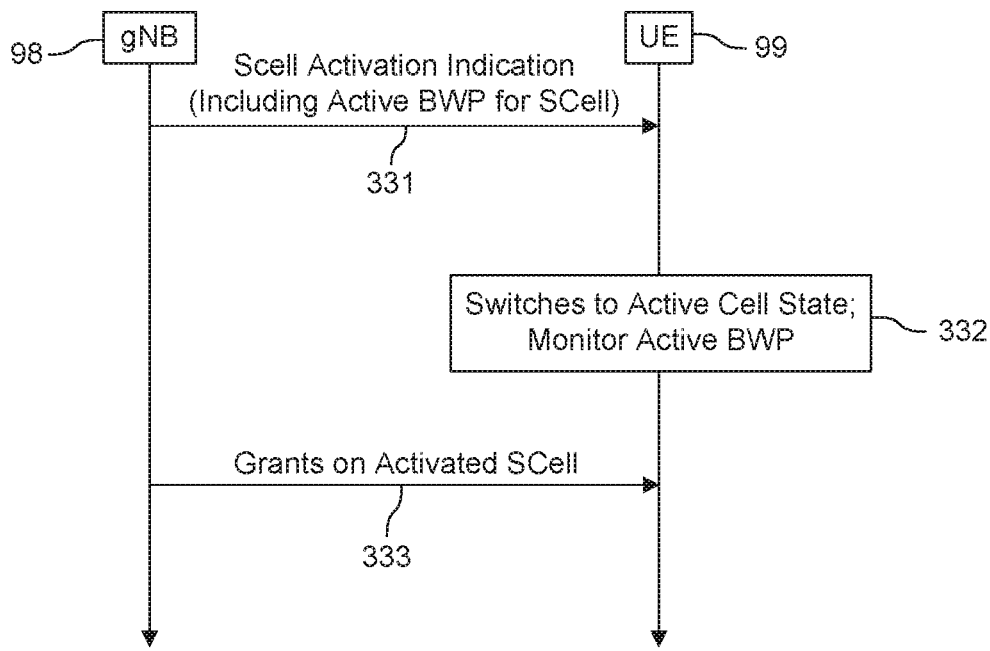
FIG. 21B illustrates exemplary SCell activation from the formant state-(B) switch to an active BWP in active state.

With reference to FIG. 21B, the cell-activation DCI may indicate the BWP to be monitored in the cell. So, UE starts monitoring that active BWP (step 331 message sent including active BWP) once it switches to the active cell state as shown in FIG. 21B. When it switches to the active cell state, it stops monitoring the dormant-CORESET and monitors the nominal CORESETs configured for its active state. As shown in FIG. 21A and FIG. 21B, after the appropriate switch to activate cell state and monitoring appropriate BWP, then subsequently receiving the grants on the activated SCell (step 323 and step 333 for each FIG. 21A and FIG. 21B).

Similarly, the UE may switch a cell from dormant state to deactivation state using the following procedure. The cell-deactivation indication through L1 signaling or higher layer signaling. First, UE may monitor the dormant-BWP for cell-deactivation indication, wherein the indication occurs through L1 signaling such as deactivation-RS or DCI. UE may also monitor PCell or PSCell for the cell-deactivation indication; here the deactivation-indication may occur through L1 or higher layer signaling. Second, when the UE receives the cell-deactivation indication, it may switch to the deactivated state. The UE stops monitoring RS and PDCCH in the dormant-BWP and deactivates the cell.

A single activation-indication or deactivation-indication may impact multiple SCells. For example, S SCells may be activated or deactivated through a single DCI or a MAC CE. The gNB configures these S cell IDs to the UE through RRC signaling. The UE may respond to an activation or deactivation command that received on a DCI through a MAC CE based acknowledgement which may be sent on an active cell, such as the PCell or PSCell.

A UE may change it monitoring of a cell from active state to dormant state when it receives an indication (which may be through RRC signaling or MA CE or DCI) on the cell itself or on a PCell or PSCell. Alternatively, a timer 'active TodormancyTimer' may be used to determine when a cell must switch from active to the dormant state. When the SCell is in the active state for the UE, the UE may set the 'activeTodormancyTimer' under one or more of the following conditions which indicate potential need for resources on the cell: 1) UE transmits RACH; 2) UE transmits SR; 3) UE transmits scheduled PUSCH; 4) UE transmits CG PUSCH; 5) UE transmits PUCCH; 6) UE transmits SRS; 7) UE receives UE-specific grant; or 8) UE receives PDSCH.

Figure 22:
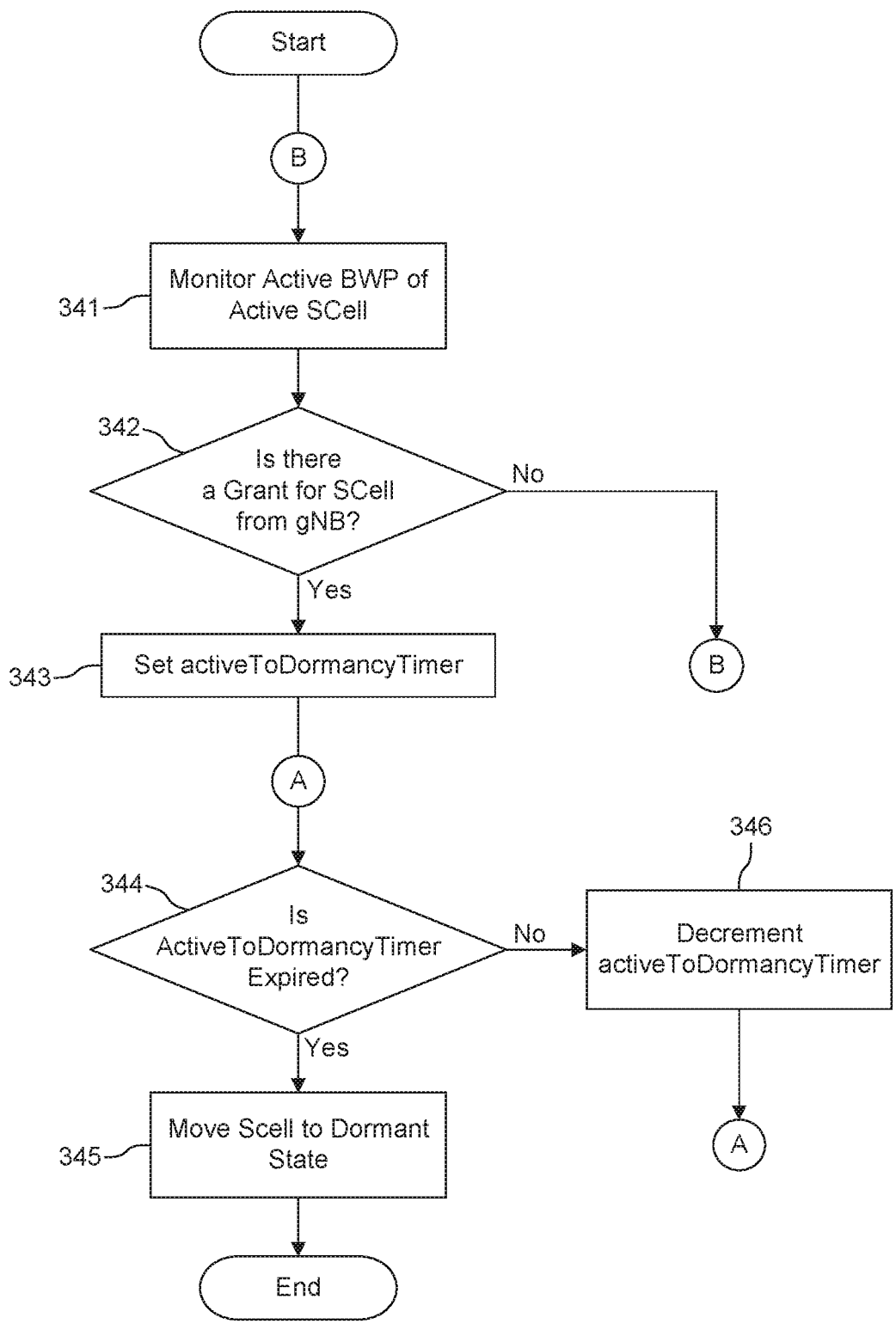
FIG. 22 illustrates exemplary UE procedure to switch a cell from active to dormant using active TodormancyTimer.

When the timer expires, the UE may switch to the dormant state. The procedure is illustrated in FIG. 22. At step 341, the active BWP of the active SCell may be monitored. At step 342, determine whether there is a grant for SCell from gNB. Proceed to step 341 (B) if no grant and proceed to step 343 if there is a grant. At step 343, activetoDorancyTimer may be set. At step 344, determine whether activeToDormancyTimer has expired. Proceed to step 346 if not expired and proceed to step 345 if expired. At step 345, based on the expiring of the timer, then there may be a move of SCell to dormant state. Alternatively, at step 346, if no expiration of the timer then decrement and proceed back to step 344.

Figure 23:
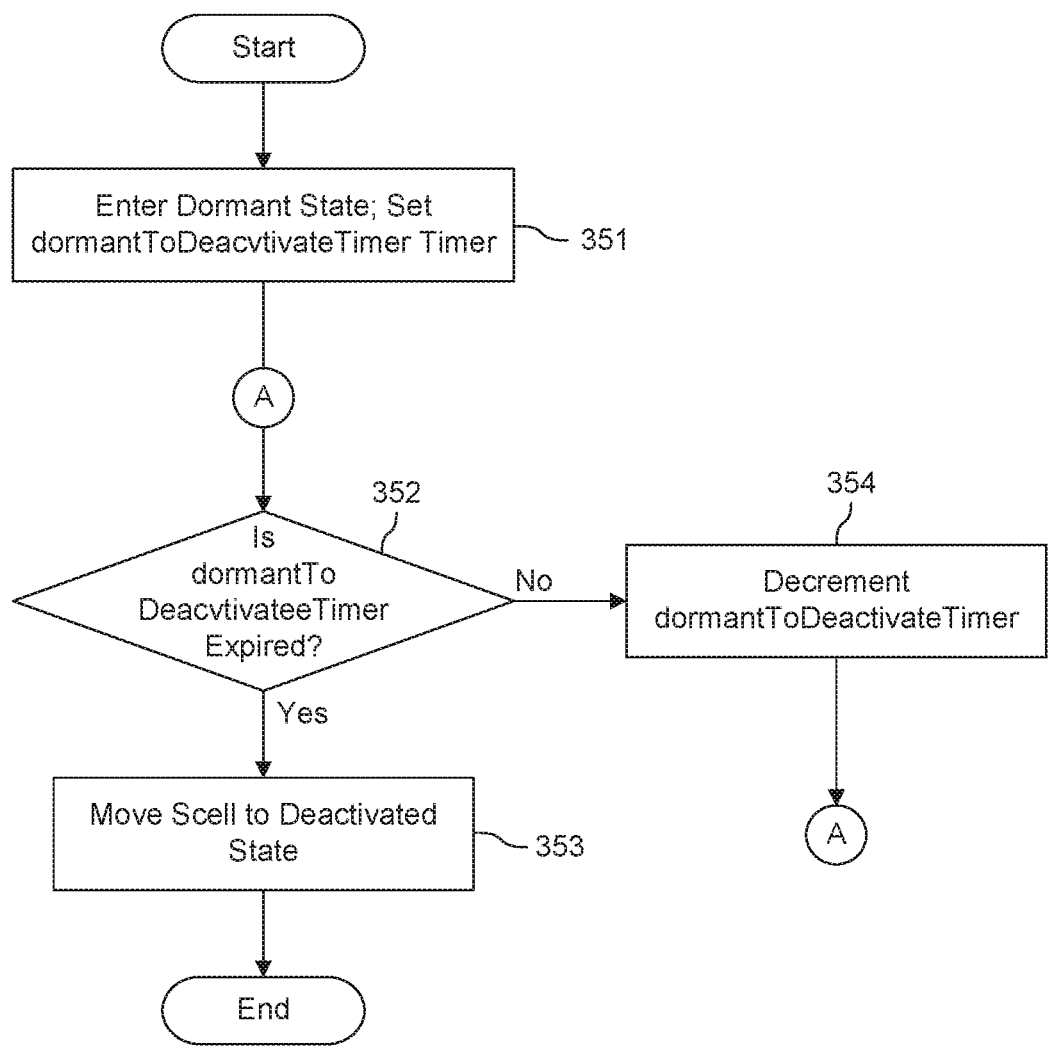
FIG. 23 illustrates exemplary procedure for UE to switch from dormant to deactivated state.

A timer 'dormantToDeactiveTimer' may be used to determine when a cell must switch from dormant to deactivated state. The UE may set this timer when it enters the dormant state. Alternatively, the UE may receive an indication from the gNB to start the timer on the same SCell or the PCell or PSCell. On receiving this indication, the UE starts this timer. When the timer expires, the UE may deactivate the cell. This procedure is shown in FIG. 23. At step 351, dormant state is entered and dormantToDeactivateTimer may be set. At step 353, there is a determination of whether dormantToDeactivateTimer is expired. If expired, then move SCell to deactivated state as provided in step 353. If not expired, then decrement dormantToDeactivateTimer as provided in step 354. Subsequent to decrement, UE may proceed back to step 352.

If the UE receives a cell-activation indication during the dormant state, the UE may suspend (e.g., freeze) dormantToDeactiveTimer and activates the cell.

SCell procedures for power savings—Bundled behavior on PCell/PSCell and SCells: If a UE sleeps on an SCell at the same time that it sleeps on the PCell, it can optimize its power saving by ramping down various Rx-Tx and digital operations in the modem. So it may be advantageous to synchronize the UE's power states between the PCell and SCells to the possible extent.

Also, for use cases with bursty traffic, the SCells supplement the PCell or PSCell with more resources. If the UE is unlikely to receive or transmit on the PCell or PSCell, then it is unlikely to receive or transmit on the SCells. So, the SCells may be bundled in a way that if the power savings signal is received in one cell, then it may impact the behavior on S SCells. Or, certain UE behavior on one cell influences the UE behavior on the cells in the bundle.

Figure 24:
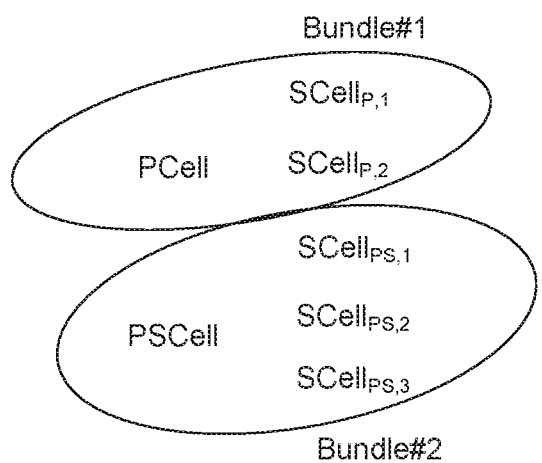
FIG. 24 illustrates exemplary UE has 2 bundles of cells configured—one bundle with PCell and with PSCell.

The concept of bundling is shown in FIG. 24 where the UE's PCell is bundled with some SCells and PSCell is bundled with some SCells.

Figure 25:
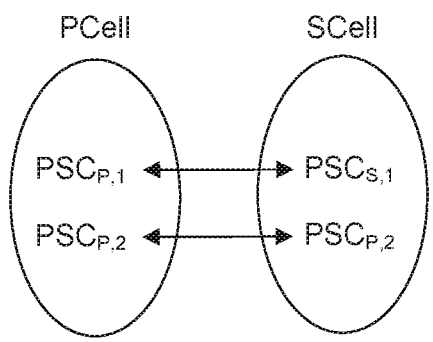
FIG. 25 illustrates exemplary correspondence if PSCs between PCell and a bundles SCell

A correspondence between PSCs of the bundled cells may define the behavior of the bundled cells. For example, as shown in FIG. 25, a PSC on PCell may correspond to a PSC in the SCell. If $PSC_{P,1}$ of PCell is activated, then $PSC_{S,1}$ of SCell is automatically activated.

Figure 26:
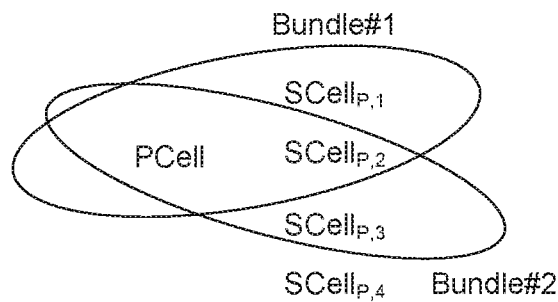
FIG. 26 illustrates exemplary one cell may be included in multiple bundles.

A single cell may also be present in multiple bundles as shown in the example in FIG. 26. Here the PCell is part of two bundles. At a time one bundle may be active—so, the SCells in that bundle may be influenced by the signaling or behavior in the PCell. For example, if bundle #1 is active, UE may micro-sleep in $SCell_1$ and $SCell_2$ when it micro-sleeps in the PCell.

An active bundle may be configured through RRC signaling or provisioned through a MAC CE through L1 signaling such as the power savings signal.

Any PSC activation or PSC deactivation or micro-sleep behavior in a cell may trigger corresponding activation, deactivation or micro-sleep behavior in all cells in the active bundle. Optionally, a leader may be defined for a bundle; so activation or deactivation or micro-sleep behavior on the leader cell alone automatically triggers PSC activation, PSC deactivation, or micro-sleep behavior in the active bundle.

A wake-up signal or sleep signal on one Cell may indicate the UE to wake up or sleep on another cell. For example, a wake-up on the PCell may indicate the UE to wake-up on its PCell and S of its N configured SCells. Alternatively, a wake-up signal on the PCell may indicate the UE to wake-up on its PCell from micro-sleep and activate S of its N configured SCells from the dormant state.

A go-to-sleep signal on the PCell may indicate the UE to micro-sleep on the PCell and micro-sleep on S of its N SCells for certain duration such as D DRX cycles. Alternatively, a go-to-sleep signal on the PCell may indicate the UE to micro-sleep on the PCell for certain duration such as D DRX cycles and switch to the dormant state on S of its N SCells.

The wake-up signal or go-to-sleep signal may also indicate the specific bundle (of S) SCells that must react to the power savings procedure. The bundles, indexed in a table, may be configured through RRC. An index into this table may be provided by the power savings signal to indicate the activated bundle.

Figure 27:
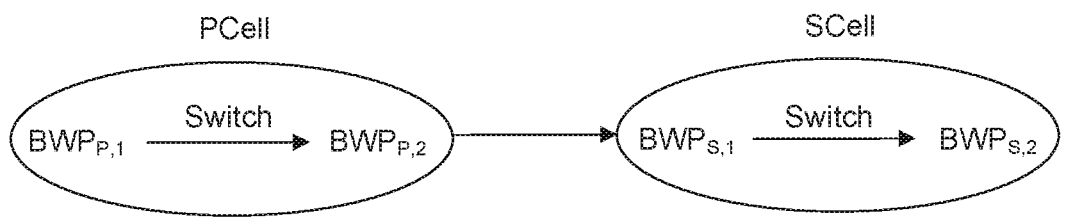
FIG. 27 illustrates exemplary BWP-switch in PCell triggers a BWP-switch in SCell

If the power savings signal is in the form of a BWP activation DCI, a BWP switch in one cell may automatically trigger a BWP switch on bundled cells. For example, a BWP switch in the PCell from $BWP_{P,1}$ or $BWP_{P,2}$ may trigger a BWP switch from $BWP_{S,1}$ or $BWP_{S,2}$ on the bundled SCell as shown in FIG. 27.

If a UE's BWPInactivityTimer expires on the PCell, the UE switches to the default BWP on the PCell. This switch may also trigger the UE to switch to the default BWP on a bundled SCell after completing a scheduled transmission on the SCell, even if the SCell's BWPInactivityTimer has not expired.

Alternatively, when a UE may switch to the default BWP in a Cell such as the PCell, the UE may go to the dormant state in the bundled SCells.

If a CORESET or search space is activated or deactivated for one cell, a corresponding CORESET or search space may be activated or deactivated for the bundled cells.

In general, a power savings signal received on an SCell may also impact the micro-sleep behavior on a PCell or PSCell or another SCell. And the solutions discussed above may also apply to this scenario.

SCell procedures for power savings—UE-assisted SCell activation: When a UE has data to send, it may activate S SCells. A sample procedure is described below and illustrated in FIG. 28. At step 361, when UE 99 sends an SR (which may be on a PCell or SCell), it activates a bundle which may have been in the dormant state. The bundle may be autonomously selected by UE 99 or configured by the gNB 98. At step 362, gNB 98 may provide a UL grant. At step 363, UE 99 may feedback the activated bundle to gNB 98. This indication may be sent along with the UE's BSR. If gNB 98 does not schedule UE 99 on a cell (from the activated bundle) within 'activeTodormancyTimer' expiration, UE 99 may return that cell to the dormant state. At step 364, gNB 98 may provide schedule for UL.

If UE 99 has the option to choose from multiple bundles, it may select a bundle based on the amount of data to be transmitted, for example, its BSR. Larger BSR may imply activating a bundle with more cells or cells with larger bandwidth.

The PDCCH based power savings signal may include one or more of the following fields in its DCI, as shown in Table 4.

TABLE 4

| Fields | Description |
| --- | --- |
| Wake-up-indicator | Wake Up Indication |
| GTS-indicator | Go to sleep indication |
| BWP-indicator | BWP to switch to on receiving Wake-up or GTS indication |
| PSC-indicator | Power saving configuration to use for PCell and PSCell and SCells |
| TDRA-indicator | TDRA table to be used |
| SCell-activation | Activate/deactivate one or more SCells |
| Search-space-indication | Indicate parameters to change the monitoring periodicity |

FIG. 39 illustrates exemplary fields and locations of the fields within the DCI. Not all fields may be present for each UE. The applicable fields in a DCI may be configured to the UE through RRC signaling. It is contemplated that a single DCI may carry the power savings instruction to multiple UEs. In this case, the location of the fields within a DCI for a UE may also be indicated through RRC signaling as shown in the example in FIG. 39. Here UE1, UE2 have a common 'field1' while only UE1 is configured to receive 'field2'. For example, UEs that do have SCells need not receive fields related to SCell activation.

As a special case, a GTS PDCCH may be a signal to provide only a single bit of information to each UE through a common DCI. Here, each bit in the DCI payload may correspond to one UE. The location of the bit in the bitmap may be configured to the UE; so the UE may look for the bot in that location to decide if it has received an instruction to sleep.

Figure 29:
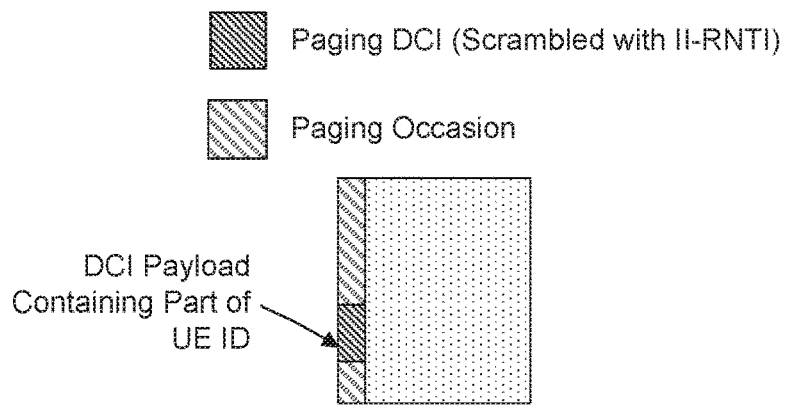
FIG. 29 illustrates exemplary UE-specific paging DCI without PDSCH. DCI is scrambled with part of UE's ID and remaining part of UE ID is in the payload of the DCI.

Power savings in the IDLE or INACTIVE state—UE specific paging DCI. In order to avoid false alarm, a UE may be paged by a UE-specific DCI. In the IDLE or INACTIVE state, the DCI may use an IDLE/INACTIVE-ID to scramble the DCI. The II-ID may be derived from the UE's ID such as the IMSI or TMSI by masking some of the bits in IMSI or TMSI. This reduces false paging alarm but does not fully eliminate it as multiple UEs can have the same II-ID even if their IMSI/TMSI are unique. The DCI may carry in the payload, the masked bits of the UE's identity as shown in FIG. 29. Together with the II-ID and DCI payload, the UE may recognize if it has been paged. The UE need not decode a PDSCH to determine if it has been paged. This provides some power savings.

As paging DCIs are UE-specific, the resources for control signaling may be significant for the gNB and may block other PDCCHs in the CORESET. So this method may be suitable for cells with few UEs and low traffic load. For example, a sensor deployment in a small cell may be configured for such operation. However, for flexibility, the gNB may switch the type of paging to adapt to the ongoing traffic. The gNB may indicate the type of paging used, e.g., UE-specific paging or legacy (broadcast) paging method through SI such as the MIB or RMSI.

The gNB may also support a specific paging method for certain use cases. For example, for URLLC UEs, the gNB may provide UE-specific paging to enable low latency operation. For mMTC UEs, the gNB may provide UE-specific paging to avoid false paging alarms. Whereas for eMBB UEs, the gNB may still employ legacy paging. Enough context about the UE may be stored in the network to enable a suitable paging method for a given UE.

Figure 30:
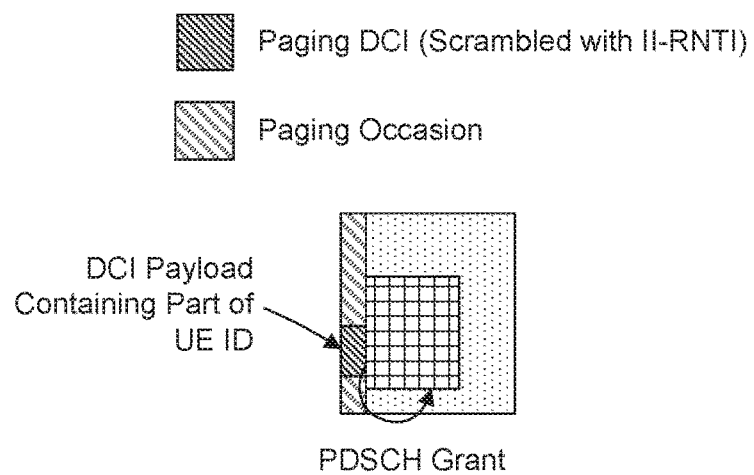
FIG. 30 illustrates exemplary UE-Specific paging DCI also providing a PDSCH grant to the UE.

The UE-specific paging DCI need not provide PDSCH allocation. However, for some case, it is advantageous to support grant provision though the UE-specific paging DCI. For example, a URLLC UE may receive a DL or UL grant in the UE-specific paging DCI as shown in FIG. 30.

For some use cases, it may be beneficial to support both broadcast and UE-specific paging. If a UE supports both URLLC and eMBB traffic, it may be paged through one or the other method. UE-specific DCI with a grant may be provided for URLLC traffic. Legacy paging may be used for eMBB traffic. So the UE may monitor both types of paging DCIs. The monitoring occasions may be configured independently for each paging type.

Figure 31:
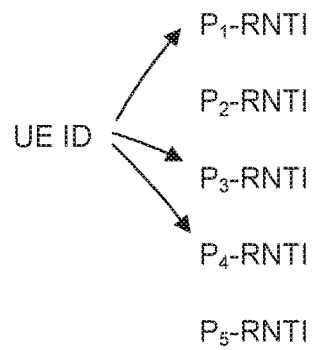
FIG. 31 illustrates exemplary UE monitors $R_1$-RNTI, $P_2$-RNTI and $P_4$-RNTI out of the pool of paging RNTIs.

Power savings in the IDLE or INACTIVE state—Configuring Multiple Paging-RNTIs (P-RNTI). The gNB may configure multiple P-RNTIs in a network. They may be available through the SI, such as RMSI or OSI. A hash function may map a UE's ID such as IMSI or TMSI to N Paging RNTIs (denoted by $P_1$-RNTI, $P_2$-RNTI, ... $P_N$-RNTI). Then the UE may monitor paging indication only on the paging RNTIs corresponding to its ID. As the gNB splits the UEs across different RNTIs, number of false paging alarms per UE can be reduced. The UE still has to decode the paging PDSCH to detect if its UE ID is resent to determine if it has been paged. FIG. 31 UE may monitor R1-RNTI, P2-RNTI, or P4-RNTI out of the pool of paging RNTIs.

Power savings in the IDLE or INACTIVE state—Using a Wake-up signal for paging: A wake-up signal may be used to indicate whether or not a UE should monitor during a paging occasion. This may reduce excessive monitoring during the paging occasions. The wake-up signal may be in the form of an OOK signal or an RS or DCI in the common search space. When the UE detects the wake-up signal, it monitors the paging DCI in the following paging occasion. If it does not detect the wake-up signal, it need not monitor the following paging occasion.

The wake-up signal configurations may be provided through the RMSI or OSI. For example, multiple OOK configurations may be broadcasted. A UE's ID may map to one or more OOK signals. Then the UE may monitor those specific OOK signals for indication of wake-up signaling for paging.

It is understood that the entities performing the steps illustrated herein may be logical entities. The steps may be stored in a memory of, and executing on a processor of, a device, server, or computer system such as those illustrated in FIG. 21-FIG. 23, or FIG. 28, among others. Skipping steps, combining steps, or adding steps between exemplary methods disclosed herein is contemplated. Table 4 provides example abbreviations and definitions.

TABLE 5

Abbreviations and Definitions

| Abbreviations | Definitions |
| --- | --- |
| AL | Aggregation Level |
| BWP | Bandwidth Part |

TABLE 5-continued

Abbreviations and Definitions

| Abbreviations | Definitions |
| --- | --- |
| CDRX | Connected Mode Discontinuous Reception |
| C-RNTI | Cell Radio-Network Temporary Identifier |
| CSI-RS | Channel State Information Reference Signal |
| DCI | Downlink Control Information |
| DL | Downlink |
| DRX | Discontinuous Reception |
| eMBB | enhanced Mobile Broadband |
| FDD | Frequency Division Duplex |
| gNB | NR NodeB |
| GTS | Go-to-Sleep |
| IE | Information Element |
| L1 | Layer-1 |
| LTE | Long Term Evolution |
| MAC | Medium Access Control |
| MIB | Master Information Block |
| NB | NodeB |
| NR | New Radio |
| OFDM | Orthogonal Frequency Division Multiplexing |
| OOK | On-Off Keying |
| OSI | Other System Information |
| PDCCH | Physical Downlink Control CHannel |
| PHY | Physical Layer |
| POW | Pre-OnDuration-Window |
| PRACH | Physical Random Access Channel |
| PSC | Power Savings Configuration |
| RACH | Random Access Channel |
| RAN | Radio Access Network |
| RMSI | Remaining System Information |
| RNTI | Radio Network Temporary Identification |
| RRC | Radio Resource Control |
| SFI | Slot format Indicator |
| SI | System Information |
| SLIV | Start and Length Indicator Value |
| SR | Scheduling Request |
| TDD | Time Division Duplex |
| TDRA | Time Domain Resource Allocation |
| TRS | Tracking Reference Signal |
| TTI | Transmission Time Interval |
| UE | User Equipment |
| UL | Uplink |

Figure 11:
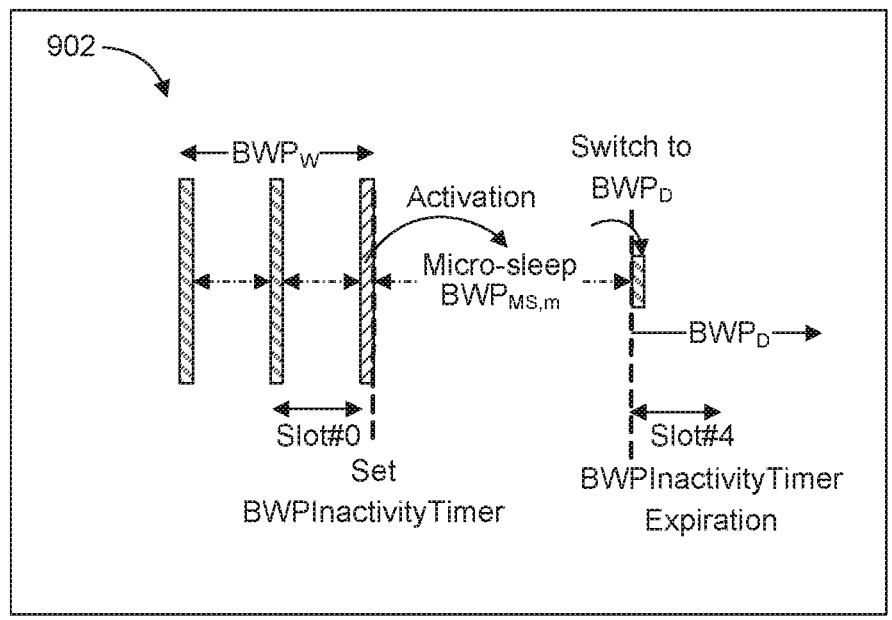
FIG. 11 illustrates exemplary display that may be generated based on the methods, systems, and devices of power saving in NR.
Figure 33:
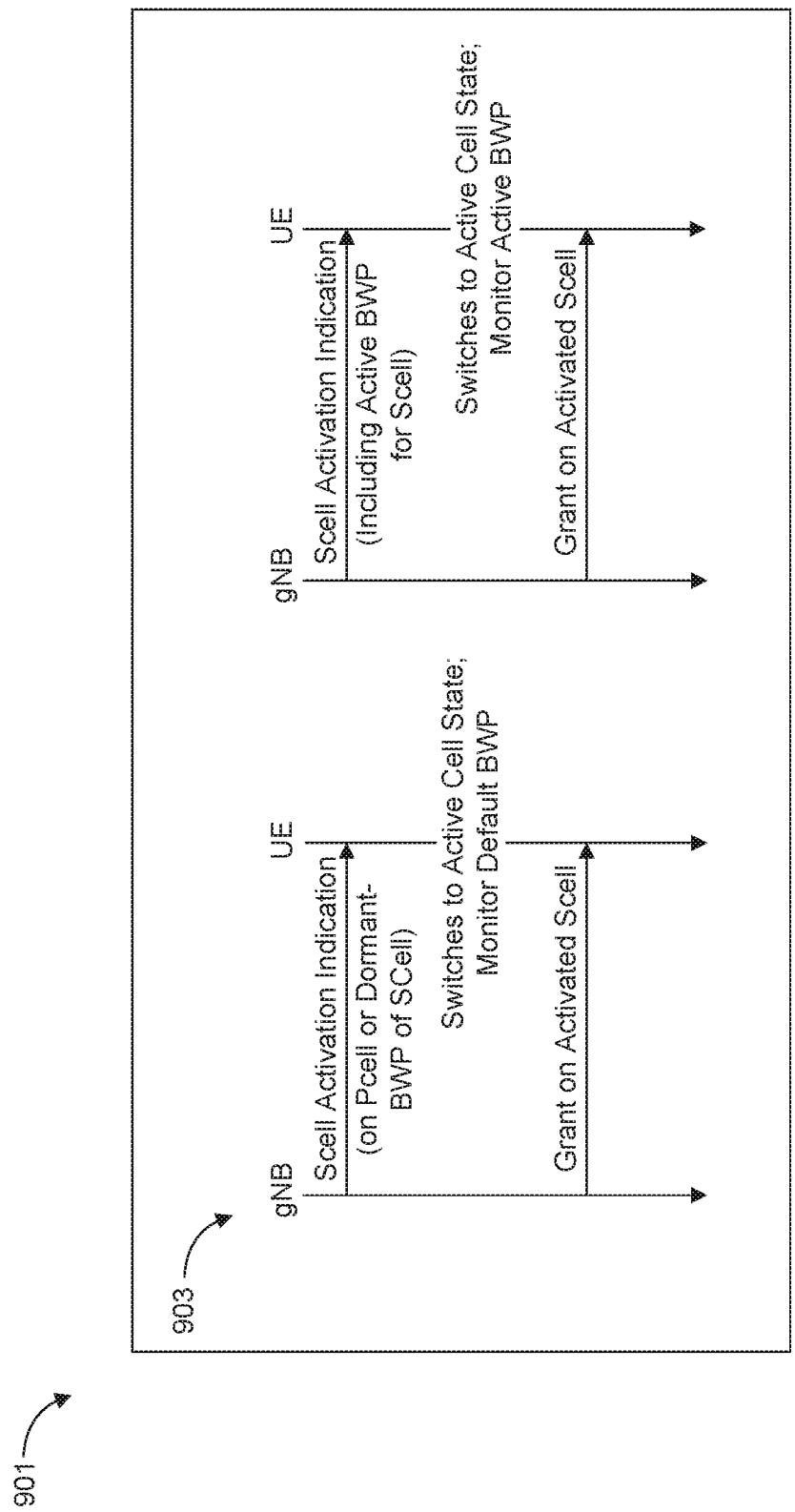
FIG. 33 illustrates exemplary display that may be generated based on the methods, systems, and devices herein.

FIG. 11 and FIG. 33 illustrate exemplary displays (e.g., graphical user interface) that may be generated based on the methods, systems, and devices of power saving in NR, as discussed herein. Display interface 901 (e.g., touch screen display) may provide text in block 902 associated with of power saving in NR, such as RRC related parameters, monitoring PDCCH for the wake-up trigger, and other power saving method flows, among other things. Progress of any of the steps (e.g., sent messages or success of steps) discussed herein may be displayed with output 902 or output 903. In addition, graphical output 902 or output 903 may be displayed on display interface 901. Graphical output may be the topology of the devices implementing the methods, systems, and devices of power saving in NR, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive recall, disaster alerts, real-time gaming, multi-person video calls, autonomous driving, augmented reality, tactile internet, virtual reality, home automation, robotics, and aerial drones to name a few. All of these use cases and others are contemplated herein.

Figure 32A:
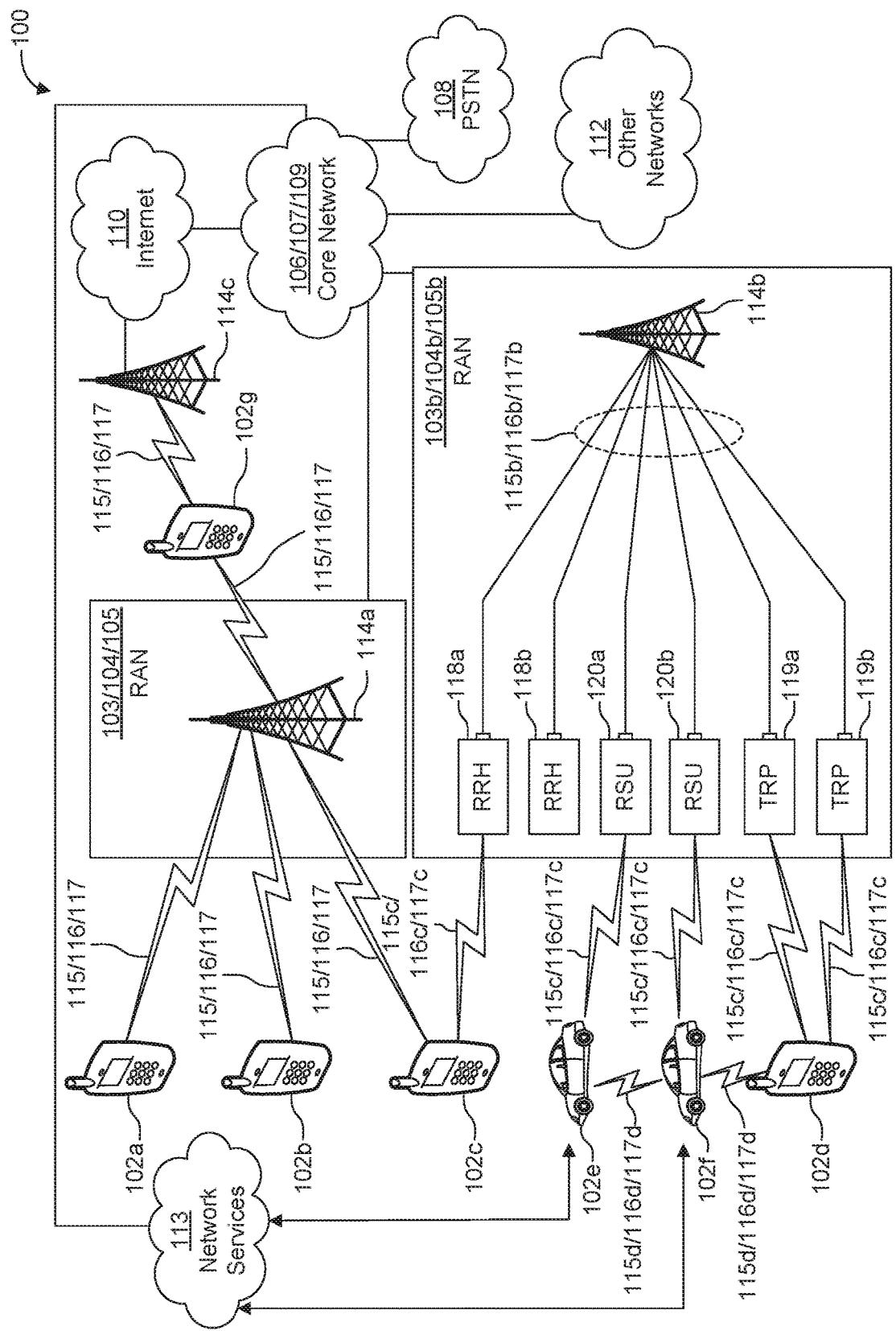
FIG. 32A illustrates exemplary communications system.

FIG. 32A illustrates an example communications system 100 in which the methods and apparatuses of power savings in NR, described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 32A, FIG. 32B, FIG. 32C, FIG. 32D, FIG. 32E, or FIG. 32F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 32A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of power saving in NR, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b,TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/

104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 32A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of power saving in NR, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 32A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 32A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of power saving in NR, as disclosed herein. For example, the WTRU 102g shown in FIG. 32A may be configured to communicate with the base station 114a, which may employ a cellular-based radio technology, and with the base station 114c, which may employ an IEEE 802 radio technology.

Although not shown in FIG. 32A, it will be appreciated that a User Equipment may make a wired connection to a gateway. The gateway maybe a Residential Gateway (RG). The RG may provide connectivity to a Core Network 106/107/109. It will be appreciated that many of the ideas included herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 32B:
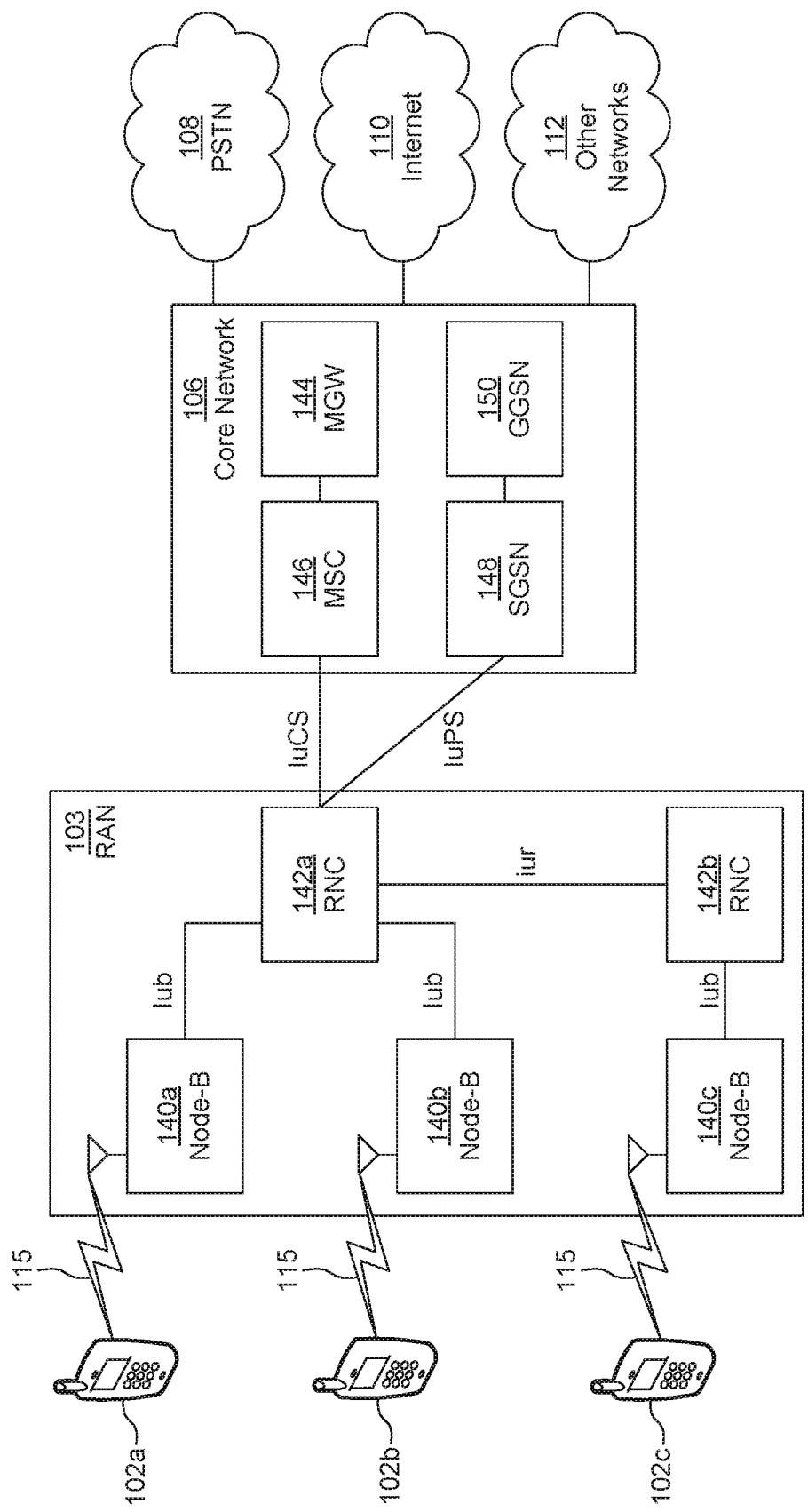
FIG. 32B illustrates exemplary system that includes RANs and core networks.

FIG. 32B is a system diagram of an example RAN 103 and core network 106 that may implement methods, systems, and devices of power saving in NR, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 32B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 32B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 32B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102*c* with access to circuit-switched networks, such as the PSTN 108, to facilitate communications between the WTRUs 102*a*, 102*b*, and 102*c*, and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, and 102*c* with access to packet-switched networks, such as the Internet 110, to facilitate communications between and the WTRUs 102*a*, 102*b*, and 102*c*, and IP-enabled devices.

The core network 106 may also be connected to the other networks 112, which may include other wired or wireless networks that are owned or operated by other service providers.

Figure 32C:
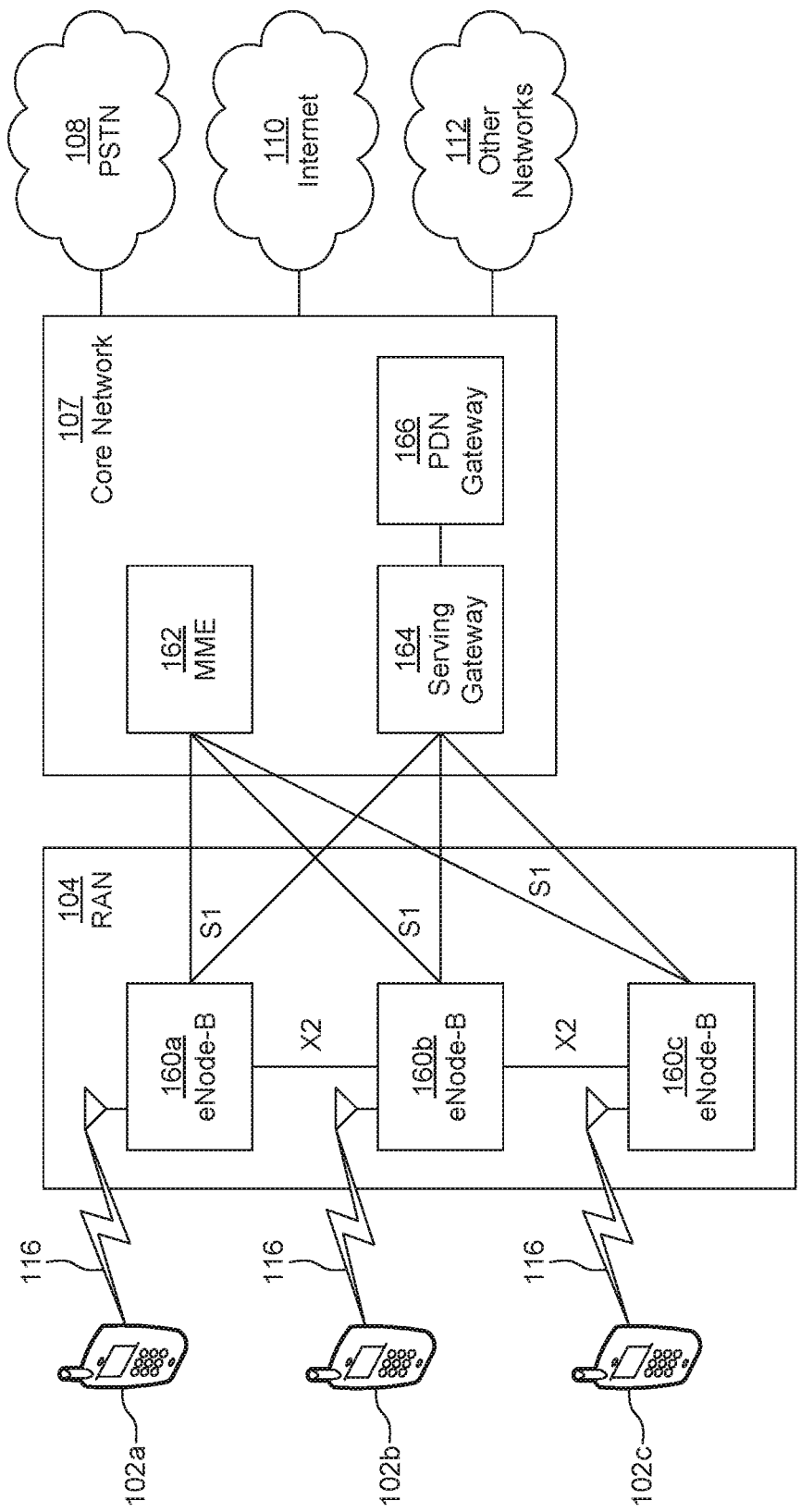
FIG. 32C illustrates exemplary system that includes RANs and core networks.

FIG. 32C is a system diagram of an example RAN 104 and core network 107 that may implement methods, systems, and devices of power saving in NR, as disclosed herein. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, and 160*c*, though it will be appreciated that the RAN 104 may include any number of eNode-Bs. The eNode-Bs 160*a*, 160*b*, and 160*c* may each include one or more transceivers for communicating with the WTRUs 102*a*, 102*b*, and 102*c* over the air interface 116. For example, the eNode-Bs 160*a*, 160*b*, and 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink or downlink, and the like. As shown in FIG. 32C, the eNode-Bs 160*a*, 160*b*, and 160*c* may communicate with one another over an X2 interface.

The core network 107 shown in FIG. 32C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, and 102*c*, bearer activation/deactivation, selecting a particular serving gateway during an initial attach of the WTRUs 102*a*, 102*b*, and 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, and 102*c*. The serving gateway 164 may also perform other functions, such as anchoring user planes during inter-eNode B handovers, triggering paging when downlink data is available for the WTRUs 102*a*, 102*b*, and 102*c*, managing and storing contexts of the WTRUs 102*a*, 102*b*, and 102*c*, and the like.

The serving gateway 164 may also be connected to the PDN gateway 166, which may provide the WTRUs 102*a*, 102*b*, and 102*c* with access to packet-switched networks, such as the Internet 110, to facilitate communications between the WTRUs 102*a*, 102*b*, 102*c*, and IP-enabled devices.

The core network 107 may facilitate communications with other networks. For example, the core network 107 may provide the WTRUs 102*a*, 102*b*, and 102*c* with access to circuit-switched networks, such as the PSTN 108, to facilitate communications between the WTRUs 102*a*, 102*b*, and 102*c* and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102*a*, 102*b*, and 102*c* with access to the networks 112, which may include other wired or wireless networks that are owned or operated by other service providers.

Figure 32D:
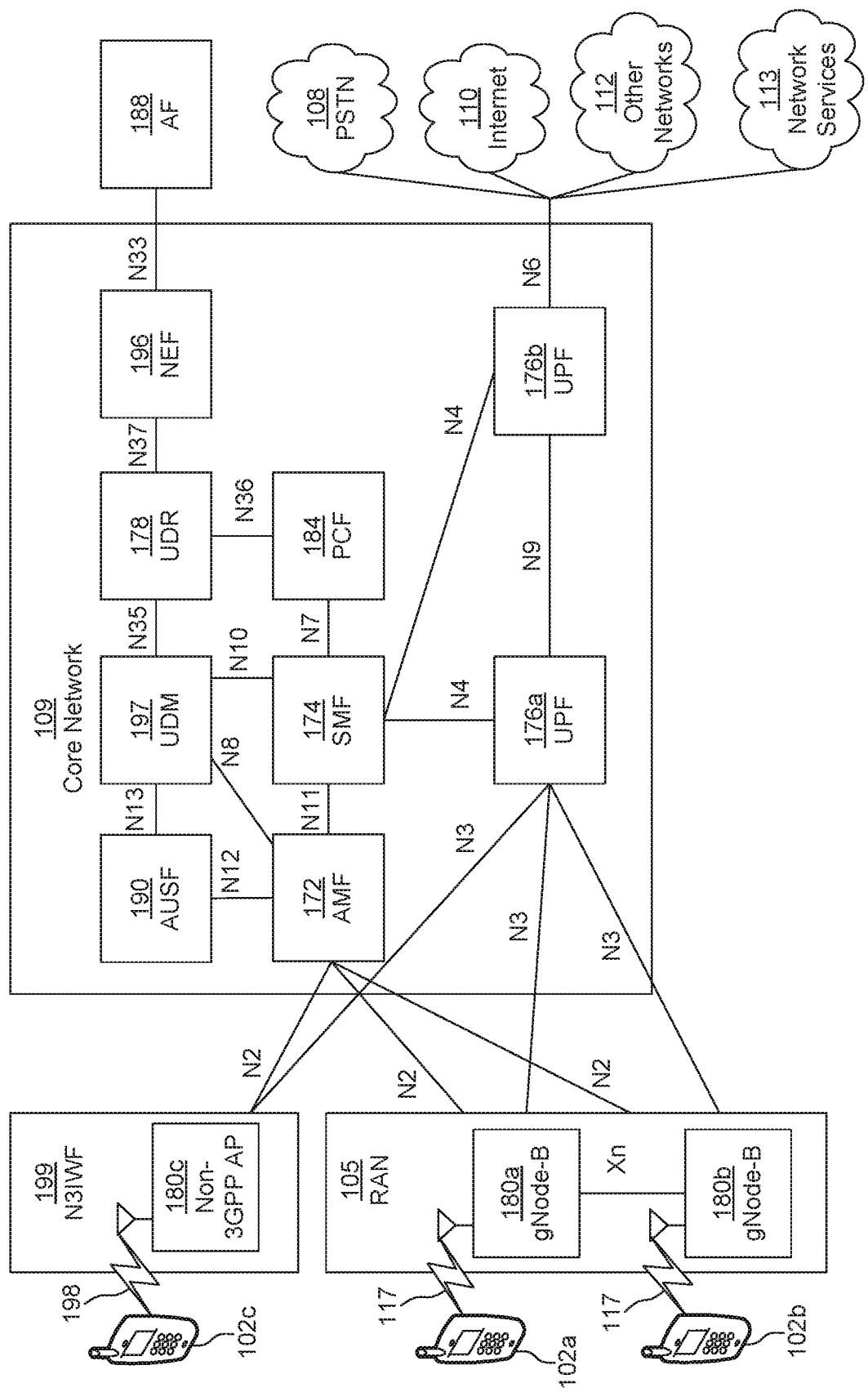
FIG. 32D illustrates exemplary system that includes RANs and core networks.

FIG. 32D is a system diagram of an example RAN 105 and core network 109 that may implement methods, systems, and devices of power saving in NR, as disclosed herein. The RAN 105 may employ an NR radio technology to communicate with the WTRUs 102*a* and 102*b* over the air interface 117. The RAN 105 may also be in communication with the core network 109. A Non-3GPP Interworking Function (N3IWF) 199 may employ a non-3GPP radio technology to communicate with the WTRU 102*c* over the air interface 198. The N3IWF 199 may also be in communication with the core network 109.

The RAN 105 may include gNode-Bs 180*a* and 180*b*. It will be appreciated that the RAN 105 may include any number of gNode-Bs. The gNode-Bs 180*a* and 180*b* may each include one or more transceivers for communicating with the WTRUs 102*a* and 102*b* over the air interface 117. When integrated access and backhaul connection are used, the same air interface may be used between the WTRUs and gNode-Bs, which may be the core network 109 via one or multiple gNBs. The gNode-Bs 180*a* and 180*b* may implement MIMO, MU-MIMO, or digital beamforming technology. Thus, the gNode-B 180*a*, for example, may use multiple antennas to transmit wireless signals to, and receive wireless signals from, the WTRU 102*a*. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180*c*. It will be appreciated that the N3IWF 199 may include any number of non-3GPP Access Points. The non-3GPP Access Point 180*c* may include one or more transceivers for communicating with the WTRUs 102*c* over the air interface 198. The non-3GPP Access Point 180*c* may use the 802.11 protocol to communicate with the WTRU 102*c* over the air interface 198.

Each of the gNode-Bs 180*a* and 180*b* may be associated with a particular cell (not shown) and may be configured to handle radio resource management decisions, handover decisions, scheduling of users in the uplink or downlink, and the like. As shown in FIG. 32D, the gNode-Bs 180*a* and 180*b* may communicate with one another over an Xn interface, for example.

The core network 109 shown in FIG. 32D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 32G.

In the example of FIG. 32D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 32D shows that network functions directly connect to one another, however, it should be appreciated that they may communicate via routing agents such as a diameter routing agent or message buses.

In the example of FIG. 32D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 32D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 32D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 32D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 32A, FIG. 32C, FIG. 32D, or FIG. 32E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 32A, FIG. 32B, FIG. 32C, FIG. 32D, or FIG. 32E are provided by way of example only, and it is understood that the subject matter disclosed and claimed herein may be embodied or implemented in any similar communication system, whether presently defined or defined in the future.

Figure 32E:
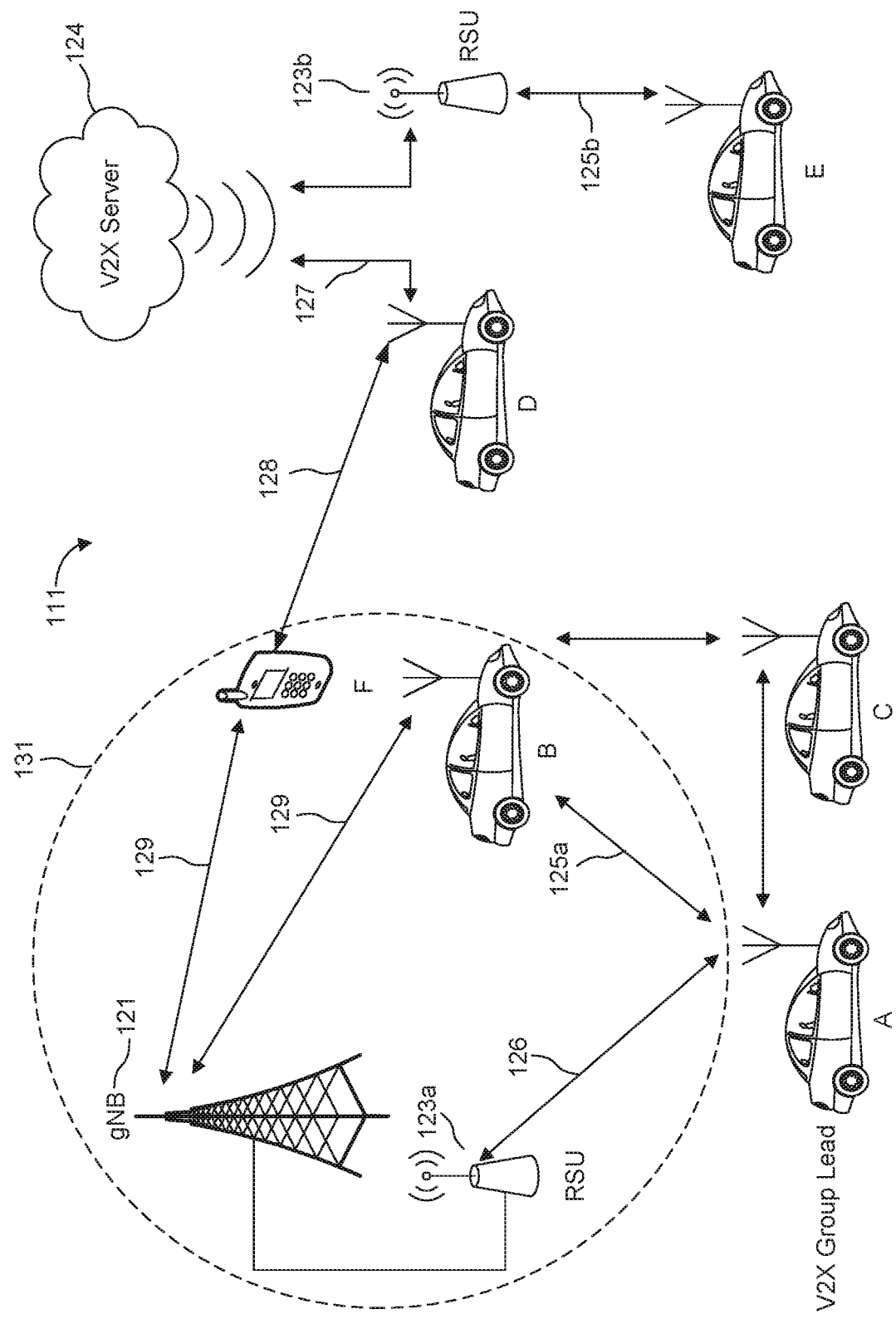
FIG. 32E illustrates another example communications system.

FIG. 32E illustrates an example communications system 111 in which the systems, methods, apparatuses that implement power saving in NR, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 32E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 32E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 32F:
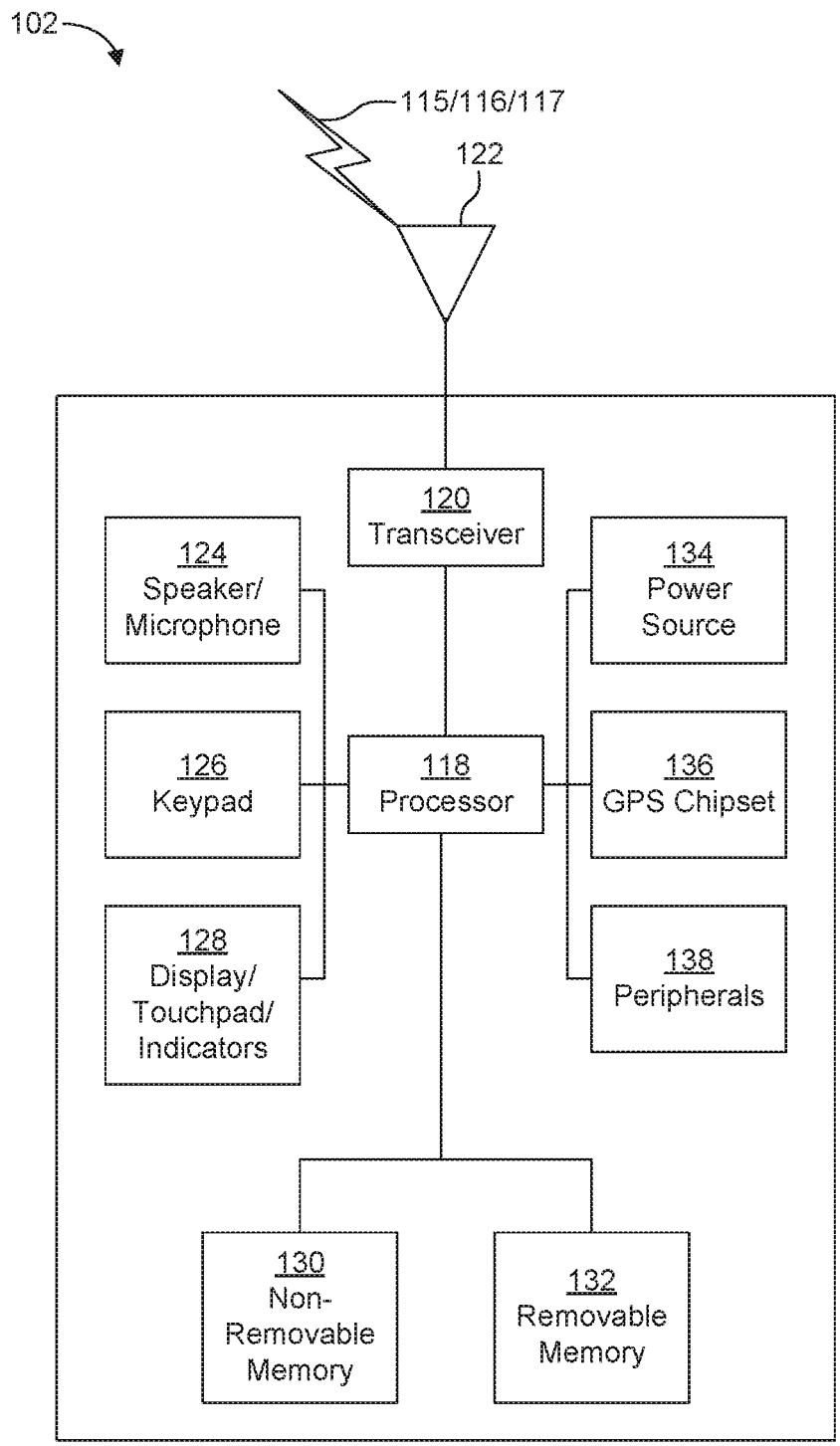
FIG. 32F is a block diagram of an example apparatus or device, such as a WTRU.

FIG. 32F is a block diagram of an example apparatus or device WTRU 102 that may be configured for wireless communications and operations in accordance with the systems, methods, and apparatuses that implement power saving in NR, described herein, such as a WTRU 102 of FIG. 32A, FIG. 32B, FIG. 32C, FIG. 32D, or FIG. 32E, FIG. 21, or FIG. 28 (e.g., UEs 99 or gNBs 98). As shown in FIG. 32F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 32F and may be an exemplary implementation that performs the disclosed systems and methods for power saving in NR described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 32F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114*a* of FIG. 32A) over the air interface 115/116/117 or another UE over the air interface 115*d*/116*d*/117*d*. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 32F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the power saving in NR in some of the examples described herein are successful or unsuccessful, or otherwise indicate a status of power saving in NR and associated components. The control lighting patterns, images, or colors on the display or indicators 128 may be reflective of the status of any of the method flows or components in the FIG.'s illustrated or discussed herein (e.g., FIG. 1-FIG. 31, etc.). Disclosed herein are messages and procedures of power saving in NR. The messages and procedures may be extended to provide interface/API for users to request resources via an input source (e.g., speaker/microphone 124, keypad 126, or display/touchpad/indicators 128) and request, configure, or query power saving in NR related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 28:
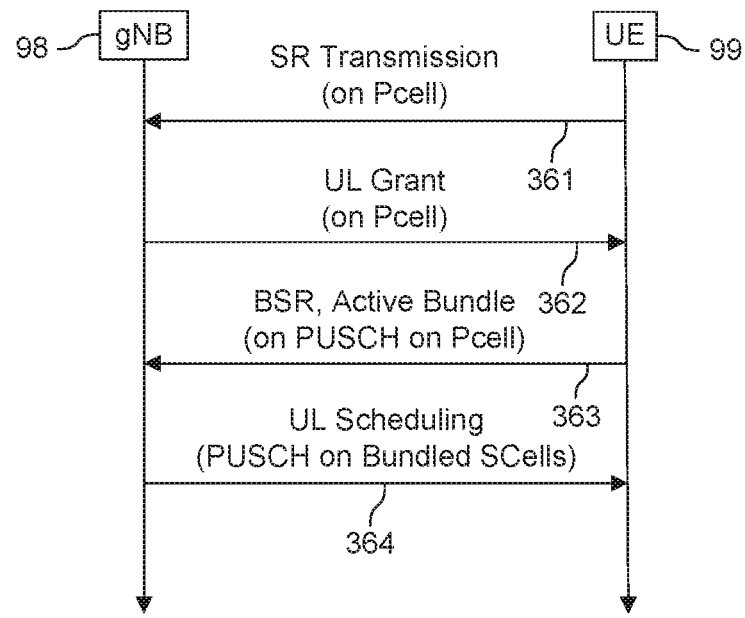
FIG. 28 illustrates exemplary procedure for UE to activate a bundle of cells.
Figure 32G:
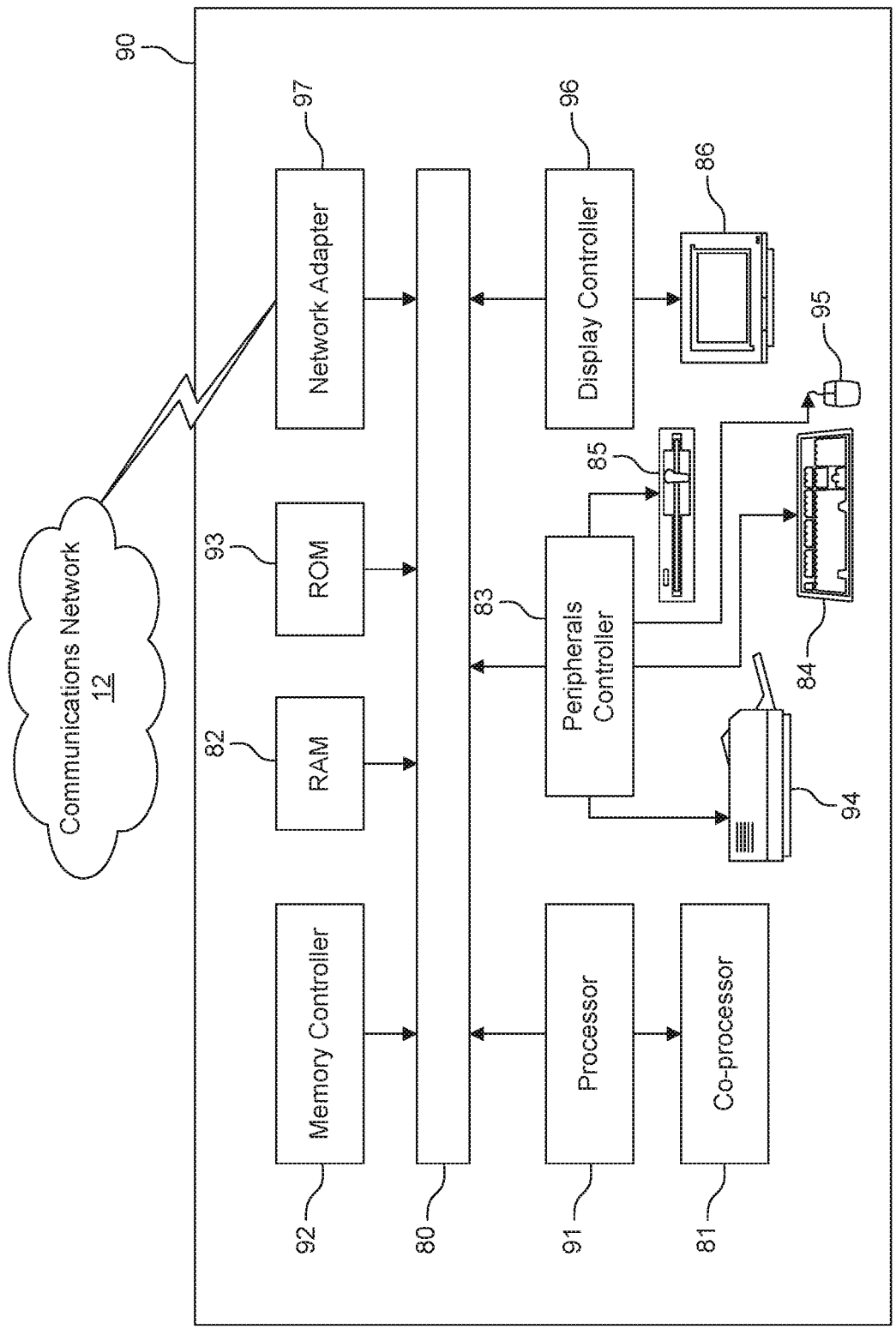
FIG. 32G is a block diagram of an exemplary computing system.

FIG. 32G is a block diagram of an exemplary computing system 90 in which one or more apparatuses of the communications networks illustrated in FIG. 32A, FIG. 32C, FIG. 32D and FIG. 32E as well as power saving in NR, such as the systems and methods illustrated in FIG. 21 or FIG. 28 and others described and claimed herein, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for power saving in NR.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 32A, FIG. 32B, FIG. 32C, FIG. 32D, or FIG. 32E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—power saving in NR—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

In the discussions herein, the signal used to send the UE to micro-sleep may be referred to as a go-to-sleep (GTS) signal. The signal used to wake-up a UE that is in sleep mode may be referred to as a wake-up signal. The wake-up and GTS signals are referred to a power savings signal in the remainder of the discussions. Although specific examples may apply to the wake-up signal or GTS, the solutions applicable to one signal may also apply to the other signal.

Methods, systems, apparatuses (e.g., user equipment), or computer readable storage mediums, among other things, as described herein may provide for means for power saving mechanisms in new radio. A method, system, computer readable storage medium, or apparatus has means for periodically monitoring PDCCH for the wake-up trigger providing an aperiodic TRS; and when the UE receives the wake-up trigger, switching back to $BWP_W$, and using the aperiodic TRS to fine tune its timing and frequency. A method, system, computer readable storage medium, or apparatus has means for waking up when an OnDuraction occurs for the user equipment; during the OnDuration, monitoring PDCCH for the wake-up trigger on the first monitoring occasion; and when the UE receives the wake-up trigger of a PDCCH on the first monitoring occasion, waking up; or else sleeping and not monitoring other occasions in the OnDuration. A method, system, computer readable storage medium, or apparatus has means for obtaining a message for multiple power savings configurations (PSCs) for the user equipment; and activating one of the PSCs based on a traffic condition or an application. A method, system, computer readable storage medium, or apparatus has means for operating in a dormant state when the user equipment is in an RRC-Connected mode; and based on being in the dormant state performing one or more of the following: 1) reporting measurements or tracking through the PCell or PSCell; or 2) monitoring for activation which is indicated on the PCell or PSCell through higher layer signaling or through L1 signaling and restricting the number of blind decodes. A method, system, computer readable storage medium, or apparatus has means for bundling SCells supplement the PCell or PSCell. A method, system, computer readable storage medium, or apparatus has means for when sending an SR that is on a PCell or SCell, activating a bundle that was in a dormant state. A method, system, computer readable storage medium, or apparatus has means for receiving a power saving signal through a DL control information in its DRX active time indicating it to sleep; and UE sleeps on receiving it. A method, system, computer readable storage medium, or apparatus based on receiving a power saving signal with a command to sleep in the active duration of the DRX, on detecting the power savings signal, goes to sleep until the next monitoring occasion of the power savings signal. A signal (e.g., control signal) may be an UL or DL grant. The field of control signal in indicating the BWP for the grant may be reused to indicate the power saving state. All combinations in this paragraph and the following paragraph (including the removal or addition of steps) are contemplated in a manner that is consistent with the other portions of the detailed description.

Methods, systems, apparatuses (e.g., user equipment), or computer readable storage mediums, among other things, as described herein may provide for means for power saving mechanisms in new radio. A method, system, computer readable storage medium, or apparatus has means for waking up prior to the apparatus (e.g., UE) OnDuration to monitor a power savings signal in a monitoring occasion which may be configured through RRC signaling; based on detecting the power savings signal, determining if it must monitor the subsequent OnDuration (e.g., the following onDuration, which may be the immediate OnDuration following the monitoring occasion); if the power savings signal indicates it to wake-up, the apparatus may monitor the subsequent OnDuration; and if the power savings signal indicates the apparatus to go to sleep, the apparatus may not monitor the subsequent OnDuration and the UE may sleep until the next monitoring period for the power savings signal. Since the monitoring occasion for power savings signal occurs prior to onDuration, the following OnDuration may refer to the onDuration coming after (usually immediately after) the monitoring occasion for power savings signal. The power savings signal may be indicated through the DL control signal. The DL control signal may be configured in a UE-specific manner or in a in a multi-cast manner that may be received by multiple UEs (e.g., group common PDCCH). UE-specific manner may be considered as a UE-specific identifier may be used for the control signal. So only a UE that has that identifier may decode it. With regard to multi-cast manner, multiple UEs be configured with the same identifier, so when a control signal with that identifier is signaled, they can decode it. If the apparatus does not detect the power savings signal in the monitoring occasion, it may wake up to monitor the next OnDuration. If the apparatus does not detect the power savings signal in the monitoring occasion, it may go to sleep and may not monitor the next OnDuration. The apparatus may monitor the power savings signal in first BWP and switch to second BWP to monitor the OnDuration. The first BWP and second BWP may be different. The DL control signal may be identified through an identifier MS-RNTI that is configured to the UE through RRC. The power savings signal may be monitored on resources exclusively allocated for the power savings signal. If the UE fails to detect a power savings signal, it wakes up to monitor the OnDuration (as if it detected the power savings signal). A method, system, computer readable storage medium, or apparatus has means for waking up to monitor a power savings signal (which may be in a radio resource control-configured monitoring occasion or the like) prior to an OnDuration of a discontinuous reception cycle on Celli (e.g., a first cell); based on the power savings signal, determining whether to monitor a subsequent OnDuration; and determining, based on a command received on Celli, a behavior to activate, deactivate, wake-up, or sleep on other cells monitored by the apparatus. A method may monitor an indication to sleep in the active time of the discontinuous reception cycle (that may be during when grants are received); and based on receiving the indication to sleep in the active time which may be of the discontinuous reception cycle, switch to a lower power state of operation until the next monitoring occasion of the power savings signal. Active time may be considered the OnDuration or period when the drxInactivityTimer is running. Active time may denote OnDuration+drxInactivitytimer. All combinations in this paragraph and the previous paragraphs (including the removal or addition of steps) are contemplated.

What is claimed:

1. An apparatus that performs wireless communication, the apparatus comprising:
  a processor; and
  a memory coupled with the processor, the memory comprising executable instructions stored thereon that when executed by the processor cause the processor to effectuate operations comprising:
    monitoring for a power savings signal in a monitoring occasion prior to an OnDuration of a discontinuous reception cycle on a first cell;
    detecting the power savings signal in the monitoring occasion, wherein the apparatus is configured to monitor for physical downlink control channel (PDCCH) transmissions during the OnDuration of the discontinuous reception cycle on condition that the power savings signal is not detected;

receiving an indication to sleep during active time of the discontinuous reception cycle; and switching to a lower power state of operation until a next monitoring occasion of the power savings signal.

2. The apparatus of claim 1, the operations further comprising when the power savings signal comprises an indication to sleep, sleeping until a next monitoring period for the power savings signal.

3. The apparatus of claim 1, the operations further comprising:

monitoring for the power savings signal in a first bandwidth part; and switching to a second bandwidth part to monitor for the PDCCH transmissions during the OnDuration of the discontinuous reception cycle.

4. The apparatus of claim 1, wherein the power savings signal is indicated through a downlink control signal.

5. The apparatus of claim 1, wherein the power savings signal is indicated through a downlink control signal, wherein the downlink control signal is configured in an apparatus-specific manner, wherein the apparatus is a user equipment.

6. The apparatus of claim 1, wherein the power savings signal is indicated through a downlink control signal, wherein the downlink control signal is configured in a multi-cast manner, received by multiple UEs.

7. The apparatus of claim 1, wherein the power savings signal is indicated through a downlink control signal, wherein the downlink control signal is identified through an identifier of microsleep-radio network temporary identification that is configured to the apparatus through radio resource control signaling.

8. The apparatus of claim 1, the operations further comprising:

based on the power savings signal, determining whether to monitor a subsequent OnDuration, wherein the determining comprises:

when the power savings signal comprises an indication to wake-up, monitoring the subsequent OnDuration on the first cell, when the power savings signal comprises an indication to sleep, not monitoring the subsequent OnDuration on the first cell; and determining, based on a command received on the first cell, a behavior to activate, deactivate, wake-up, or sleep on a second cell monitored by the apparatus.

9. The apparatus of claim 4, wherein the power savings signal is monitored on resources exclusively allocated through radio resource control signaling for the power savings signal.

10. A method for wireless communication, the method comprising:

monitoring for a power savings signal in a radio resource control-configured monitoring occasion prior to an OnDuration of a discontinuous reception cycle on a first cell;

determining whether the power savings signal is detected in the monitoring occasion;

on condition that the power savings signal is not detected in the monitoring occasion, monitoring for physical downlink control channel (PDCCH) transmissions during the OnDuration of the discontinuous reception cycle;

on condition that the power savings signal is detected in the monitoring occasion and that the power savings signal comprises a wake-up indication, monitoring for the PDCCH transmissions during the OnDuration of the discontinuous reception cycle;

on condition that the power savings signal is detected in the monitoring occasion and that the power savings signal comprises a sleep indication, refraining from monitoring for the PDCCH transmissions during the OnDuration of the discontinuous reception cycle;

receiving an indication to sleep in active time of at least one discontinuous reception cycle; and switching to a lower power state of operation until a next monitoring occasion of the power savings signal.

11. The method of claim 10, further comprising:

monitoring for the power savings signal in a first bandwidth part; and switching to a second bandwidth part to monitor for the PDCCH transmissions during the OnDuration of the discontinuous reception cycle.

12. The method of claim 10, further comprising:

determining, based on a command received on the first cell, a behavior to activate, deactivate, wake-up, or sleep on a second cell monitored by an apparatus.

13. The method of claim 10, wherein the power savings signal is indicated through a downlink control signal, wherein the downlink control signal is configured in an apparatus-specific manner, wherein the apparatus is a user equipment.

14. The method of claim 10, wherein the power savings signal is indicated through a downlink control signal, wherein the downlink control signal is configured in a multi-cast manner, received by multiple UEs.

15. The method of claim 10, wherein the power savings signal is indicated through a downlink control signal, wherein the downlink control signal is identified through an identifier of microsleep-radio network temporary identification that is configured to an apparatus through the radio resource control signaling.

16. The method of claim 12, wherein the power savings signal is monitored on resources exclusively allocated for the power savings signal.

17. A user equipment comprising a processor and memory, the processor and memory configured to:

monitor for a power savings signal in a monitoring occasion prior to an OnDuration of a discontinuous reception cycle;

determine whether the power savings signal is detected in the monitoring occasion;

on condition that the power savings signal is not detected in the monitoring occasion, monitor for physical downlink control channel (PDCCH) transmissions during the OnDuration of the discontinuous reception cycle;

on condition that the power savings signal is detected in the monitoring occasion and that the power savings signal comprises a wake-up indication, monitor for the PDCCH transmissions during the OnDuration of the discontinuous reception cycle;

on condition that the power savings signal is detected in the monitoring occasion and that the power savings signal comprises a sleep indication, refrain from monitoring for the PDCCH transmissions during the OnDuration of the discontinuous reception cycle;

receive an indication to sleep during active time of at least one discontinuous reception cycle; and switch to a lower power state of operation until a next monitoring occasion of the power savings signal.

18. The user equipment of claim 17, wherein the indication to sleep is received while a discontinuous reception inactivity timer is running.

19. The user equipment of claim 17, wherein the power savings signal corresponds to a downlink control channel message.

20. The user equipment of claim 17, wherein the power savings signal corresponds to a downlink control channel message received in a common search space.

* * * * *